(12) United States Patent
Sun et al.

(10) Patent No.: US 10,201,006 B2
(45) Date of Patent: Feb. 5, 2019

(54) DOWNLINK CONTROL INFORMATION FOR MULTI-LAYER TRANSMISSIONS

(71) Applicant: QUALCOMM Incorporated, San Diego, CA (US)

(72) Inventors: Jing Sun, San Diego, CA (US); Peter Gaal, San Diego, CA (US); Wanshi Chen, San Diego, CA (US); Juan Montojo, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 15/455,555

(22) Filed: Mar. 10, 2017

(65) Prior Publication Data

US 2017/0290046 A1    Oct. 5, 2017

Related U.S. Application Data

(60) Provisional application No. 62/317,311, filed on Apr. 1, 2016, provisional application No. 62/336,196, filed on
(Continued)

(51) Int. Cl.
*H04W 72/12* (2009.01)
*H04L 25/02* (2006.01)
(Continued)

(52) U.S. Cl.
CPC ....... *H04W 72/1289* (2013.01); *H04J 11/004* (2013.01); *H04J 11/0036* (2013.01);
(Continued)

(58) Field of Classification Search
None
See application file for complete search history.

(56) References Cited

U.S. PATENT DOCUMENTS

| 2015/0280883 A1* | 10/2015 | Seo | H04L 5/0055 370/329 |
|---|---|---|---|
| 2015/0312074 A1 | 10/2015 | Zhu et al. | |
| 2016/0066345 A1 | 3/2016 | Sun et al. | |

OTHER PUBLICATIONS

ISA/EP, International Search Report and Written Opinion of the International Searching Authority, Int'l Application No. PCT/US2017/022009, dated Jul. 28, 2017, European Patent Office, Rijswijk, NL, 20 pgs.

(Continued)

*Primary Examiner* — Diane L Lo
(74) *Attorney, Agent, or Firm* — Nerrie M. Zohn

(57) ABSTRACT

Control information associated with a transmission layer of a downlink transmission for a co-scheduled UE may be included in a companion DCI message. The companion DCI message may be sent to a first UE in addition to a self DCI message that communicates information associated with a transmission layer of the downlink transmission for the first UE. For example, a base station may transmit a self DCI message associated with a first transmission layer for a first UE and a companion DCI message associated with a second transmission layer for a co-scheduled UE in a control channel. The first UE may identify the self DCI message and the companion DCI message, and may then receive the downlink transmission based on the self and companion DCI messages. The UE may decode the downlink transmission based on the information included in both the self DCI message and the companion DCI message.

28 Claims, 32 Drawing Sheets

Related U.S. Application Data on May 13, 2016, provisional application No. 62/359,099, filed on Jul. 6, 2016, provisional application No. 62/373,489, filed on Aug. 11, 2016, provisional application No. 62/336,411, filed on May 13, 2016, provisional application No. 62/401,689, filed on Sep. 29, 2016.

(51) Int. Cl.
*H04W 72/04* (2009.01)
*H04W 72/08* (2009.01)
*H04J 11/00* (2006.01)
*H04L 5/00* (2006.01)
*H04W 74/00* (2009.01)
*H04W 88/02* (2009.01)
*H04B 7/0413* (2017.01)
*H04L 29/08* (2006.01)

(52) U.S. Cl.
CPC .......... *H04L 5/0037* (2013.01); *H04L 5/0053* (2013.01); *H04L 25/0202* (2013.01); *H04L 69/324* (2013.01); *H04W 72/042* (2013.01); *H04W 72/0466* (2013.01); *H04W 72/082* (2013.01); *H04W 74/006* (2013.01); *H04B 7/0413* (2013.01); *H04L 5/0048* (2013.01); *H04W 88/02* (2013.01)

(56) References Cited

OTHER PUBLICATIONS

LG Electronics, "Potential Assistance Information and Signaling Schemes for MUST," 3GPP TSG RAN WG1 Meeting #82bis, R1-155409, Malmo, Sweden, Oct. 5-9, 2015, 4 pgs., XP051021581, 3rd Generation Partnership Project.

ISA/EPO, Partial International Search Report of the International Searching Authority, Int'l. App. No. PCT/US2017/022009, dated Jun. 7, 2017, European Patent Office, Rijswijk, NL, 19 pgs.

Sequans Communications, "DL Control Signaling for MUST," 3GPP TSG RAN WG1 Meeting #82bis, R1-155149, Malmo, Sweden, Oct. 5-9, 2015, 4 pgs., XP051039586, 3rd Generation Partnership Project.

Nokia et al., "On Network Assistance and Operation of MUST," 3GPP TSG-RAN WG1 Meeting #85, R1-165135, Nanjing, China, May 23-27, 2016, 4 pgs., 3rd Generation Partnership Project.

* cited by examiner 1810-a

| SCID | Port 7 | Port 8 |

1810-b

| Port 7 | SCID0 | Port 8 | SCID1 |

1810-c

| SCID | Port 7 | Port 8 | Port 11 | Port 13 |

1810-d

| Port 7 | SCID0 | Port 8 | SCID1 | Port 11 | SCID2 | Port 13 | SCID3 |

FIG. 18

DOWNLINK CONTROL INFORMATION FOR MULTI-LAYER TRANSMISSIONS

CROSS REFERENCES

The present Application for Patent claims priority to U.S. Provisional Patent Application No. 62/317,311 by SUN, et al., entitled, "Downlink Control Information For Non-Orthogonal Multiple-Access" filed Apr. 1, 2016 and to U.S. Provisional Patent Application No. 62/336,196 by SUN, et al., entitled "Downlink Control Information For Non-Orthogonal Multiple-Access," filed May 13, 2016, and to U.S. Provisional Patent Application No. 62/359,099 by SUN, et al., entitled, "Group Companion Downlink Control Information Design" filed Jul. 6, 2016 and to U.S. Provisional Patent Application No. 62/373,489 by SUN, et al, entitled, "Group Companion Downlink Control Information Design" filed Aug. 11, 2016, and to U.S. Provisional Patent Application No. 62/336,411 by SUN, et al., entitled "Companion Downlink control Information Message With Support For Multiple Users" filed May 13, 2016 and to U.S. Provisional Patent Application No. 62/401,689 by SUN, et al., entitled "Group Companion Downlink Control Information Design For Multiple User Multiple-Input Multiple-Output Transmissions" filed Sep. 29, 2016, each of which being assigned to the assignee hereof and expressly incorporated herein for any and all purposes.

FIELD OF INVENTION

The following relates generally to wireless communication, and more specifically to a downlink control information (DCI) design for multi-layer transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

CDMA, TDMA, FDMA, and OFDMA systems may communicate with multiple UEs through the use of resource sharing and/or orthogonal transmissions. In some cases, separate communications to multiple UEs may be accomplished by strategically sharing resources or by orthogonally transmitting to the UEs over simultaneously-shared ("common") resources. For instance, a TDMA system may designate time intervals for transmissions during which a UE is scheduled to receive a transmission—e.g., the base station may transmit to a first UE in a first time interval, a second UE in a second time interval, etc. An FDMA system may simultaneously communicate with multiple UEs by sending UE-specific transmissions over corresponding frequency resources allocated to each of the UEs. The FDMA resources may include subcarriers that are separated in frequency in such a way that transmissions over one subcarrier are orthogonal with transmissions over another subcarrier. And OFDMA may utilize a combination of TDMA and FDMA techniques. CDMA systems may simultaneously transmit to each of the UEs using the same time and frequency resources, but may uniquely modulate transmissions to different UEs with an orthogonal code. The UEs may be assigned unique orthogonal codes, and may apply the orthogonal codes to received signals to identify the transmission intended for that UE.

In some cases a wireless communications system may utilize a non-orthogonal multiple access (NOMA) system that shares time and frequency resources without using orthogonal transmissions to support communications with multiple UEs. For example, a NOMA transmission may include multiple streams of data intended for multiple UEs using common resources—e.g., at least partially overlapping time, frequency, and/or spatial resources—but may transmit the streams of data without uniquely orthogonalizing the transmissions to the different UEs. NOMA transmissions may take advantage of the physical locations of the UEs in the wireless communication system to enhance the overall data throughput of the resources. For instance, the base station may transmit an enhancement layer (EL) to a first UE that has a relatively higher geometry (e.g., higher signal-to-noise ratio (SNR), which is typically associated with a UE that is closer to the base station) using overlapping resources with a base layer (BL) intended for a second UE that has relatively weaker geometry (e.g., lower SNR, which is typically associated with a UE that is farther from the base station). The NOMA transmission layers may be multiplexed in various ways including by using different transmit power levels (e.g., superposition), hierarchical modulation, or other multiplexing techniques.

For multi-layer transmissions, such as NOMA or MIMO transmission, a UE may use interference cancellation techniques while decoding a received signal. For instance, a UE may use interference cancelling techniques to cancel the effects of transmissions to co-scheduled UEs on one transmission layer, prior to decoding a signal received by the UE on another layer. It may be beneficial for a base station to provide, to a first UE, certain information describing aspects of a transmission layer associated with a co-scheduled UE. However, sending control information intended for the second UE directly to the first UE may be duplicative and significantly increase control overhead. Moreover, indicating to the first UE how to decode control information intended for the second UE may inhibit the ability to dynamically assign UEs to different transmission layers. Indicating to the UE information for decoding control information for the second UE may also introduce a significant increase in the amount of control information sent to the first UE and/or processing that the first UE may have to perform to locate control information associated with the other transmission layer, which may significantly impact battery life.

SUMMARY

A self downlink control information (DCI) message and a companion DCI message may be sent to a UE. The companion DCI message may include control information associated with a transmission layer of a downlink transmission used for a co-scheduled user equipment (UE), while the self DCI message may include control information associated with a transmission layer of the downlink transmission used for the first UE. For example, a base station may transmit, in a control channel to a first UE, a self DCI message associated with a first transmission layer of a downlink transmission used for the first UE and a companion DCI message associated with a second transmission layer of the downlink transmission for a co-scheduled UE. The first UE may identify both the self DCI message and the companion DCI message, and may then receive the downlink transmission based on the information in the self DCI message and/or companion DCI message. The UE may then decode the downlink transmission based on the information included in both the self DCI and the companion DCI messages.

A method of wireless communication is described. The method may include identifying, in a control channel of a downlink transmission, a downlink control information (DCI) message that comprises first scheduling information for a grant of resources to the first UE in a first layer of the downlink transmission, identifying a companion DCI message that comprises second scheduling information for at least one other layer of the downlink transmission, receiving the downlink transmission based at least in part on the DCI message, and decoding the downlink transmission based at least in part on the DCI message and the companion DCI message.

An apparatus for wireless communication is described. The apparatus may include means for identifying, in a control channel of a downlink transmission, a downlink control information (DCI) message that comprises first scheduling information for a grant of resources to the first UE in a first layer of the downlink transmission, means for identifying a companion DCI message that comprises second scheduling information for at least one other layer of the downlink transmission, means for receiving the downlink transmission based at least in part on the DCI message, and means for decoding the downlink transmission based at least in part on the DCI message and the companion DCI message.

Another apparatus for wireless communication is described. The apparatus may include a processor, memory in electronic communication with the processor, and instructions stored in the memory. The instructions may be operable to cause the processor to identify, in a control channel of a downlink transmission, a downlink control information (DCI) message that comprises first scheduling information for a grant of resources to the first UE in a first layer of the downlink transmission, identify a companion DCI message that comprises second scheduling information for at least one other layer of the downlink transmission, receive the downlink transmission based at least in part on the DCI message, and decode the downlink transmission based at least in part on the DCI message and the companion DCI message.

A non-transitory computer readable medium for wireless communication is described. The non-transitory computer-readable medium may include instructions operable to cause a processor to identify, in a control channel of a downlink transmission, a downlink control information (DCI) message that comprises first scheduling information for a grant of resources to the first UE in a first layer of the downlink transmission, identify a companion DCI message that comprises second scheduling information for at least one other layer of the downlink transmission, receive the downlink transmission based at least in part on the DCI message, and decode the downlink transmission based at least in part on the DCI message and the companion DCI message.

Some examples of the method, apparatus, and non-transitory computer-readable medium described above may further include processes, features, means, or instructions for identifying an indicator in the DCI message indicating that the companion DCI message may be present in the control channel and either an aggregation level or an offset relative to an aggregation level of the companion DCI message.

Some examples of the method, apparatus, and non-transitory computer-readable medium described above may further include processes, features, means, or instructions for determining the companion DCI message may be located at a second candidate location in the search space, the second candidate location being offset from the first candidate location by a known amount.

Some examples of the method, apparatus, and non-transitory computer-readable medium described above may further include processes, features, means, or instructions for calculating a CRC value for the data portion of the companion DCI message. Some examples of the method, apparatus, and non-transitory computer-readable medium described above may further include processes, features, means, or instructions for determining a radio network temporary identifier (RNTI) of a co-scheduled UE or a format of the companion DCI message, or both based at least in part on the calculated CRC value and the CRC portion.

Some examples of the method, apparatus, and non-transitory computer-readable medium described above may further include processes, features, means, or instructions for extracting fields of the companion DCI message according to the one of the plurality of pre-determined formats corresponding to the one of the plurality of reserved RNTIs used to scramble the CRC portion. Some examples of the method, apparatus, and non-transitory computer-readable medium described above may further include processes, features, means, or instructions for performing reduced complexity maximum likelihood (RML) or symbol level interference cancellation (SLIC) of one or more associated transmission layers according to information comprised by the DCI message and the companion DCI message.

Some examples of the method, apparatus, and non-transitory computer-readable medium described above may further include processes, features, means, or instructions for extracting fields of the companion DCI message according to the single co scheduled UE format. Some examples of the method, apparatus, and non-transitory computer-readable medium described above may further include processes, features, means, or instructions for performing code word interference cancellation (CWIC) of the at least one other layer of the downlink transmission based at least in part on the RNTI of the co scheduled UE and a record of the single co scheduled UE format, wherein the second scheduling information may be for a grant of resources to the co scheduled UE.

Some examples of the method, apparatus, and non-transitory computer-readable medium described above may further include processes, features, means, or instructions for calculating a second CRC value based on a subset of the data portion of the companion DCI message. Some examples of the method, apparatus, and non-transitory computer-readable medium described above may further include processes, features, means, or instructions for validating the data portion of the companion DCI message by comparing the second CRC value with an embedded CRC field in the data portion of the companion DCI message.

Some examples of the method, apparatus, and non-transitory computer-readable medium described above may further include processes, features, means, or instructions for determining one or more transmission configurations for resources of the at least one other layer corresponding to the granted resources for the first layer, wherein decoding the downlink transmission comprises demodulating the resources of the first layer based at least in part on the determined transmission configurations for the at least one other layer.

Some examples of the method, apparatus, and non-transitory computer-readable medium described above may further include processes, features, means, or instructions for determining a power ratio between the at least one other layer and the first layer for the demodulating based on a plurality of power ratio values associated with a modulation order for the first layer and a power ratio index in the companion DCI message.

Some examples of the method, apparatus, and non-transitory computer-readable medium described above may further include processes, features, means, or instructions for identifying the companion DCI message comprises monitoring the control channel of a transmission time interval (TTI) associated with the at least one other layer, wherein the TTI associated with the at least one other layer may be a different length than a TTI associated with the first layer. Some examples of the method, apparatus, and non-transitory computer-readable medium described above may further include processes, features, means, or instructions for decoding candidate DCI messages using a predetermined radio network temporary identifier (RNTI) associated with the one or more companion DCI messages.

Some examples of the method, apparatus, and non-transitory computer-readable medium described above may further include processes, features, means, or instructions for determining, from the companion DCI message, a spatial layer usage configuration for a plurality of spatial layers of the downlink transmission for the at least one of the respective sets of resources, the plurality of spatial layers comprising one or more spatial layers not in the first set of spatial layers, wherein decoding the downlink transmission comprises demodulating the resources of the first set of spatial layers based at least in part on the determined spatial layer usage configuration.

Some examples of the method, apparatus, and non-transitory computer-readable medium described above may further include processes, features, means, or instructions for identifying an orthogonal cover code length for reference signals transmitted on antenna ports of the downlink transmission based on the spatial layer usage configuration. Some examples of the method, apparatus, and non-transitory computer-readable medium described above may further include processes, features, means, or instructions for performing channel estimation for the demodulating based at least in part on the identified orthogonal cover code length.

Some examples of the method, apparatus, and non-transitory computer-readable medium described above may further include processes, features, means, or instructions for identifying an association of the plurality of spatial layers to antenna ports of the downlink transmission based on the spatial layer usage configuration. Some examples of the method, apparatus, and non-transitory computer-readable medium described above may further include processes, features, means, or instructions for performing channel estimation for the demodulating over reference signals transmitted on the antenna ports based at least in part on the identified association of the plurality of spatial layers to the antenna ports.

Some examples of the method, apparatus, and non-transitory computer-readable medium described above may further include processes, features, means, or instructions for merging a first record and a second record of the one or more records for the determining of the spatial layer usage configuration for the plurality of spatial layers of the downlink transmission.

In some examples of the method, apparatus, and non-transitory computer-readable medium described above, the DCI message indicates any of: a location of the companion DCI message, an aggregation level of the companion DCI message, an index of a decoding candidate, a size of the companion DCI message, or a format of the companion DCI message, or a combination thereof, and the companion DCI message comprises any of: a resource block allocation indicator, a resource block allocation type indicator, a modulation and coding scheme (MCS) indicator, a redundancy version indicator, a traffic to pilot ratio indicator, a resource hopping scheme indicator, a starting symbol indicator, an ending symbol indicator, an indication of a number of transmission time intervals for which DCI included in the companion DCI message applies for sets of resources of the at least one other layer, a transmission configuration index indicating a combination of a transmission mode, a precoding matrix, a demodulation reference signal orthogonal cover length indicator, an MCS table type indicator, a spatial-layer indicator, a transmission mode, or a combination thereof.

A method of wireless communication is described. The method may include scheduling a downlink transmission to a first user equipment (UE) and at least one co scheduled UE, the downlink transmission comprising a first layer for the first UE and at least one other layer for the at least one co-scheduled UE, transmitting control information associated with the downlink transmission to the first UE over a control channel, the control information comprising a downlink control information (DCI) message and a companion DCI message, wherein the DCI message comprises first scheduling information for a grant of resources to the first UE in the first layer of the downlink transmission and the companion DCI message comprises second scheduling information for the at least one other layer of the downlink transmission to be used for decoding of the downlink transmission by the first UE, and transmitting the downlink transmission to the first UE and the at least one co-scheduled UE.

An apparatus for wireless communication is described. The apparatus may include means for scheduling a downlink transmission to a first user equipment (UE) and at least one co scheduled UE, the downlink transmission comprising a first layer for the first UE and at least one other layer for the at least one co-scheduled UE, means for transmitting control information associated with the downlink transmission to the first UE over a control channel, the control information comprising a downlink control information (DCI) message and a companion DCI message, wherein the DCI message comprises first scheduling information for a grant of resources to the first UE in the first layer of the downlink transmission and the companion DCI message comprises second scheduling information for the at least one other layer of the downlink transmission to be used for decoding of the downlink transmission by the first UE, and means for transmitting the downlink transmission to the first UE and the at least one co-scheduled UE.

Another apparatus for wireless communication is described. The apparatus may include a processor, memory in electronic communication with the processor, and instructions stored in the memory. The instructions may be operable to cause the processor to schedule a downlink transmission to a first user equipment (UE) and at least one co scheduled UE, the downlink transmission comprising a first layer for the first UE and at least one other layer for the at least one co-scheduled UE, transmit control information associated with the downlink transmission to the first UE over a control channel, the control information comprising a downlink control information (DCI) message and a companion DCI message, wherein the DCI message comprises first scheduling information for a grant of resources to the first UE in the first layer of the downlink transmission and the companion DCI message comprises second scheduling information for the at least one other layer of the downlink transmission to be used for decoding of the downlink transmission by the first UE, and transmit the downlink transmission to the first UE and the at least one co-scheduled UE.

A non-transitory computer readable medium for wireless communication is described. The non-transitory computer-readable medium may include instructions operable to cause a processor to schedule a downlink transmission to a first user equipment (UE) and at least one co scheduled UE, the downlink transmission comprising a first layer for the first UE and at least one other layer for the at least one co-scheduled UE, transmit control information associated with the downlink transmission to the first UE over a control channel, the control information comprising a downlink control information (DCI) message and a companion DCI message, wherein the DCI message comprises first scheduling information for a grant of resources to the first UE in the first layer of the downlink transmission and the companion DCI message comprises second scheduling information for the at least one other layer of the downlink transmission to be used for decoding of the downlink transmission by the first UE, and transmit the downlink transmission to the first UE and the at least one co-scheduled UE.

In some examples of the method, apparatus, and non-transitory computer-readable medium described above, the DCI message indicates any of a location of the companion DCI message, an aggregation level of the companion DCI message, an index of a decoding candidate, a size of the companion DCI message, a format of the companion DCI message, an aggregation level, a location of the companion DCI message relative to the DCI message, a relative offset from an aggregation level, or a combination thereof.

In some examples of the method, apparatus, and non-transitory computer-readable medium described above, the control information further comprises a third DCI message intended for the at least one co-scheduled UE, the third DCI message comprising third scheduling information associated with the at least one other layer that may be additional to the second scheduling information of the companion DCI message. In some examples of the method, apparatus, and non-transitory computer-readable medium described above, the companion DCI message comprises any of a resource block allocation indicator, a resource block allocation type indicator, a modulation and coding scheme (MCS) indicator, a modulation order, a redundancy version indicator, a traffic to pilot ratio indicator, a resource hopping scheme indicator, a starting symbol indicator, a demodulation reference signal orthogonal cover length indicator, an MCS table type indicator, a spatial-layer indicator, a transmission mode, a transmission configuration index that indicates a combination of a transmission mode, a precoding matrix indicator, or a rank indicator, or a combination thereof.

Some examples of the method, apparatus, and non-transitory computer-readable medium described above may further include processes, features, means, or instructions for determining a format of the companion DCI message that indicates DCI for the at least one co scheduled UE. Some examples of the method, apparatus, and non-transitory computer-readable medium described above may further include processes, features, means, or instructions for scrambling a cyclic redundancy check (CRC) portion of the companion DCI message, wherein the scrambling indicates the determined format to the first UE.

In some examples of the method, apparatus, and non-transitory computer-readable medium described above, the at least one co scheduled UE comprises a plurality of co scheduled UEs, and wherein the determining comprises: selecting a first format from a plurality of pre-determined formats for the companion DCI message that comprises one record associated with multiple co scheduled UEs of the plurality of co scheduled UEs, wherein the CRC portion may be scrambled with a first reserved RNTI that indicates the first format for the companion DCI message. Some examples of the method, apparatus, and non-transitory computer-readable medium described above may further include processes, features, means, or instructions for selecting a second format from a plurality of pre-determined formats for the companion DCI message that comprises a separate record for each of the plurality of co scheduled UEs, wherein the CRC portion may be scrambled with a second reserved RNTI that indicates the second format of the companion DCI message.

In some examples of the method, apparatus, and non-transitory computer-readable medium described above, the at least one co scheduled UE comprises a single co scheduled UE, and wherein the determining comprises: selecting a single co scheduled UE format for the companion DCI message that comprises records for the at least one co scheduled UE, wherein the CRC portion may be scrambled with the RNTI of the at least one co scheduled UE that indicates the co scheduled UE format for the companion DCI message.

Some examples of the method, apparatus, and non-transitory computer-readable medium described above may further include processes, features, means, or instructions for configuring, based at least in part on the scheduling, the companion DCI message comprising one or more records having DCI for respective sets of resources of the at least one other layer of the transmission, wherein at least one of the respective sets of resources corresponds to a transmission configuration associated with a plurality of co-scheduled UEs.

Some examples of the method, apparatus, and non-transitory computer-readable medium described above may further include processes, features, means, or instructions for determining a power ratio between the at least one other layer and the first layer. Some examples of the method, apparatus, and non-transitory computer-readable medium described above may further include processes, features, means, or instructions for including, in the companion DCI message, an indication of the determined power ratio, wherein the indication comprises a power ratio index corresponding to one of a plurality of power ratio values associated with a modulation order for the first layer.

Some examples of the method, apparatus, and non-transitory computer-readable medium described above may further include processes, features, means, or instructions for determining a starting symbol and an ending symbol of the respective sets of resources of the at least one other layer, wherein the configuring comprises including, in the companion DCI message, an indication of at least one of the starting symbol or the ending symbol based at least in part on the determination.

Some examples of the method, apparatus, and non-transitory computer-readable medium described above may further include processes, features, means, or instructions for configuring, based at least in part on the scheduling, the downlink control information (DCI) message and the companion DCI message comprising one or more records having a spatial layer usage configuration for the plurality of spatial layers across respective sets of resources, wherein at least one of the respective sets of resources may be co-scheduled with the grant of resources to the first UE.

Some examples of the method, apparatus, and non-transitory computer-readable medium described above may further include processes, features, means, or instructions for determining an orthogonal cover code length based on an operating mode for the plurality of spatial layers for the downlink transmission over the respective sets of resources. Some examples of the method, apparatus, and non-transitory computer-readable medium described above may further include processes, features, means, or instructions for conveying the orthogonal cover code length in the spatial layer usage configuration, wherein the spatial layer usage configuration comprises a reference signal seed identifier for the plurality of spatial layers.

Some examples of the method, apparatus, and non-transitory computer-readable medium described above may further include processes, features, means, or instructions for determining an association of the plurality of spatial layers to antenna ports of the downlink transmission for the downlink transmission over the respective sets of resources. Some examples of the method, apparatus, and non-transitory computer-readable medium described above may further include processes, features, means, or instructions for conveying the association of the plurality of spatial layers to the antenna ports of the downlink transmission in the spatial layer usage configuration, wherein the spatial layer usage configuration comprises respective reference signal seed identifiers for each of the plurality of spatial layers.

Some examples of the method, apparatus, and non-transitory computer-readable medium described above may further include processes, features, means, or instructions for merging the spatial layer usage configurations associated with two or more of the plurality of UEs associated with different resource grants on the same spatial layer into a single one of the one or more records based on determining that parameters of the spatial layer usage configurations for the two or more of the plurality of UEs may be consistent with each other.

BRIEF DESCRIPTION OF THE DRAWINGS

FIG. 18 illustrates examples of group companion DCI messages in a system that supports group companion DCI design for MU-MIMO transmissions in accordance with aspects of the present disclosure;

DETAILED DESCRIPTION

Figure 1:
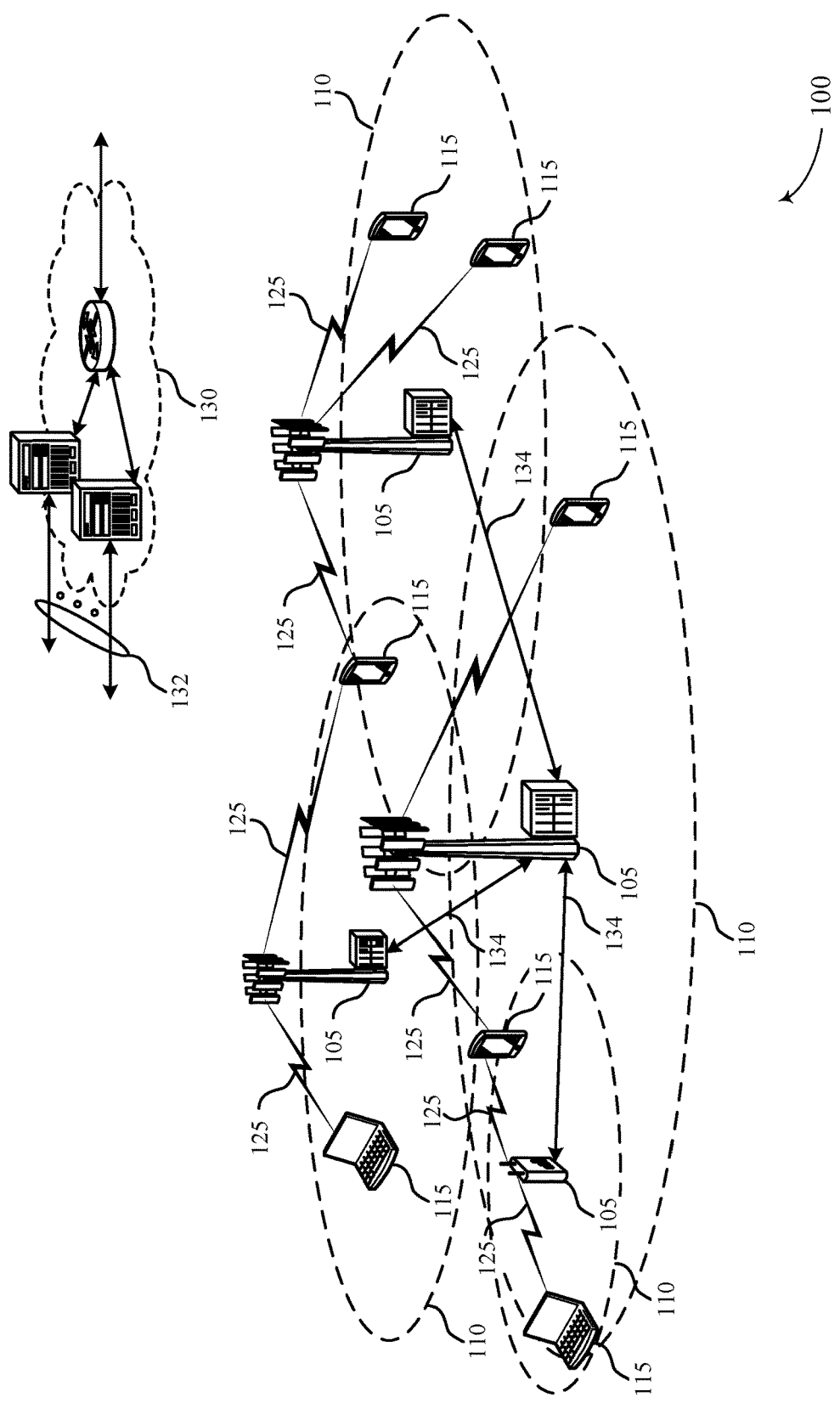
FIG. 1 illustrates an example of a wireless communications system that supports a DCI message designed for multi-layer transmissions in accordance with various aspects of the present disclosure.

In some communication systems, a transmission may be structured into multiple transmission layers including information for different user equipments (UEs) over the same or overlapping time and frequency resources. The transmission layers may be spatial layers or non-spatially separated layers (e.g., transmitted using power splitting between layers). A recipient UE of one layer may benefit from having information related to layers conveying information for co-scheduled UEs for decoding operations (e.g., cancellation or separation of another layer).

According to various aspects of the disclosure, a self downlink control information (DCI) message and a companion DCI message may be sent to a UE. The companion DCI message may include control information associated with a transmission layer of a downlink transmission used for a co-scheduled user equipment (UE), while the self DCI message may include control information associated with a transmission layer of the downlink transmission used for the first UE.

In some cases, control information intended for a first UE ("EL-UE") and used to communicate information associated with transmission layers to a paired UE ("BL-UE") may be designed to mitigate increases in overhead resulting from sending and receiving the information associated with co-scheduled transmission layer. For example, a wireless communication system may implement non-orthogonal multiple access (NOMA) techniques in providing communication services to supported UEs. During operation, an EL-UE may be configured to operate in a NOMA mode and may be paired with a BL-UE. The EL-UE may receive a DCI message regarding an upcoming transmission to the EL-UE (i.e., a self DCI message) via an enhancement layer and the BL-UE may receive a different DCI message regarding an upcoming transmission to the BL-UE via a base layer. Additionally, the EL-UE may receive a companion DCI message that describes aspects of the base layer. Each DCI message may be included in a physical downlink control channel (PDCCH), and the EL-UE may use blind decoding techniques to identify the self DCI message as well as the companion DCI message.

In some examples, the self DCI message and the companion DCI message for the EL-UE may be designed to decrease the amount of overhead associated with the blind decoding process. For example, the companion DCI message may be designed so that a location of the companion DCI message is dependent on the self DCI message. For instance, the companion DCI message may be mapped to the PDCCH to be located in a same search space as the self DCI message and may also be designed to be a same length as the self DCI message. In some examples, the self DCI message includes an indicator of whether the companion DCI message is present in the PDCCH—e.g., dependent on whether the transmission to the UE is a NOMA transmission. The self DCI message may also be used to indicate an aggregation level and/or location of the companion DCI message relative to the self DCI message. In some cases, a radio network temporary identifier (RNTI) for the BL-UE may be communicated in a CRC portion of the companion DCI message.

In other cases, a companion DCI message may be used to convey transmission information for one or more co-scheduled devices to a receiving device, and a CRC portion of the companion DCI message may be scrambled to indicate a format of the companion DCI message. For example, a wireless communication system may support multiple communication technologies including NOMA and multiple-input multiple-output (MIMO) techniques. These techniques may be used either separately or in combination with one another and may be used to perform transmission to multiple receiving devices (co-scheduled devices) using shared time and frequency resources (e.g., via spatial and/or power split transmission layers). Accordingly, techniques to cancel interference, such as codeword interference cancellation and symbol-level interference cancellation, between the transmission layers may be beneficial to increase transmission reliability (e.g., decrease a bit error rate (BER) or block error rate (BLER)). In order to perform these interference cancellation techniques, a receiving device may be provided with transmission information (a "record") describing a transmission to a co-scheduled receiving device in a companion DCI message. In some examples, different numbers of and types of receiving devices may be co-scheduled at once, and it may be beneficial to designate different companion DCI message formats for different data transmissions. Additionally, techniques to indicate the different formats with minimal to no increase in overhead are preferred.

According to some aspects, different companion DCI message formats are indicated by scrambling a CRC portion of a companion DCI message. For instance, a CRC portion may be scrambled with an RNTI of a co-scheduled UE to indicate a single co-scheduled UE format. The single co-scheduled UE format may include transmission parameters for a co-scheduled transmission that may enable a receiving UE to perform codeword interference cancellation of the co-scheduled transmission. In another example, a number of RNTI values may be reserved (e.g., not used for served UEs) and indicate other companion DCI message formats when used to scramble the CRC portion of the companion DCI message. For instance, one reserved RNTI value may be used to indicate a companion DCI message format that provides a record for transmissions to each of multiple co-scheduled UE. Another reserved RNTI value may be used to indicate a companion DCI message format that provides a merged record for transmission to multiple co-scheduled UEs. In some cases, the companion DCI message formats associated with the reserved RNTIs may include transmission parameters for one or more co-scheduled transmissions that may assist a receiving UE in performing symbol level interference cancellation.

In yet other cases, a companion DCI message may be used to provide a UE with information associated with groups of co-scheduled UEs. For example, a UE that receives a resource grant for a first layer of a downlink transmission including multiple orthogonal or non-orthogonal layers may use the companion DCI message to determine information associated with resources of a second layer of the transmission. Additionally, sets of resources of the second layer may be grouped or categorized into one or more records within the companion DCI message (i.e., a group companion DCI message), and multiple companion DCI messages may be sent in a control channel. In some examples, the sets of resources may be grouped based at least in part on a common transmission mode (TM), precoding matrix indicator (PMI), and rank indication (RI) associated with the sets of resources. That is, information regarding sets of resources associated with the same TM, PMI, and RI may be provided in the same record within a companion DCI message. Each record within the DCI message may include an index (e.g., a TM/PMI/RI index) and a resource block (RB) allocation, where the index may correspond to predetermined combinations of TM, PMI, and/or RI.

In some examples, a companion DCI message may include a power ratio indication used for interference cancellation. That is, a number of bits may be used in the companion DCI message to provide a power ratio indication for the record(s) included in the companion DCI message, where the power ratio indication may indicate a power ratio between two layers of a transmission (e.g., between an enhancement layer and a base layer). The power ratio indication may also include a power ratio index associated with a power ratio mapping. For example, a UE may use the power ratio index with a lookup table to identify power ratios for interference cancellation. The power ratio index may indicate a single power ratio or multiple power ratios, and in the case where multiple power ratios are indicated, modulation schemes associated with the first layer, the second layer, or both, may be used to determine the power ratio.

A companion DCI message may be used in cases where different co-scheduled layers are associated with different transmission time intervals. For example, a UE scheduled on a first layer having a first transmission time interval (TTI) may receive a companion DCI message including information for a second layer having a second TTI, the second TTI being shorter and having the same starting symbol or a later starting symbol than the first TTI. The UE may receive a subsequent control channel transmission corresponding to the first TTI, and already have the information for the second layer from the previously received companion DCI message. Additionally or alternatively, the UE may receive a grant for resources for the first layer, and receive a companion DCI message a later time.

In still more cases, a base station may schedule a multiple user multiple-input multiple output (MU-MIMO) transmission with different data streams for multiple UEs on multiple spatial layers. Spatial processing of the transmission at the UEs to identify and decode the respective data streams can benefit from knowledge of various parameters related to spatial layers for other UEs. The companion DCI message may be designed to provide flexible MU-MIMO spatial layer usage with minimal additional control overhead, and transmitted along with self DCI messages that grant resources of the MU-MIMO transmission to the receiving UEs. For example, a first UE may receive a self-DCI message that includes a grant of resources for a downlink transmission on one or more spatial layers, and the companion DCI message may include information associated with each UE that is scheduled with overlapping time/frequency resources (e.g., including information for the spatial layers associated with the first UE and other co-scheduled UEs).

The companion DCI message may include one or more records, and each record may describe spatial layer usage information for multiple spatial layers over a set of resources. The receiving UE may determine that the resources allocated in the grant overlap with resources associated with a record in the companion DCI message, and the receiving UE may extract layer usage information for the resources associated with the record for use in receiving and processing (e.g., interference cancellation, spatial processing, etc.) the spatial layers intended for the receiving UE.

Each record may include, for example, fields that indicate which spatial layers are being used, an orthogonal cover code (OCC) length for the spatial layers, and/or the modulation order for each spatial layer. In various circumstances, spatial layer usage information for multiple UEs can be merged into one record, or multiple records with overlapping spatial layer usage information can be merged by a receiving UE.

Features of the disclosure introduced above are further described below in the context of a wireless communication system. Specific examples are then described of an example PDCCH that supports a DCI message designed to support NOMA operation and a process flow for using a DCI message designed to support NOMA operation. Specific examples are also described of example companion DCI message formats and process flows for operation using a companion DCI message with multiple user capabilities. Specific examples are also provided of DCI message and record formats and a power ratio mapping. Specific examples are then described of transmissions on multiple spatial layers to multiple users on overlapping resources. These and other features of the disclosure are further illustrated by and described with reference to apparatus diagrams, system diagrams, and flowcharts that relate to DCI message designs for multi-layer transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. Wireless communications system 100 may support companion DCI messages designed to provide control information associated with one or more co-scheduled UEs.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may use a scheduling time unit, also known as a TTI. Each TTI may have one or more symbol periods during which modulation symbols may be transmitted. The symbol period timing may depend on sub-carrier spacing used for waveforms based on multi-carrier modulated waveforms (e.g., orthogonal frequency division multiplexing (OFDM), discrete Fourier transform (DFT) spread OFDM (DFT-s-OFDM), etc.). Time intervals may be expressed in multiples of a basic time unit (e.g., the sampling period, Ts=1/30,720,000 seconds). In some examples, time resources may be organized according to radio frames of length of 10 ms (Tf=307200·Ts), which may be identified by a system frame number (e.g., ranging from 0 to 1023). Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In other cases, a TTI may be shorter than a subframe or may be dynamically selected (e.g., in short TTI bursts or in selected component carriers using short TTIs). A wireless multiple-access communications system may include a number of base stations, each simultaneously supporting communication for multiple communication devices, which may be otherwise known as UEs.

A wireless communications system 100 may use a combination of the above and other multiple-access techniques to support communication with the UEs 115 in the network. For example, base stations 105 and/or UEs may use multiple-input multiple-output (MIMO) operation to transmit multiple spatially separated (e.g., orthogonal) transmission layers (e.g., spatial streams). In some cases, a MIMO transmission may be from a transmitter to a single receiver (e.g., single-user MIMO (SU-MIMO)) and may convey different sets of data to the receiver using the different transmission layers. The receiver may process the transmission layers using spatial layer information to decode each transmission layer independently. In other cases, a MIMO transmission may convey different sets of data to multiple receivers (e.g., multiple-user MIMO (MU-MIMO)) using different transmission layers, and the receivers may process the transmission layers intended for themselves independently, or using interference cancellation or suppression techniques on other layers.

MIMO techniques use multiple antennas at a base station 105 and/or multiple antennas at a UE 115 to take advantage of multipath environments and spatial resources to transmit multiple data streams. These spatial resources may be called spatial layers, and the same or different streams of data may be transmitted over different spatial layers. Each spatial layer may be associated with an antenna port. The use of multiple spatial layers may increase the reliability or capacity of transmissions through combining signals transmitted via different antenna ports or communicating different data streams via different antenna ports. In some cases, the use of spatial layers in wireless communication system 100 may be adaptive based on the channel quality of spatial layers. For example, a UE 115 may transmit a rank indicator (RI) indicating the number of spatial layers that support a signal to interference plus noise ratio (SINR) that is high enough for communication with the UE 115. A base station 105 may use the RI to determine the number of spatial layers to use for transmissions to the UE 115 (e.g., one (1) spatial layer for rank 1 transmissions and two (2) spatial layers for rank 2 transmissions).

A base station 105 may insert periodic pilot symbols such as cell specific reference signals (CRSs) to aid UEs 115 in channel estimation and coherent demodulation. Reference signal sequences for CRS may be dependent on a physical cell identity, of which there may be a predetermined number (e.g., 504 different cell identities). They may be modulated using quadrature phase shift keying (QPSK) and power boosted (e.g., transmitted at a fixed or configurable offset higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signals (DMRSs) (also called UE-specific reference signals (UE-RS)) may be directed toward specific UEs 115 and may be transmitted only on resource blocks assigned to those UEs 115. DMRS may include signals on six (6) resource elements in each resource block in which they are transmitted. A base station may generate a sequence for a DMRS using a pseudo-random sequence generator initialized with the cell identity and a scrambling identity (SCID). The DMRSs for each antenna port may each utilize the same six (6) resource elements, and may use a different combination of SCIDs and orthogonal cover codes (OCCs). The OCC may be used to mask each signal with a different combination of 1 or −1 in different resource elements. In some cases, two sets of DMRS may be transmitted in adjoining resource elements.

In some examples, a base station may transmit to multiple UEs 115 on multiple antenna ports based on the RI and the orthogonal cover code length (e.g., OCC2 or OCC4). For example, a base station employing OCC2 may transmit a rank 1 transmission to a first UE 115 on antenna port 7 and a rank 1 transmission to a second UE 115 on antenna port 8 using the same SCID. A base station employing OCC2 may also transmit any combination of rank 1 and rank 2 transmissions using different SCIDs. However, if different SCIDs are used for different layers of a transmission, the reference signals included in the transmissions (e.g., DMRS) may be non-orthogonal (e.g., quasi-orthogonal, etc.), and channel estimation may be degraded.

Additionally or alternatively, a base station 105 may use non-orthogonal multiplexing to send data to the connected UEs 115. Non-orthogonal multiplexing techniques may be referred to as NOMA or multi user superposition transmission (MUST). A non-orthogonal multiplexing scheme may differ from other multiplexing schemes in that multiple transmission layers may be sent using the same or partially overlapping time-frequency resources without additional spatial layer resources being used. In some examples, a non-orthogonal multiplexing scheme may instead use physical characteristics (e.g., location) of the UEs 115 to differentiate transmissions to one UE 115 from transmissions to another UE 115. In some examples, a receiver such as an EL-UE 115 may support both NOMA and MIMO transmissions, independently or simultaneously.

In one example, a base station 105 using non-orthogonal multiplexing may transmit a first transmission layer at a lower power to a first UE 115 (e.g., via superposition or hierarchical modulation, etc.) and a second transmission layer at a higher power to a second, co-scheduled UE 115 using at least partially overlapping physical resources. The first UE 115 (e.g., EL-UE) may apply interference cancellation techniques to at least partially cancel the higher power transmission layer to decode the lower power transmission layer. The second UE 115 (e.g., BL-UE) may decode the higher power transmission layer, with the lower power transmission layer perceived as noise. In some cases, this technique may be used to convey multiple data streams over the same time-frequency resources without using different spatial-layers. In some cases, a base station 105 may switch between operating modes for transmissions to a UE 115 on a semi-static or dynamic basis (e.g., frame by frame basis, TTI by TTI basis, etc.), and the selection of operating mode for transmissions may be dependent on CSI from a given UE 115 and/or other UEs 115 (e.g., presence or absence of complementary operating modes for multiple UEs, etc.).

To cancel interference from the higher power transmission layer or different spatial-layers, the EL-UE 115 may use information describing transmission parameters for the other transmission layers. For example, the EL-UE 115 may perform codeword level interference cancellation of the other transmission layers, which may include de-mapping and decoding data transmitted to a co-scheduled over the other transmission layers, encoding and re-mapping the data, and using the re-mapped data to cancel interference form the other transmission layers. The EL-UE 115 may receive transmission parameters, such as resource block assignments, transmission patterns, modulation and coding schemes, etc., to enable decoding of the data of a transmission intended for a co-scheduled UE. In another example, the EL-UE 115 may perform symbol level interference cancellation of the other transmission layers, which may include identifying and using symbols of a co-scheduled transmission to cancel interference from the other transmission layers. Symbol level interference cancellation may be accomplished using fewer transmission parameters describing the co-scheduled transmission than used for codeword level interference cancellation.

A base station 105 may transmit control information to support each of the above multiple-access techniques and to enable associated UEs 115 to properly receive corresponding transmission. The base station 105 may use a physical downlink control channel (PDCCH) to carry DCI from a base station 105 to a UE 115. DCI includes information regarding downlink scheduling assignments, uplink resource grants, a transmission scheme used for transmissions, uplink power control, hybrid automatic repeat request (HARD) information, an MCS used for transmissions, or other information. The size and format of the DCI messages can differ depending on the type and amount of information that is carried by the DCI. For example, if spatial multiplexing is supported, the size of the DCI message may be large compared to contiguous frequency allocations. Similarly, for a system that employs MIMO, the DCI must include additional signaling information. DCI size and format may depend on the amount of information as well as factors such as bandwidth, the number of antenna ports, and duplexing mode. PDCCH can carry DCI messages associated with multiple users, and each UE 115 may decode the DCI messages that are intended for it.

A base station 105 may also gather channel condition information from a UE 115 in order to efficiently configure and schedule the channel. This information may be sent from the UE 115 in the form of a channel state information (CSI) report. A CSI report may contain an RI requesting a number of layers to be used for downlink transmissions (e.g., based on the antenna ports of the reference signals received by the UE 115), a precoding matrix indicator (PMI) indicating a preference for which precoding matrix should be used (based on the number of layers), and channel quality information (CQI) representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not in a mode that supports spatial multiplexing). The types of information included in the report determines a reporting type. Channel state reports may be periodic or aperiodic.

Generally, transmission parameters may be provided in DCI messages in a control channel, such as a PDCCH. The PDCCH may carry DCI messages for multiple UEs 115, and a UE 115 may blind decode the PDCCH in search of a DCI message intended for that UE 115 (which may be referred to as a "self DCI"). Accordingly, the DCI message may include a field used to identify the intended recipient. In one example, a cyclic redundancy check (CRC) field of a DCI message may be scrambled (e.g., masked) with an RNTI that has been uniquely assigned to the intended UE. During blind decoding, the UE 115 may descramble all or a subset of the DCI messages included in the PDCCH using its RNTI and perform a CRC check on the data portion of the DCI message. If the CRC check passes, the DCI message may be understood as valid for the UE 115 and processed to retrieve the DCI.

In some cases, the number of DCI messages that are descrambled by a UE 115 may be limited to certain search spaces allocated throughout the PDCCH. For instance, UEs 115 may be assigned to respective UE-specific search spaces, whereas common search spaces may be allocated to some or all UEs 115 in a network. These allocations may be used to limit the number of blind decodes performed by a UE. Each search space may include a number of control channel elements (CCEs), which may include nine contiguous resource element groups and each resource element group may include four resource elements. A DCI message may be mapped to one or more CCEs based on a size of the DCI message, and may be assigned an aggregation level (AL) depending on the number of CCEs used by that DCI message. For instance AL 1 may be assigned to a DCI message that uses one CCE, AL 2 to a DCI message that uses two CCEs, AL 4 to a DCI message that uses four CCEs, etc. The addition of ALs increases the number of blind decodes performed by a UE 115, as the UE 115 may be initially unaware of the length of the DCI message. That is, the UE may blind decode potential DCI messages assuming a first AL, then a second AL, etc. until an intended DCI message is discovered. The blind decoding process may increase latency associated with a UE 115 identifying its own DCI message and additionally may increase power consumption and capitalize processing resources. Furthermore, since blind decoding occurs each time a PDCCH or enhanced PDCCH (ePDCCH) is received, an increase in power consumption and processing resources may become more significant over time.

As discussed above, a UE 115 configured for non-orthogonal multiplexing and/or MIMO operation (e.g., an EL-UE 115), may use information describing transmissions to a co-scheduled ("paired") UE 115 (e.g., a BL-UE 115 and/or other MIMO UE 115) to cancel interference from the transmission to the BL-UE 115 ("co-scheduled transmission"). For example, an EL-UE 115 may use the RNTI of a BL-UE 115 to determine a reference signal transmission pattern for the BL-UE. In some cases, the EL-UE 115 may detect DCI messages intended for the BL-UE 115 or other MIMO UEs 115. Since the EL-UE 115 typically has higher geometry than the BL-UE 115, decoding the DCI for the BL-UE will not be a problem if the BL-UE RNTI is known to the EL-UE. Similarly, the EL-UE 115 may decode the DCI for the other MIMO UEs 115. In this way, the wireless communications system 100 may refrain from introducing any additional DCI overhead to the network. However, this technique may also increase the number of blind decodes that are performed and increase the power and processing burden on the EL-UE. In some examples, the EL-UE may be co-scheduled with multiple candidate BL-UEs; thus, the EL-UE may need to monitor for DCI messages of multiple BL-UEs.

In some cases, the number of blind decodes may be reduced by including an indicator in the EL-UE DCI message (i.e., the self DCI for the EL-UE 115) that designates one or more RNTI(s) for the BL-UE(s) 115 and/or MIMO UE(s) 115 of interest. However, this may result in processing delay, as the EL-UE 115 may wait until the EL-UE DCI message is decoded before determining the RNTIs to identify the DCI message for the other co-scheduled BL and/or MIMO UE(s) 115. In addition, the DCI for the BL and MIMO UE(s) 115 may not contain all the physical downlink shared channel (PDSCH) parameters for the BL used by the EL-UE 115 for processing a NOMA or MIMO transmission, such as transmission mode (TM), traffic-to-pilot ratio (TPR), MCS table type, orthogonal cover code (OCC) length, etc. Thus, RRC signaling may also be needed to provide the EL-UE 115 a list of candidate BL and/or MIMO UE(s) 115 (e.g., RNTIs of candidate BL and/or MIMO UE(s) 115), together with PDSCH parameters not included in the DCI messages for the BL and MIMO UE(s) 115. In some examples, RRC signaling may also be used to convey a DCI format (e.g., a specific format or mode-dependent format, etc.) for other DCI messages, which may reduce the number of blind decodes.

In another example, all of the information for the transmission to the co-scheduled BL and/or MIMO UE(s) may be included in the DCI message of the EL-UE 115 (which may be referred to as a "jumbo grant" or "jumbo DCI message"), which may substantially increase (e.g., approximately double) the size of a EL-UE DCI message. In this way, the EL-UE may receive all transmission parameters for one or more co-scheduled UEs without using RRC signaling. In some examples, the jumbo grant may be enabled or disabled for an EL-UE 115 based on a DCI format used by the EL-UE 115 (e.g., enabled for only one of different DCI formats, etc.). In some cases, the jumbo grant includes one or more of: a resource block allocation indicator, an MCS indicator, a redundancy version indicator, a TPR indicator, a resource hopping scheme indicator, a resource block allocation type indicator, a starting symbol indicator, a demodulation reference signal OCC length indicator, an MCS table type indicator, an RNTI for the BL-UE, a spatial-layer indicator, or a modulation order indicator. Jumbo grants may, however, also increase the number of blind decodes significantly.

In some cases, decoding candidates for jumbo EL-DCI messages may be associated with different aggregation levels (e.g., no AL 1 candidates, etc.) of the DCI message, and the number of blind decodes performed over a PDCCH or enhanced PDCCH may be different (e.g., larger or smaller, in some cases). In one example, a jumbo grant may be associated with a different set of decoding candidates in a PDCCH or ePDCCH than the EL-DCI message. For instance, the jumbo grant may exclude smaller decoding candidates (e.g., AL1 decoding candidates, AL 2 decoding candidates) or may include only larger decoding candidates (AL 16 decoding candidates). Accordingly, the jumbo grant may be associated with fewer decoding candidates than the EL-DCI message. For example, where {AL1, AL 2, AL 4, and AL 8} decoding candidates for the EL-DCI message may be associated with (6, 6, 2, and 2) potential decoding candidate locations, respectively; the jumbo DCI may use {AL2, AL 4, AL 8, and AL 16} decoding candidates, which may be associated with (6, 2, 2, and 1) potential decoding candidate locations, respectively. The jumbo EL-UE DCI message eliminates the need to maintain a list of candidate BL and/or MIMO UE(s), and most or all necessary parameters can be included, without relying on RRC signaling. However, the additional larger DCI size, on top of the single user DCI size, may result in more PDCCH/ePDCCH blind decoding.

In some examples, the base stations 105 (e.g., nodes) and/or UEs 115 may be configured to use an individual companion DCI message, which may provide information related to the base layer and/or other spatial-layers without substantially increasing (or increasing at all) the number of blind decodes performed by an EL-UE 115. The companion DCI message may be a unicast message that contains information for a co-scheduled UE. The individual companion DCI message may be intended for the EL-UE 115 and may be supplemental to the EL-UE DCI message. The EL-UE DCI message may be used to indicate a schedule for the individual companion DCI message, where the schedule may indicate the location, aggregation level, or decoding candidate format (e.g., via an index) of the individual companion DCI message. In some examples, a location and/or size of the individual companion DCI message may be based on the EL-UE DCI message. For instance, the EL-UE DCI message may indicate a location or an aggregation level of the individual companion DCI message relative to the EL-UE DCI message (e.g., an aggregation level offset, location offset, etc.). In some examples, the EL-UE 115 may determine that the individual companion DCI message is included in the same search space and has the same aggregation level as the EL-UE DCI message. In other examples, an EL-UE 115 may determine that the individual companion DCI message is included in a search space assigned to a predefined RNTI (e.g., a reserved group companion DCI RNTI) known by all EL-UEs 115. The search space may be a subset, superset, or partially overlap with the UE-specific search space for a given UE. The EL-UE DCI message may be used to indicate whether the individual companion DCI message will be included in the PDCCH or ePDCCH, by including a companion DCI indicator field EL-UE DCI message, for instance.

In some examples, an EL-UE 115 may be paired with a BL-UE 115 for at least a portion of a transmission, and may be configured to receive non-orthogonal transmission layers. The EL-UE 115 may detect its self DCI message in a PDCCH, where the self DCI message is being used to provide the detailed scheduling information to the EL-UE 115. The EL-UE 115 may further identify an indication in the self DCI message that a companion DCI message is included in the PDCCH, the companion DCI message carrying information pertaining to a separate transmission to a paired BL-UE 115. In some examples, the BL-UE 115 may be a legacy UE that may not be configured for NOMA-specific processing of transmission layers or the PDCCH. Based on identifying the indication, the EL-UE 115 may determine a location and/or size (e.g., aggregation level) of the companion DCI message in the PDCCH. For instance, the EL-UE 115 may determine the companion DCI message is the same size and is located at a next candidate location in the search space. The EL-UE 115 may receive the transmission from the base station and may decode the transmission based on its self DCI message and the companion DCI message (e.g., using information in the companion DCI message for interference cancellation of the base layer).

In some examples, the companion DCI message may be constructed according to one of a number of formats. For instance, the companion DCI message may be constructed according to a format that conveys information for a single co-scheduled BL or MIMO UE 115 (a "single-UE format"), a format that conveys separate information for multiple BL and/or MIMO UEs (a "multiple-UE format"), a format that conveys merged information for multiple BL and/or MIMO UEs, etc. And the EL-UE 115 may have to determine the format prior to decoding the companion DCI message. In some cases, a CRC portion of the companion DCI message may be used to convey format information to the EL-UE 115. For instance, the CRC portion may be scrambled with an RNTI of a single UE 115 to indicate a single-UE format or a reserved RNTI to indicate a multiple-UE format. In some examples, a number of reserved RNTIs may be available that each correspond to different multiple-UE formats.

Wireless communication system 100 may support techniques for maintaining flexible MU-MIMO scheduling with low control overhead using a group or common companion DCI message. The group companion DCI message may include information about other UEs 115 co-scheduled with a receiving UE 115 on the same resources and different spatial layers. A group companion DCI message may be used in cases where different co-scheduled layers are associated with different transmission time intervals. For example, a UE associated with a first layer having a first TTI may receive a group companion DCI message including information for a second layer having a second TTI. The UE may receive a subsequent control channel transmission corresponding to the first TTI, and already have the information for the second layer from the previously received group companion DCI message. Additionally or alternatively, the UE may receive a grant for resources for the first layer, and receive a companion DCI message at a later time.

In some examples, a group companion DCI message may include a power ratio indication used for interference cancellation. The power ratio indication may also include a power ratio index associated with a power ratio mapping. For example, a UE may use the power ratio index with a lookup table to identify power ratios for interference cancellation. The power ratio index may indicate a single power ratio or multiple power ratios, and in the case where multiple power ratios are indicated, modulation schemes associated with the first layer, the second layer, or both, may be used to determine the power ratio.

In some examples, the group companion DCI message may be sent in addition to self-DCI messages that allocate resources of different spatial layers to each UE. A self-DCI message transmitted to a receiving UE may include a grant of resources for a downlink transmission to the receiving UE on a first spatial layer or first set of spatial layers. The receiving UE may process and decode the companion DCI and identify one or more records included in the companion DCI. In some cases, a record in the companion DCI may include spatial layer usage information for the downlink transmission on the first spatial layer(s) and other spatial layers over a set of resources that overlap with the set of resources granted in the self-DCI message. Specifically, the record may include an indication of an OCC length, modulation order, resource allocation, etc. used for the transmission on the different spatial layer. The receiving UE may use this information to cancel or suppress interference from the transmission on the different spatial layers in order to correctly demodulate the downlink transmission intended for the receiving UE.

Thus, a UE 115 may identify a DCI message and a companion DCI message in a downlink transmission from a base station 105. The DCI message ("self DCI message") may include scheduling information for a grant of resources to the UE 115 in a first layer of the downlink transmission. The companion DCI message may include information for one or more UEs (i.e., may be a unicast or a multicast message) and may include scheduling information for at least one other layer of the downlink transmission. In some cases, the self DCI message may indicate a specific or general location of the companion DCI message to reduce the number of blind decodes used to locate the companion DCI message. The UE 115 may receive and the downlink transmission based on the self DCI message and/or the companion DCI message. For instance, the UE 115 may identify the location of its own data based on the self DCI message and may perform interference cancellation prior to decoding its own data based on the companion DCI message.

Figure 2:
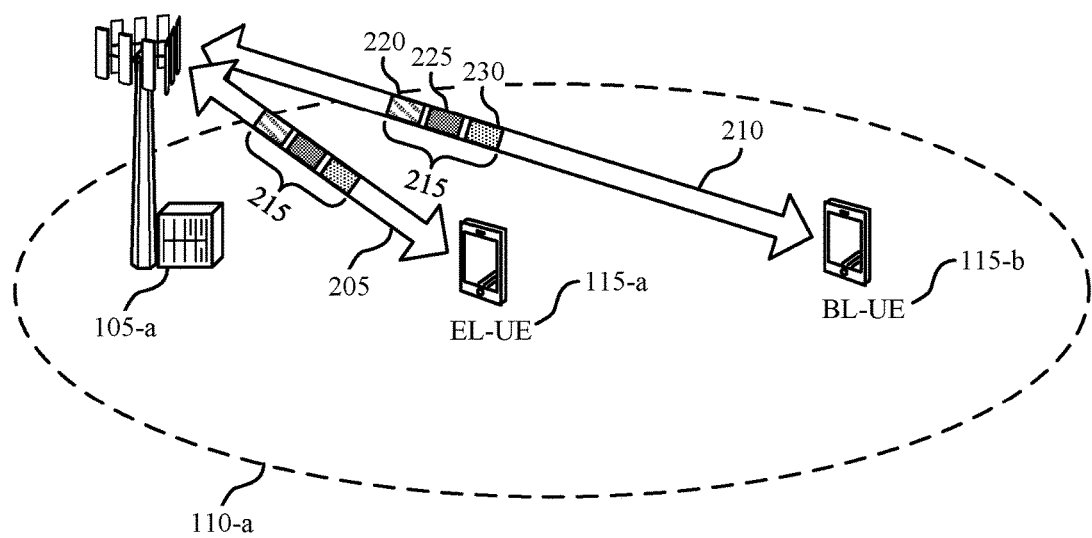
FIG. 2 illustrates an example of a wireless communication subsystem that supports a DCI message designed to support NOMA operation in accordance with various aspects of the present disclosure.

FIG. 2 illustrates an example of a wireless communications subsystem 200 that supports a DCI message designed to support NOMA operation in accordance with various aspects of the present disclosure. Wireless communications subsystem 200 may include EL-UE 115-a, BL-UE 115-b, and base station 105-a which may be examples of a UE 115 or a base station 105 and may communicate with one another as described above with reference to FIG. 1. EL-UE 115 may be capable of operating in a NOMA mode (e.g., configured for interference cancellation of BLs and NOMA-specific processing for the PDCCH), and may be dynamically configured to operate in the NOMA mode by base station 105-a. BL-UE 115 may be capable of operating in the NOMA mode but may not be configured, or may be a legacy UE without any NOMA-specific capabilities.

In the example of FIG. 2, base station 105-a configures EL-UE 115-a to operate as an EL-UE in a NOMA mode (e.g., via RRC signaling, etc.) and pairs EL-UE 115-a with BL-UE 115-b. Subsequently, base station 105-a sends PDCCH 215 to EL-UE 115-a and BL-UE 115-b. PDCCH 215 may include an EL-DCI message 220 (which may be referred to as a "self DCI message") that provides details for an EL 205 of a transmission, a BL-DCI message 225 that provides details for a BL 210 of the transmission, and companion DCI message 230 which also provides details for BL 210. However, whereas BL-DCI message 225 is intended to be received by BL-UE 115-b, companion DCI message 230 is intended for EL-UE 115-a. Additionally, EL-DCI message 220 may include an indicator that indicates whether a companion DCI message (e.g., companion DCI message 230) has been transmitted along with the EL-DCI message 220.

EL-UE 115-a may receive EL 205 of the transmission and may identify the resources allocated to the PDCCH. EL-UE 115-a may then blind decode the PDCCH at predetermined search spaces in search of a DCI message intended for itself. In some cases, EL-UE 115-a may identify EL-DCI message 220 (e.g., self DCI) in the PDCCH and decode EL-DCI message 220 to find that companion DCI message 230 is also included in the PDCCH. In some cases, the location and/or size of the companion DCI message 230 in the PDCCH may be based on the location and/or size of the EL-DCI message 220 (e.g., implicitly or explicitly indicated). For instance, EL-UE 115-a may be configured to know that the companion DCI message 230 is located in the same search space where the EL-DCI message 220 is found and that companion DCI message 230 is the same size—e.g., shares the same aggregation level—as EL-DCI message 220. Furthermore, EL-UE 115-a may be configured to know that the companion DCI message 230 is located in the immediately following DCI candidate location. In other cases, the EL-DCI message 220 includes an explicit indication of the location and/or size of the companion DCI message 230. For instance, the EL-DCI message 220 may include a companion DCI information field that is used to indicate an offset location and/or an aggregation level of the companion DCI message 230, as will be described in more detail below.

After identifying the location of companion DCI message 230, EL-UE 115-a may decode companion DCI message 230. Companion DCI message 230 may include information pertaining to BL 210. In some cases, companion DCI message 230 may include a subset of the information included in BL-DCI message 225. For instance, companion DCI message 230 may include a resource block allocation indicator, a modulation and coding scheme (MCS) indicator, a redundancy version indicator, a traffic-to-pilot ratio indicator, a resource hopping scheme indicator, a resource block allocation type indicator, a starting symbol indicator, a demodulation reference signal orthogonal cover length indicator, an MCS table type indicator, an RNTI for BL-UE 115-b, or any combination thereof. EL-UE 115-a may use this information to cancel BL 210 from a received transmission. After removing the effects of BL 210, EL-UE 115-a may successfully decode EL 205. By contrast, the effect of EL 205 on BL 210 may be low enough that BL-UE 115-b may decode BL 210 without performing specific interference cancellation for EL 205.

Figure 3:
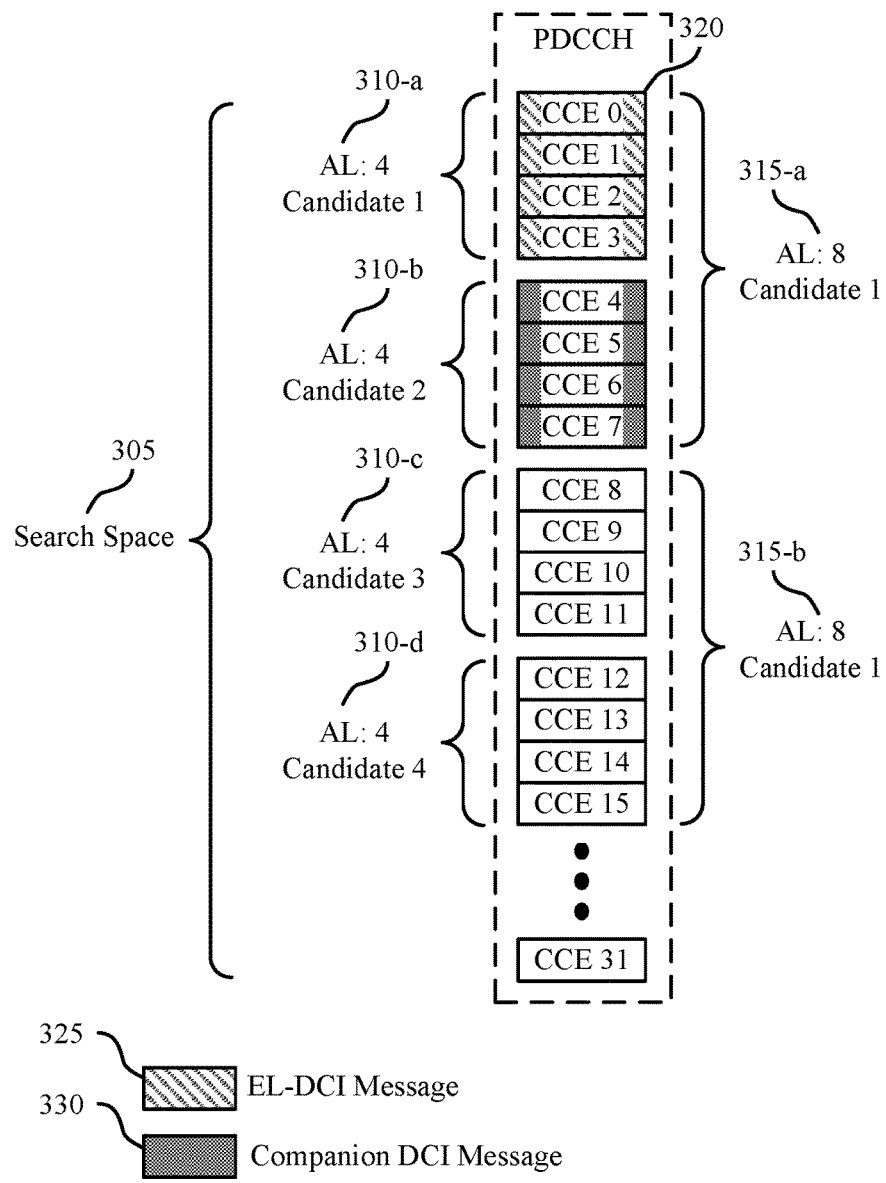
FIG. 3 illustrates an example of a PDCCH including a DCI message designed to support NOMA operation in accordance with various aspects of the present disclosure.

FIG. 3 illustrates an example of a PDCCH 300 that includes a companion DCI message designed to support NOMA operation in accordance with various aspects of the present disclosure. PDCCH 300 may illustrate aspects of a transmission from a base station 105 to one or more UEs 115, as described above with reference to FIGS. 1-2.

PDCCH 300 may be partitioned into search spaces that are common to all of UEs 115 in a network and search spaces that are common to a subset of UEs 115 in the network. Search space 305 is an example search space and may include 32 CCEs 320. The CCEs 320 may be grouped according to aggregation levels. For instance, AL: 4 may include four CCEs 320 while AL: 8 may include eight CCEs 320. The search space may then be further broken down into decoding candidates, such as AL4 candidates 310 and AL 8 candidates 315. A DCI message may be mapped to a decoding candidate based on the amount of information included in the DCI message—e.g., the more information the higher the aggregation level.

In one example, a UE, such as EL-UE 115-a discussed with reference to FIG. 2, may be unaware of the location and/or aggregation level of a DCI message intended for that UE. The UE may therefore rely on a blind decoding procedure in which the UE performs blind decodes of all or a subset of the decoding candidates (which may be specific to the UE) in the search space. That is, the UE may first attempt to decode the first AL: 4 candidate 310-a, then the second AL: 4 candidate 310-b, then the third AL: 4 candidate 310-c, and then the fourth AL: 4 candidate 310-d. If an intended DCI message is not found, the UE may then attempt to decode the first AL: 8 candidate 315-a, and then the second AL: 8 candidate 315-b. In some examples, the UE may stop blind decoding at any time if a DCI message intended for itself is found. The foregoing discussion is exemplary, and the candidates may be searched using alternative orderings.

In the example of FIG. 3, an EL-UE blind decodes the first AL: 4 candidate 310-a. During blind decoding, the EL-UE calculates a CRC value for the information (e.g., a data portion) in the first AL: 4 candidate 310-a and determines if it is for the EL-UE by masking a CRC field of the AL: 4 candidate 310-a value with its RNTI and checking the resultant value against the computed CRC value. The EL-UE determines that the CRC check passes and identifies that the first AL4 candidate 310-a includes the EL-DCI message 325 intended for that EL-UE.

Figure 4A:
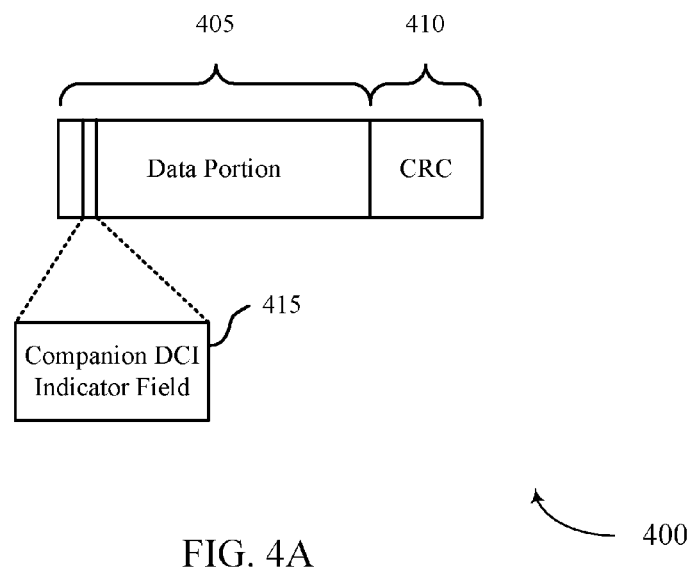
FIG. 4A illustrates an example of an EL-DCI message designed to support NOMA operation in accordance with various aspects of the present disclosure.

FIG. 4A illustrates an example of an EL-DCI message 400, which may be an example of the EL-DCI message 325, designed to support NOMA operation in accordance with various aspects of the present disclosure. The EL-DCI message 325 (which may be referred to as a "self DCI message") may include CRC field 410 for performing the above CRC check. Returning to FIG. 3, the EL-UE then decodes the EL-DCI message 325 and determines that the EL-DCI message 325 includes an indication that the companion DCI message 330 is also included in search space 305. In some cases, the indication that the companion DCI message 330 is included in a companion DCI indicator field 415 as shown in FIG. 4A. The companion DCI indicator field 415 may be included in the data portion 405 of the EL-DCI message 325 and may be implemented using a single bit. In some examples, the bit may be set to '0' to indicate that a companion DCI message is not present in PDCCH 300 or to a '1' to indicate that the companion DCI message 330 is included in PDCCH 300.

In some examples, the EL-UE may also determine a location of the companion DCI message 330 based on the EL-DCI message 325. In some cases, the EL-UE may implicitly determine a location and/or size of the companion DCI message 330 based on the EL-DCI message 325. For instance, the EL-UE may be configured to know that the companion DCI message 330 is also included in search space 305 and may additionally know that the companion DCI message 330 uses a same aggregation level as the EL-DCI message 325 and is located in the following AL: 4 candidate 310-b. In some cases, the companion DCI indicator field 415, as discussed with reference to FIG. 4A, may be used to indicate a location and/or size of the companion DCI message 330. For example, the companion DCI indicator field 415 may be used to indicate a location offset and an aggregation level offset relative to the EL-DCI message 325.

In one example, the companion DCI indicator field 415 may be implemented using two bits where: [00] may be used to indicate that a companion DCI message is not present in PDCCH 300; [01] may be used to indicate that the companion DCI message 330 shares an aggregation level with the EL-DCI message 325 and is located at a first predetermined location (e.g., AL: 4 candidate 310-b, AL: 4 candidate 310-c, or AL: 4 candidate 310-d); [10] may be used to indicate that the companion DCI message 330 shares an aggregation level with the EL-DCI message 325 and is located at a second predetermined location different than the first predetermined location; and [11] may be used to indicate that the companion DCI message 330 has an aggregation level higher than the aggregation level of the EL-DCI message 325 (e.g. AL: 8) and is located at the first predetermined location. The foregoing is just one example for utilizing the two bits in the companion DCI indicator field 415. In some examples, the companion DCI indicator field 415 may be implemented using more than two bits to convey additional or more flexible location and/or size information for the companion DCI message 330.

Figure 4B:
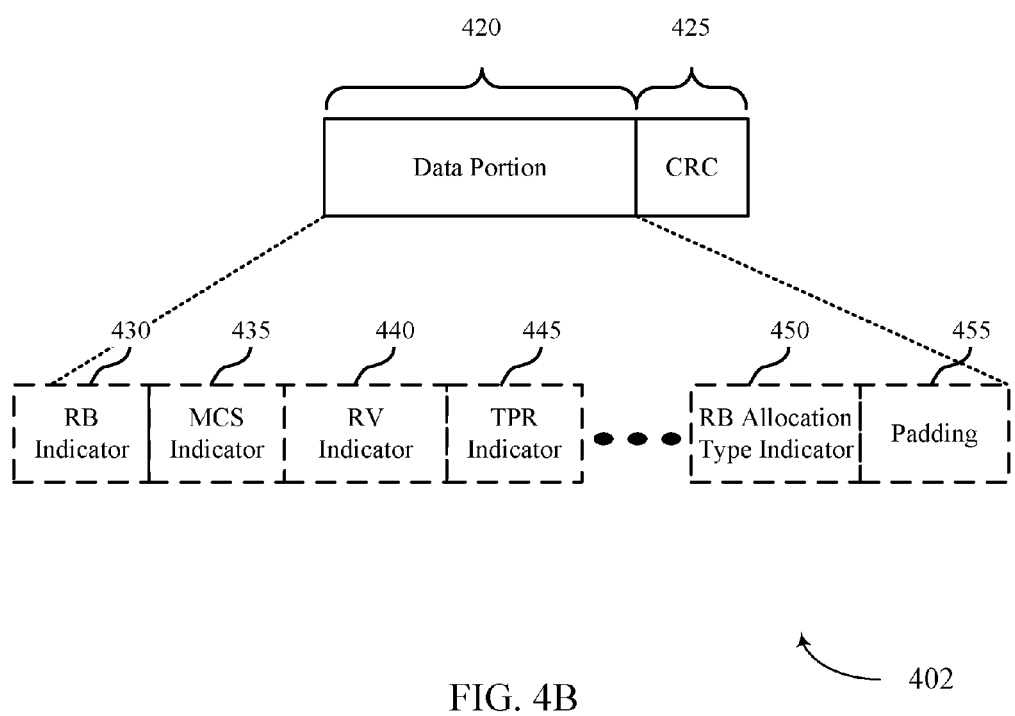
FIG. 4B illustrates an example of a companion DCI message designed to support NOMA operation in accordance with various aspects of the present disclosure.

FIG. 4B illustrates an example of a companion DCI message 402, which may be an example of the companion DCI message 330, designed to support NOMA operation in accordance with various aspects of the present disclosure.

Companion DCI message 402 may include a data portion 420 and a CRC portion 425. The data portion 420 may include one or more of: a resource block allocation indicator 430, a modulation and coding scheme (MCS) indicator 435, a redundancy version (RV) indicator 440, a traffic-to-pilot ratio indicator 445, and/or a resource block allocation type indicator 450. In some examples the data portion 420 may also include a resource hopping scheme indicator, a starting symbol indicator, a demodulation reference signal orthogonal cover length indicator, an MCS table type indicator, or an RNTI of a BL-UE. The companion DCI message 402 may not include some DCI that is included in a self DCI message to the BL-UE such as HARQ process ID, downlink assignment index, new data indicator, transmit power control, SRS request, and the like.

The companion DCI message 402 may optionally include padding 455. Padding 455 may be used to ensure that the length of the companion DCI message 402 is the same length as the EL-DCI message 400. Including padding 455 when needed may eliminate the need for extra decoding, as otherwise the length of the companion DCI message may be unknown. In other cases, padding 455 may reduce the need for additional control information, for instance in cases where additional control information may be included in the companion DCI indicator field 415 to indicate an aggregation level for the companion DCI message 402 that is different than aggregation level of the EL-DCI message 400.

In some examples, the CRC portion 425 may be used to communicate an RNTI of a BL-UE to the EL-UE. For instance, since the location and aggregation level of the companion DCI message 330 is known, the CRC portion 425 may be used for a function other than validation that the DCI message is intended for the EL-UE. Accordingly, the CRC portion 425 of the companion DCI message 330 may be scrambled with (e.g., XOR'ed with) the RNTI of the BL-UE. The EL-UE may then calculate a CRC for the data portion 420 and use the calculated CRC with the received CRC portion 425 to compute the RNTI of the BL-UE—e.g., by XOR'ing the received CRC portion 425 with the calculated CRC. In some examples, a predetermined ("fixed") scrambling code may be used on top of the RNTI of the BL-UE (e.g., to ensure the BL-UE does not incorrectly decode the companion DCI message 402 as intended for the BL-UE).

Figure 4C:
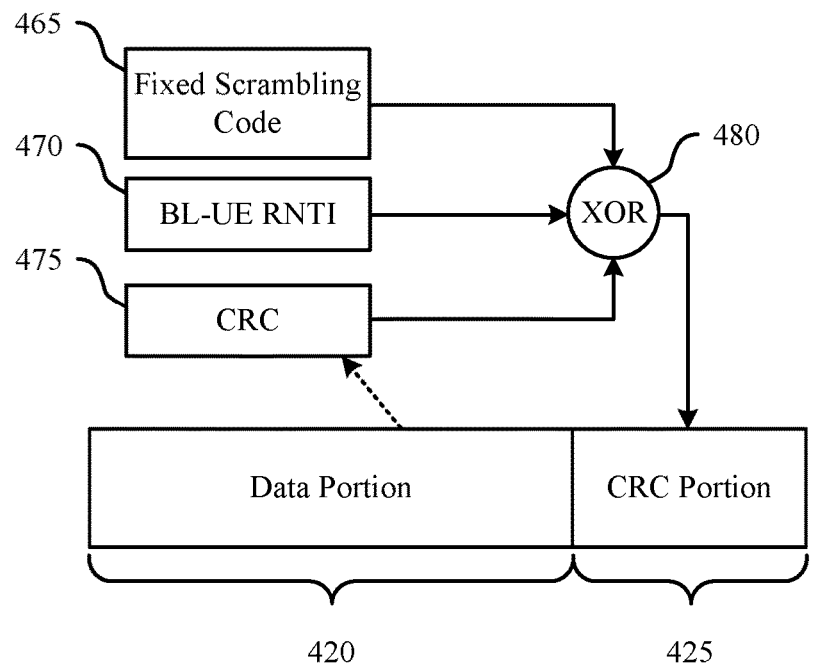
FIG. 4C illustrates an example CRC masking unit for a DCI message designed to support NOMA operation in accordance with various aspects of the present disclosure.

FIG. 4C illustrates an example CRC masking unit 404 for a DCI message designed to support NOMA operation in accordance with various aspects of the present disclosure. The CRC masking unit 404 may be used to mask the CRC portion 425 of companion DCI message 402 with an RNTI of a BL-UE ("BL-UE RNTI"). In order to avoid including an additional field in the data portion 420 to communicate the RNTI of a BL-UE, which may include 16 bits, the BL-UE RNTI 470 may instead be scrambled with the CRC 475 computed for the data portion 420 of companion DCI message 402 at scrambler 480. An additional fixed scrambling code 465 (e.g., '0101010101010101') may be applied to the scrambled CRC at scrambler 480. The additional scrambling may be used to ensure that the BL-UE associated with the BL-UE RNTI 470 does not detect companion DCI message 402 as its own grant—e.g., if the search space of the BL-UE covers the location of the companion DCI message 402. In some examples, the scrambling may include XOR'ing the BL-UE RNTI 470 with both the CRC 475 and the fixed scrambling code 465.

The padding 455 can be a simple zero padding which carries no addition information. Alternatively, padding 455 can be a second CRC based padding which is generating using a second CRC generation function, possibly different from the CRC generation function used to generate CRC 475, with input being a subset (e.g., the earlier portion) of data portion 420. The second CRC can be punctured or repeated to fit into the space of the padding portion and can serve as a stronger error protection when decoding the data portion 420.

When the UE detects in the self DCI message 400 that there is a companion DCI message 402, it will use format information embedded in the companion DCI message 402 (e.g., RNTI detected via CRC portion 425 or a field in the beginning of the data portion 420) to identify the data portion and padding portion. Then it will compute the second CRC for the subset of the data portion 420 using the second CRC function and compare the computed second CRC with the received second CRC to see if they match (e.g., pass CRC checking). If they do not match, the UE may determine that an error has occurred in the decoding of the companion DCI and may discard the companion DCI message 402 for use in interference cancellation or abandon the reception of the packet (e.g., send a negative acknowledgement (NACK) in response to the packet without attempting decoding) instead of possibly introducing PDSCH decoding errors.

Figure 5:
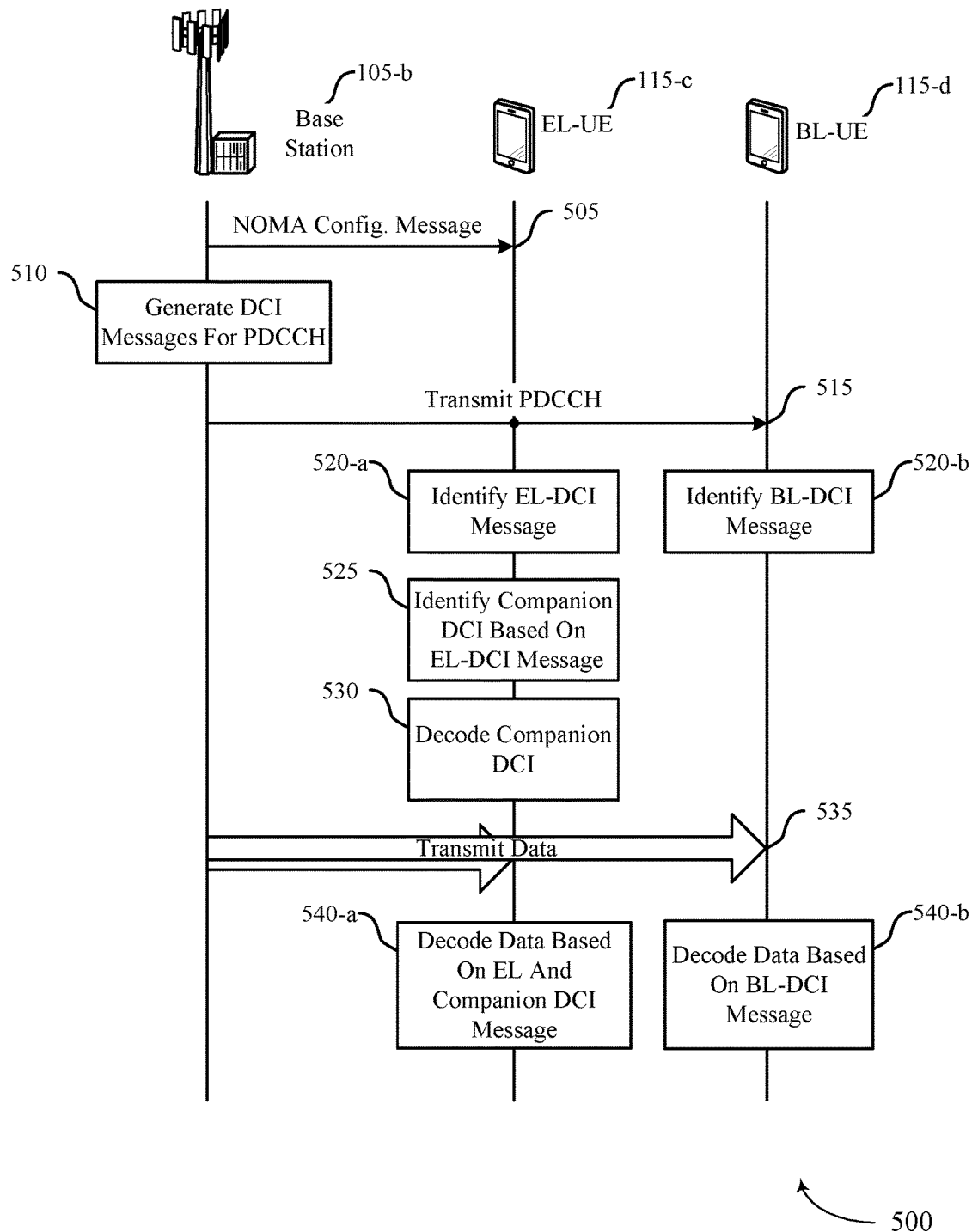
FIG. 5 illustrates an example of a process flow using a DCI message designed to support NOMA operation in accordance with various aspects of the present disclosure.

FIG. 5 illustrates an example of a process flow 500 using a DCI message designed to support NOMA operation in accordance with various aspects of the present disclosure. Process flow 500 may be performed by UE 115-*c*, UE 115-*d*, and base station 105-*b*, which may be examples of a UE 115 and base station 105 described above with reference to FIGS. 1-2. In some examples, base station 105-*b* may transmit a companion DCI message alongside an EL-DCI message intended for EL-UE 115-*c* and a BL-DCI message intended for BL-UE 115-*d* in a PDCCH. EL-UE 115-*c* may use the EL-DCI message to determine a location of the companion DCI message in the PDCCH and may use the EL-DCI message in addition to the companion DCI message in decoding data in a received transmission.

At 505, base station 105-*b* may send a configuration message to EL-UE 115-*c* instructing EL-UE 115-*c* to operate in a NOMA mode. In some cases, the configuration message may be sent to EL-UE 115 via RRC signaling.

At 510, base station 105-*b* may generate DCI messages for respective UEs, including an EL-DCI message for a first transmission layer to EL-UE 115, a BL-DCI message for a second, non-orthogonal transmission layer to BL-UE 115-*d*, and a companion DCI message to include in a control channel (e.g., a PDCCH). In some cases, the EL-DCI message may be used to indicate a schedule for the companion DCI message. The schedule may include any of a location of the companion DCI, an aggregation level of the companion DCI, an index of a decoding candidate, a size of the companion DCI, or a format of the companion DCI. The companion DCI message may be used to communicate information regarding the second transmission layer to EL-UE 115-*c* and may include parameters regarding the second transmission layer to BL-UE 115-*d* as described in FIGS. 2 and 3. In some cases, the companion DCI message may additionally communicate an RNTI of BL-UE 115-*d* by masking a CRC field of the companion DCI message with the RNTI of BL-UE 115-*d*.

At 515, base station 105-*b* may transmit the PDCCH to its supported UEs, which may include EL-UE 115-*c* and BL-UE 115-*d*. Base station 105-*b* may transmit the PDCCH along with the transmission layers (e.g., in PDSCH), where the PDCCH is used to indicate scheduling for the transmission layers. Both EL-UE 115-c and BL-UE 115-c may receive the PDCCH and begin blind decoding.

At 520-a, EL-UE 115-c may identify the EL-DCI message in the PDCCH. Identifying the EL-DCI message may include selecting a search space and blind decoding the selected search space according to different aggregation levels until the EL-DCI message is found. Similarly, at 520-b BL-UE 115-d may identify the BL-DCI message in the PDCCH.

At 525, EL-UE 115-c may use the identified EL-DCI message to determine a schedule (e.g., a location, aggregation level, decoding candidate index, a size, a format, etc.) of the companion DCI message. The EL-DCI message may include a companion DCI indicator field that is used to indicate whether the companion DCI message is included in the PDCCH or not. In one example after determining the companion DCI message is included in the PDCCH, EL-UE 115-c may implicitly determine the schedule of the companion DCI message. That is EL-UE 115-c may be preprogrammed to know that the companion DCI message is located in the same search space as the EL-DCI message, that the length of the companion DCI message is the same length or an offset length of the EL-DCI message, and that the EL-DCI is located in the next decoding candidate or offset within a search space by a predetermined amount.

In another example, EL-UE 115-c may use information provided in the companion DCI indicator field to determine a schedule of the companion DCI message. For example, the companion DCI indicator field may include an explicit indication of an offset aggregation level or a predetermined location of the companion DCI relative to the EL-DCI message, as discussed above with reference to FIGS. 2 and 3.

At 530 EL-UE 115-c may decode the companion DCI. In some cases, EL-UE 115-c may compute a CRC for a data portion of the companion DCI and use the computed CRC and a CRC received in the CRC field of the companion DCI to determine the RNTI of BL-UE 115-d, as described with reference to FIGS. 2 and 3. EL-UE may also determine transmission parameters for the scheduled transmission layer to BL-UE 115-d based on the companion DCI and may use this knowledge in decoding subsequent transmissions.

At 535, base station 105-b may transmit the first transmission layer to EL-UE 115-c according to the EL-DCI message and the second transmission layer to BL-UE 115-d according to the BL-DCI message over the PDSCH. At 540-a, EL-UE 115-c may decode the data received in the first transmission layer based on the EL-DCI and companion DCI messages. That is, EL-UE 115-c may use the information provided in the companion DCI message to perform interference cancellation for the second transmission layer (e.g., symbol-level interference cancellation, codeword-level interference cancellation, etc.). By contrast, at 540-b BL-UE 115-c may decode the second transmission layer using only the BL-DCI message identified at 520-b. It should be noted that certain aspects of the foregoing may be omitted, rearranged, or may occur concurrently. For instance, the transmission of data in the first and second transmission layers at 535 may happen concurrently (e.g., during the same subframe, etc.) with the transmission of the PDCCH at 515 and the processing and decoding of these transmissions may occur at EL-UE 115-c and BL-UE 115-d after reception.

Figure 6:
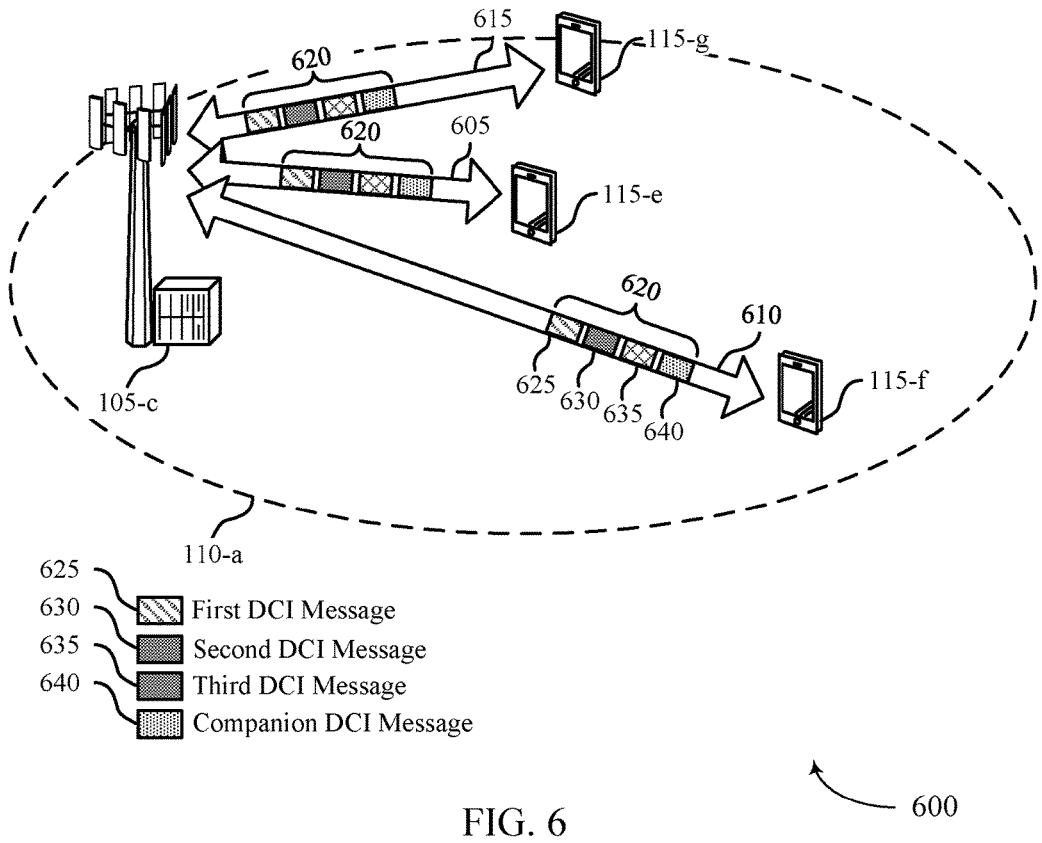
FIG. 6 illustrates an example of a wireless communication subsystem that supports a companion DCI message with multiple user capabilities in accordance with various aspects of the present disclosure.

FIG. 6 illustrates an example of a wireless communications subsystem 600 that supports a companion DCI message with multiple user capabilities in accordance with various aspects of the present disclosure. Wireless communications subsystem 600 may include first UE 115-e, second UE 115-f, third UE 115-g, and base station 105-c which may be examples of a UE 115 or a base station 105 and may communicate with one another as described above with reference to FIG. 1.

First UE 115-e may be capable of operating in a NOMA mode and/or MIMO mode (e.g., configured for interference cancellation of BLs and NOMA-specific processing for the PDCCH), and may be dynamically configured to operate in the different modes by base station 105-c. In some cases, first UE 115-e may be considered a "target device." Base station 105-c may provide a target device with information describing a transmission to a co-scheduled UE to enable the target device to cancel interference from transmissions to the co-scheduled UE. Second UE 115-f may be capable of operating in the NOMA or MIMO modes but may not be configured for NOMA or MIMO operation, or may be a legacy UE without any NOMA-specific capabilities. Third UE 115-g may also be configured to operate in a multi-user (MU)-MIMO mode.

In some examples, base station 105-c may send a PDCCH 620 to first UE 115-e, second UE 115-f, and third UE 115-g. PDCCH 620 may include a first DCI message 625 that provides transmission details for a first layer 605 of a transmission; a second DCI message 630 that provides transmission details for a second layer 610 of the transmission; third DCI message 635 that provides details for a third layer 615 of the transmission, and a companion DCI message 640 which may provide transmission details associated with second layer 610 and/or third layer 615. In some examples, the first layer 605, the second layer 610, and the third layer 615 may use at least partially overlapping time and frequency resources.

First DCI message 625 and companion DCI message 640 may be intended for decoding by first UE 115-e; second DCI message 630 may be intended for decoding by second UE 115-f; and third DCI message 635 may be intended for decoding by third UE 115-g. In some cases, first DCI message 625 may indicate to first UE 115-e whether a companion DCI message (e.g., companion DCI message 640) has been transmitted along with the first DCI message 625, in addition to indicating a resource grant (e.g., a location, aggregation level, format, etc.) for the companion DCI message. In some cases, a CRC portion of the companion DCI message 640 may be scrambled with a UE-RNTI or a reserved RNTI value to indicate a format of the DCI message to first UE 115-e.

Figure 7A:
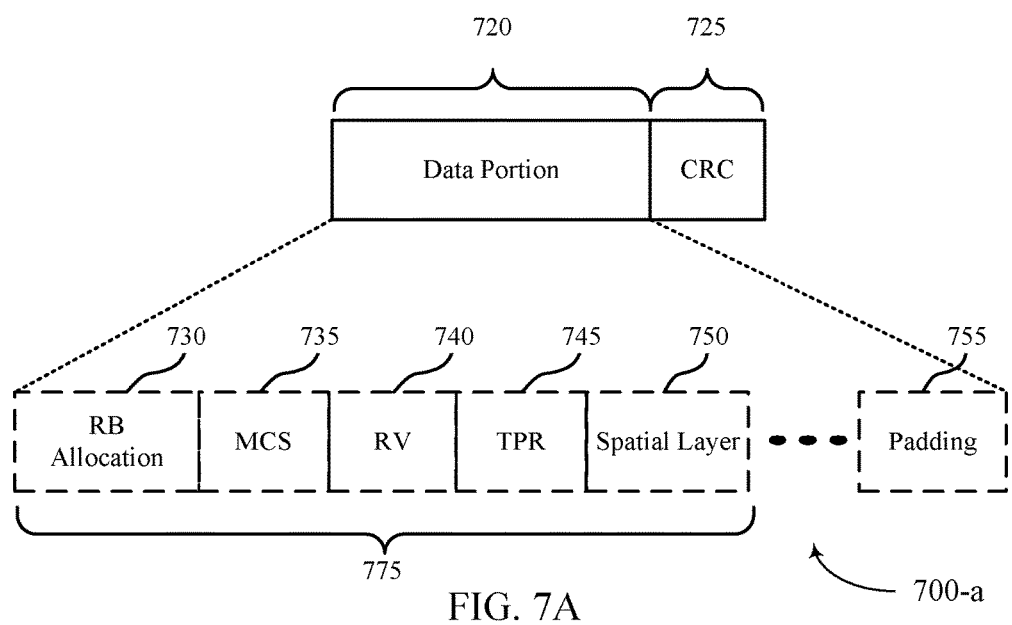
FIGS. 7A through 7C illustrates companion DCI messages constructed according to example formats in accordance with various aspects of the present disclosure.

FIG. 7A illustrates an example companion DCI message 700-a that is constructed according to a single-UE format in accordance with various aspects of the present disclosure. Companion DCI message 700-a may include a data portion 720 and a CRC portion 725 and may be an example of a companion DCI message 640 as described with reference to FIG. 6. Companion DCI message 700-a may be used to convey transmission information (in "a record") for a single co-scheduled UE to a target device (e.g., first UE 115-e). For instance, if the first UE 115-e is co-scheduled with second UE 115-f, the companion DCI message 700-a may include a record for second UE 115-f. Or if first UE 115-e is co-scheduled with third UE 115-g, the companion DCI message 700-a may include a record for third UE 115-g.

Data portion 720 may include a single record 775 corresponding to the single co-scheduled UE. The single record 775 may include sufficient information to enable a target device to decode a transmission to a co-scheduled UE. In some examples, a record 775 may include any of: a resource block allocation field 730, a modulation and coding scheme (MCS) field 735, a redundancy version field 740, a traffic-to-pilot ratio (TPR) field 745, a spatial-layer field 750, and padding 755. In some examples the record 775 may also include a resource hopping scheme field, a resource block type field, an OFDM starting and ending symbol field, a demodulation reference signal orthogonal cover length field, an MCS table type field, an RNTI field for the co-scheduled UE, or a communication mode field.

Resource block allocation field 730 may indicate the resource blocks that have been assigned to the co-scheduled UE. In some cases, resource block allocation field 730 includes a resource block type indicator, which indicates the mapping of the allocated resource blocks. MCS field 735 may indicate a value corresponding to an MCS used in transmitting to the co-scheduled UE. In some cases, the MCS field includes an MCS table type field so that the target device may determine an MCS corresponding to the provided MCS value. TPR field 745 may indicate a power ratio between traffic signals and pilot signals transmitted to the co-scheduled UE. Spatial-layer field 750 may indicate which spatial-layer(s) are being used to transmit to the co-scheduled UE. A communication mode field (not shown) may indicate a technology (e.g., NOMA, MIMO, etc.) used for transmitting to the co-scheduled UE. Padding 755 may be used to extend the length of companion DCI message 700-a to match an aggregation level or size offset from a self DCI message, such as first DCI message 625. In some examples, detection reliability for companion DCI message 700-a may be improved by using the padding 755 to carry an embedded CRC field. The embedded CRC field may have a length equal to a portion or all of the remaining bits in the aggregation level of the companion DCI message 700-a after the record 775. The embedded CRC field may be used for validation of the record 775. If the target UE detects that the record 775 does not pass CRC with the embedded CRC field value, the target UE may consider the companion DCI to be corrupt and process the data transmission without using the companion DCI information (e.g., without attempting interference cancellation of the transmission to the co-scheduled UE, etc.).

In the example of FIG. 7A, CRC portion 725 may be scrambled with an RNTI of a UE (or a "UE-specific RNTI") that is co-scheduled with the target device. And the target device may use the CRC portion 725 to determine that companion DCI message 700-a is constructed according to the single-UE format. For instance, the target device may compute a CRC value from the data portion 720 and may use the computed CRC value along with the CRC value provided in CRC portion 725 to determine the RNTI used to scramble the CRC portion. The target device may then compare the determined RNTI with a list of UE-specific RNTIs and a number of reserved RNTIs. In some cases, the list of UE-specific RNTIs includes RNTIs for UEs that are available for or have previously been co-scheduled with the target UE.

After identifying that companion DCI message 700-a is scrambled with a UE-specific RNTI, the target device may determine that companion DCI message 700-a is constructed according to a single-UE format. The target device may then extract the fields of the record 775 and decode companion DCI message 700-a. The target device may use the information provided in the record to decode the transmission to the co-scheduled UE. In some cases, the co-scheduled transmission may be a multi-layered transmission, and the target device may use the decoded transmission to perform interference cancellation of the one or more transmission layers associated with the co-scheduled transmission (e.g., second layer 610 or third layer 615). For instance, the target device may use the decoded transmission to perform codeword level interference cancellation.

Figure 7B:
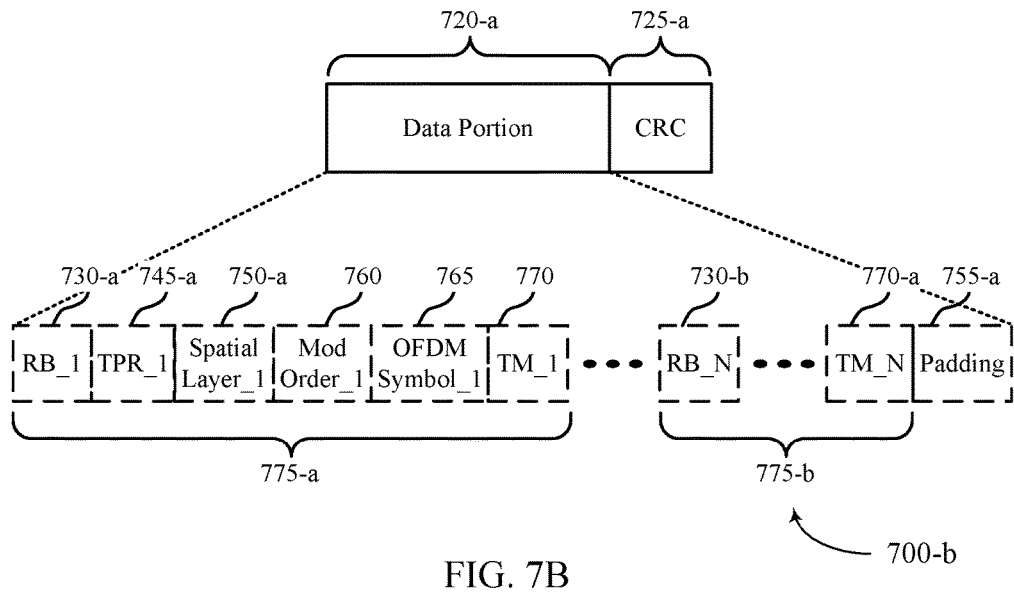

FIG. 7B illustrates an example companion DCI message 700-b that is constructed according to a separate record format in accordance with various aspects of the present disclosure. Companion DCI message 700-b may include a data portion 720-a and a CRC portion 725-a and may be an example of a companion DCI message 640 as described with reference to FIG. 6. Companion DCI message 700-b may be used to convey record(s) for one or more co-scheduled UEs (e.g., second UE 115-f or third UE 115-g) to a target device (e.g., first UE 115-e).

Data portion 720-a may include multiple records 775-a through 775-b for each of the co-scheduled UEs. The multiple records 775-a through 775-b may include sufficient information to enable a target device to locate and analyze symbols of a transmission to a co-scheduled UE. In some cases, a separate record, such as separate records 775-a through 775-b, may carry less data relative to a single record 775 as described with respect to FIG. 7A. A separate record 775 may include one or more of a resource block allocation field 730-a, a TPR field 745-a, a spatial-layer field 750-a, modulation order field 760, OFDM symbol start/end field 765, transmission mode field 770, or padding 755-a. In some examples the data portion 720-a may also include one or more of a resource hopping scheme field, a resource block type field, an OFDM starting and ending symbol field, or a demodulation reference signal orthogonal cover length field. In some examples, a first record 775-a may be associated with a first co-scheduled UE (e.g., second UE 115-f); a second record 775-b may be associated with a second co-scheduled UE (e.g., third UE 115-g); etc. As discussed above, the padding 755-a may be used to carry an embedded CRC field. In some examples, the padding 755-a may have multiple embedded CRC fields corresponding to each of the records 775. The target UE may ignore records which fail CRC validation using the embedded CRC fields.

In an example of FIG. 7B, CRC portion 725-a may be scrambled with a reserved RNTI. In some cases, a number of reserved RNTIs are set aside and each reserved RNTI may indicate a different companion DCI message format. For example, the reserved RNTI used to scramble CRC portion 725-a may indicate to the target UE that companion DCI message 700-b is constructed according to a format where separate records 775-a through 775-b are used to describe transmission layers for each co-scheduled UE. In one example, a first reserved RNTI may be used to indicate that one separate record 775 is included in the companion DCI message 700-b, a second RNTI may be used to indicate that two separate records 775 are included in the companion DCI message 700-b, a third RNTI may be used to indicate that three separate records 775 are included in the companion DCI message 700-b, etc. As above, the target UE may determine the RNTI value used to scramble the CRC portion 725-a, and may compare the determined RNTI value with UE-specific RNTIs and the reserved RNTIs.

In an example of FIG. 7B, the target device may determine that the CRC portion 725-a has been scrambled with a reserved RNTI that indicates that companion DCI message 700-b is constructed according to a separate record format. The target device may then identify the separate records 775-a through 775-b and may extract the fields to decode the companion DCI message 700-b. The target device may use the information provided in separate records 775-a through 775-b to determine the location of the symbols transmitted to the co-scheduled UEs. The target device may analyze the symbols and may perform interference cancellation of these co-scheduled symbols (e.g., the symbols corresponding to transmissions to second UE 115-f and/or third UE 115-g. For instance, the target UE may use the decoded transmission to perform reduced-complexity maximum likelihood (RML) or symbol level interference cancellation (SLIC).

Figure 7C:
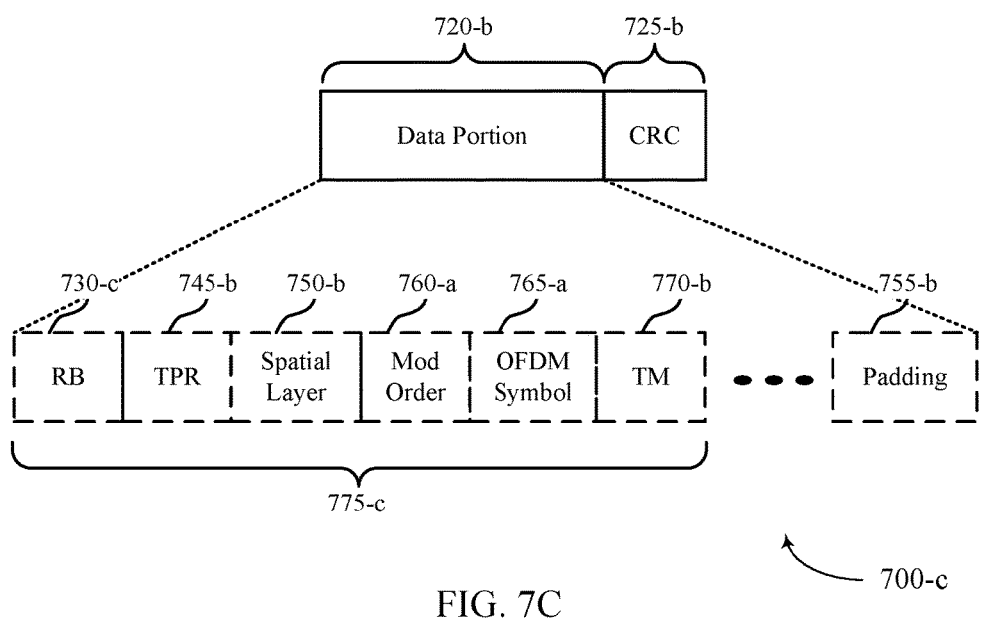

FIG. 7C illustrates an example companion DCI message 700-c that is constructed according to a merged record format in accordance with various aspects of the present disclosure. Companion DCI message 700-c may include a data portion 720-b and a CRC portion 725-b and may be an example of a companion DCI message 640 as described with reference to FIG. 6. Companion DCI message 700-c may be used to convey transmission information for multiple co-scheduled UEs (e.g., second UE 115-f and third UE 115-g) to a target device (e.g., first UE 115-e).

Data portion 720-b may include a single merged record 775-c for the co-scheduled UEs. The merged record 775-c may include sufficient information to enable a target device to locate and analyze symbols of a transmission to a co-scheduled UE. A merged record 775-c may include one or more of a resource block allocation field 730-c, a traffic-to-pilot ratio field 745-b, a spatial-layer field 750-b, modulation order field 760-a, OFDM symbol start/end field 765-a, transmission mode field 770-b, or padding 755-b. In some examples the data portion 720-a may also include a resource hopping scheme field, a resource block type field, an OFDM starting and ending symbol field, or a demodulation reference signal orthogonal cover length field. In some examples, a merged record 775-c may be associated with a first co-scheduled UE (e.g., second UE 115-f), a second co-scheduled UE (e.g., third UE 115-g), etc. As discussed above, the padding 755-b may be used to carry an embedded CRC field used for validation of merged record 775-c.

In an example of FIG. 7C, CRC portion 725-b may be scrambled with a reserved RNTI (e.g., different than the reserved RNTI used to scramble CRC portion 725-a). The reserved RNTI used to scramble CRC portion 725-b may indicate to a target device that companion DCI message 700-c is constructed according to a format that uses a merged record 775-c for multiple UEs. As above, the receiving UE may identify the RNTI value used to scramble the CRC portion and may compare the identified RNTI value with a list of UE-specific and reserved RNTIs.

In an example of FIG. 7C, first UE 115-e may determine that the CRC portion 725-b has been scrambled with a reserved RNTI that indicates the companion DCI message 700-c is constructed according to a merged record format. After determining that the CRC portion 725-a is scrambled with the reserved RNTI, the target device may identify merged record 775-c and may extract the fields to decode the information provided in record 775-c. The target device may treat the merged record 775-c as if the transmission information provided in the merged record 775-c were for a transmission to a single UE. The transmission information may then be used determine the location of and transmission parameters for symbols transmitted to the co-scheduled UEs. The target device may analyze the symbols and may perform interference cancellation (e.g., SLIC, RML, etc.) of these co-scheduled symbols (e.g., the symbols corresponding to second layer 610 and third layer 615).

In some examples, companion DCI message 700-c may convey transmission information for a single co-scheduled UE, and may be sent in place of companion DCI message 700-a. In this way, companion DCI message 700-c may direct the target device to perform symbol level cancellation in place of codeword cancellation techniques for a transmission to the single co-scheduled UE. In some examples, merged records may be used in separate record format of companion DCI message 700-b. That is, the companion DCI message 700-b may include multiple records and one or more of the multiple records (e.g., a separate record 775-a) may convey merged transmission information for transmission to multiple UEs.

In an example of FIG. 6, base station 105-c may configure first UE 115-e to operate in a NOMA mode (e.g., via RRC signaling, etc.), as an enhancement-layer UE, and may pair first UE 115-e with second UE 115-f, a BL-UE. Base station 105-c may identify data for transmission to first UE 115-e and second UE 115-f in a multi-layered transmission, and may use first DCI message 625, second DCI message 630, and companion DCI message 640 to provide transmission details for the different transmission layers of the transmission.

Base station 105-c may construct companion DCI message 640 according to a single-UE format, such as the format used to construct companion DCI message 700-a, and may use companion DCI message 640 to convey DCI for a transmission to second UE 115-f. For instance, base station 105-c may use resource block allocation field 730 to indicate the resource blocks allocated to second UE 115-f, the MCS field 735 to indicate the modulation and coding scheme used to transmit data over the second layer 610, etc. In some cases, base station 105-c may indicate that the spatial-layer field 750 is unused for second UE 115-f (e.g., by setting the field to '0'). In other cases, base station 105-c may omit the spatial-layer field 750 from data portion 720 for transmissions to second UE 115-f, and may indicate a modified single-UE format for the companion DCI message 640 in the first DCI message 625.

Base station 105-c may scramble a CRC portion of the companion DCI message 640 with an RNTI value of second UE 115-f to indicate that the companion DCI message 640 has been constructed according to the single-UE format. Base station 105-c may then transmit PDCCH 620 including the first DCI message 625, the second DCI message 630, and the companion DCI message 640, along with the data transmission. First UE 115-e may receive the first DCI message 625 and determine that the companion DCI message 640 is present (e.g., via an indicator in the first DCI message 625), in addition to determining a schedule (e.g., a location, aggregation level, etc.) for the companion DCI message 640. The schedule may be determined either implicitly (e.g., a known offset may be used for location and aggregation level) or explicitly (e.g., an offset may be included in the first DCI message 625).

First UE 115-e may use the record 775 included in the companion DCI message 640 to decode the transmission to second UE 115-f over second layer 610. First UE 115-e may also use the first DCI message 625 to identify and decode its own transmission over first layer 605. Decoding the transmission may include performing codeword level interference cancellation of the transmission over second layer 610. That is, first UE 115-e may re-modulate the decoded data from the base layer transmission and use the result of the re-modulation while performing interference cancellation. Second UE 115-f may use second DCI message 630 to identify its own transmission over second layer 610 and may decode the transmission without performing interference cancellation. In some cases, second UE 115-f may be a BL-UE and may be unaware of the transmission over the first layer 605.

In another example of FIG. 6, base station 105-c may configure first UE 115-e and third UE 115-g to operate in a MIMO mode. Base station 105-c may then schedule third UE 115-g and first UE 115-e for a MU-MIMO transmission. Base station 105-c may construct a companion DCI message 640 according to a single-UE format, such as the format used to construct companion DCI message 700-a. Base station 105-c may scramble the CRC portion with an RNTI of third UE 115-g and may provide the companion DCI message 640 to first UE 115-e. In this example, base station 105-c may indicate the spatial-layer usage of the third UE 115-g to first UE 115-e (e.g., using spatial-layer field 750). In some examples, base station 105-c may construct an additional companion DCI message intended for third UE 115-g that provides transmission parameters describing the transmission to and spatial layer usage of first UE 115-e. Both third UE 115-g and first UE 115-e may perform interference cancellation (e.g., codeword level, symbol level, etc.) of the other's transmission. In some cases, base station 105-c constructs companion DCI message 640 according to the format used to construct companion DCI message 700-b and includes a single record for third UE 115-g.

In another example of FIG. 6, base station 105-c configures first UE 115-e to operate in a NOMA mode (e.g., via RRC signaling, etc.). For instance, base station 105-c may assign RBs 0-29 of a transmission to first UE 115-e. Base station 105-c may co-schedule first UE 115-e with second UE 115-f and third UE 115-g. Second UE 115-f may be a BL-UE, and base station 105-c may configure third UE 115-g for MIMO. Base station 105-c may use different transmission parameters to transmit to second UE 115-f and third UE 115-g. For instance, the second UE 115-f and third UE 115-g may have different modulation orders, use different spatial-layers, different resource block allocations, etc. Base station 105-c may construct companion DCI message 640 according to companion DCI message 700-b to convey separate transmission records for each of second UE 115-f and third UE 115-g. Accordingly, base station 105-c may scramble the CRC portion using a reserved RNTI that indicates a separate record format has been used to construct companion DCI message.

Base station 105-c may then transmit PDCCH 620 including first DCI message 625, second DCI message 630, third DCI message 635, and companion DCI message 640. First UE 115-e may receive the PDCCH, identify the companion DCI message 640, identify the record provided for the second UE 115-f and the third UE 115-g, and extract the fields from the records. First UE 115-e may then identify and analyze the symbols of the transmissions to second UE 115-f and third UE 115-g to perform symbol level interference cancellation. As above, the second UE 115-f may be a BL-UE and may decode its own transmission according to the second DCI message 630 without knowledge of the transmission over first layer 605 and third layer 615.

In some examples of FIG. 6, base station 105-c may use common transmission parameters to transmit to second UE 115-f and third UE 115-g. And base station 105-c may construct companion DCI message 640 according to the format of companion DCI message 700-c to convey a merged transmission record for the second UE 115-f and third UE 115-g. For example, second UE 115-f may share a TPR, spatial-layer, modulation order, etc. with third UE 115-g, but may have a different resource block assignment (e.g., second UE 115-f may be assigned resource blocks (RBs) 0-9 and third UE 115-g may be assigned RB 20-29). In some cases a portion or all of the resource blocks assigned to second UE 115-f and third UE 115-g may also be assigned to first UE 115-e. Accordingly, base station 105-c may create a single, merged record for both second UE 115-f and third UE 115-g. In this way, the merged record may indicate transmission information for the two transmissions as if the transmissions were to a single UE with a combined resource block assignment.

Base station 105-c may scramble the CRC portion using a reserved RNTI that indicates a merged record format has been used to construct companion DCI message. Base station 105-c may then transmit PDCCH 620 including first DCI message 625, second DCI message 630, and companion DCI message 640. First UE 115-e may receive the companion DCI message 640 and may identify the symbol locations and transmission parameters for the symbols to enable symbol level interference cancellation. For the resource block gap between RB 9 and RB 20, first UE 115-e may assume that no overlapping transmissions are scheduled.

In another example of FIG. 6, base station 105-c configures first UE 115-e to operate in a NOMA and a MIMO mode (e.g., via RRC signaling, etc.) and co-schedules first UE 115-e with second UE 115-f and third UE 115-g. Base station 105-c may additionally configure third UE 115-g to operate in a MIMO mode. In some cases, base station 105-c may co-schedule first UE 115-e with additional MIMO capable UEs. Base station 105-c may use common transmission parameters to transmit to second UE 115-f, third UE 115-g, and the additional MIMO capable UEs. For instance, second UE 115-f and third UE 115-g may have the same modulation orders, resource block allocations, etc., but may use different spatial-layers. In some examples, companion DCI message 640 may include a merged record for second UE 115-f, third UE 115-g, and the additional MIMO UEs so that the record appears to be for a single UE. For instance, companion DCI message 640 may use the spatial-layer field 750-b to indicate that a single transmission spans the spatial-layers used by each of the second UE 115-f, third UE 115-g, and the additional MIMO UEs.

In some cases, the base station 105-c may combine transmission parameters for second UE 115-f, third UE 115-g, and the additional MIMO capable UEs into a merged record only for resource blocks that are shared across the UEs. In some cases, base station 105-c may construct additional companion DCI messages for third UE 115-g and each of the additional MIMO capable UEs using the format of companion DCI message 700-c. The companion DCI message for third UE 115-g may include a merged record with transmission and spatial layer usage information for the transmissions to first UE 115-e and the other MIMO capable UEs as a single transmission. In some cases, second UE 115-g may be transmitted to using a non-uniform constellation and the companion DCI messages may additionally indicate information describing the non-uniform constellation, which may be referred to as a combined symbol constellation.

Base station 105-c may scramble a CRC portion of the companion DCI message 640 with the reserved RNTI that indicates the companion DCI message 640 has been constructed according to a merged format. Base station 105-c may then transmit PDCCH 620 including the first DCI message 625, the second DCI message 630, and the companion DCI messages, along with the data transmission. First UE 115-e and third UE 115-g may each receive their respective first DCI message 625 and third DCI message 635 and the associated companion DCI messages. First UE 115-e may use the transmission information provided in the companion DCI message 640 to perform interference cancellation of the other transmission layers indicated in the companion DCI message 640. Similarly, third UE 115-g may perform interference cancellation of the other transmission layers indicated in its companion DCI message.

Figure 8:
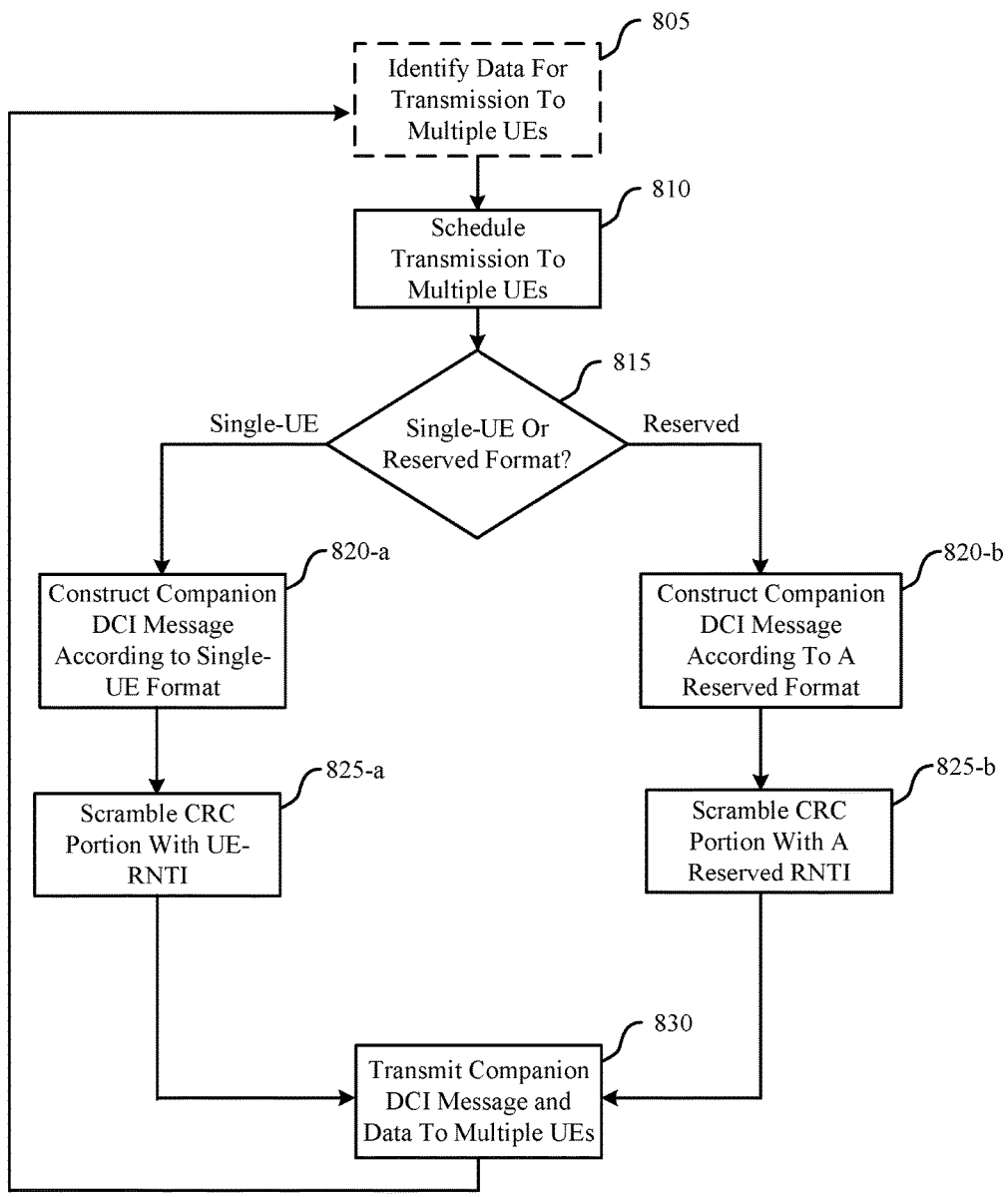
FIGS. 8 and 9 show example flowcharts or operation using a companion DCI message with multiple user capabilities in accordance with various aspects of the present disclosure.

FIG. 8 illustrates an example of a flow chart 800 for a companion DCI message with multiple user capabilities in accordance with various aspects of the present disclosure. For instance, flow chart 800 may be performed by a base station 105 as described above with reference to FIGS. 1-2.

In some examples, flow chart 800 illustrates the construction of a companion DCI message, by a transmitting device (e.g., a base station), according to a desired format (e.g., single-UE, separate record format, merged record format, etc.), in addition to scrambling a CRC portion of the companion DCI message to indicate the format used by the companion DCI message to a target device (e.g., an EL-UE or MIMO-UE). In some examples, a base station may be capable of transmitting using both NOMA and MIMO transmission techniques. The base station may configure (e.g., via RRC signaling, etc.) one or more UEs to operate according to NOMA and/or MIMO techniques. In some examples, the base station sends an indication (e.g., via RRC signaling, etc.) of one or more reserved RNTIs associated with a format of the companion DCI message to the UE. In other examples, the reserved RNTIs and the mapping between the reserved RNTIs and the formats is predetermined and known throughout the network.

At step 805, a base station may identify multiple sets of data intended for transmission to multiple UEs. For instance, the base station may identify a first set of data intended for an EL-UE, a second set of data for a MIMO-UE, and a third set of data for a BL-UE. In another example, the base station may identify a first set of data intended for an EL-UE and a second set of data for one or more MIMO-UEs. In another example, the base station may identify a first set of data intended for an EL-UE and a second set of data for one or more BL-UEs. In another example, the base station may identify a first set of data intended for an EL-UE, a second set of data for one or more BL-UEs, and a third set of data for one or more MIMO-UEs.

At step 810, the base station may schedule a multi-layer transmission comprising each of the sets of data in a respective transmission layer. For instance, the first set of data may be included in an enhancement-layer, the second set of data in a spatially-separated layer, and the third set of data in a base layer. The base station may construct a DCI message for each UE that indicates parameters for the transmission to that UE. The base station may additionally construct one or more companion DCI messages associated with the DCI messages. For instance, the base station may construct a companion DCI message to supplement a DCI message to an enhancement-layer UE and another companion DCI message to supplement the a DCI message to a MIMO capable UE. The companion DCI messages may provide information pertaining to the other transmission layers of the transmission.

At step 815, the base station may determine a format to use for a companion DCI messages (e.g., a single-UE format, multi-UE format, separate record format, merged record format, etc.). Determining the format may be based on the number of and/or type of UEs scheduled in the transmission.

If, at step 815, the base station determines that a single UE has been co-scheduled with the target UE, the base station may proceed to step 820-a. Proceeding to step 820-a may also be based on determining that codeword level interference cancellation should be used by the target UE for cancelling the transmission layer(s) to the co-scheduled UE. At step 820-a, the base station may construct a companion DCI message according to the single-UE format. The single-format may be constructed using aspects of the format used by companion DCI message 700-a, as described with respect to FIG. 7A. The companion DCI message may be used to convey information regarding a transmission to a single co-scheduled UE.

Based on selecting the single-UE format in step 820-a, the base station may scramble a CRC portion of the companion DCI message with a UE-specific RNTI at step 825-a. The UE-specific RNTI may correspond to the RNTI of the co-scheduled UE.

If, at step 815, the base station determines that multiple UEs have been co-scheduled, the base station may proceed to step 820-b. In some cases, proceeding to step 820-b may be based on the base station determining that, although a single UE has been co-scheduled, symbol level interference cancellation is preferred. At step 820-b, the base station may designate a format for the companion DCI message. For instance, the base station may construct the companion DCI message according to a separate record format, such as the format used by companion DCI message 700-b as described with respect to FIG. 7B. The companion DCI message may be used to convey information regarding a transmission to multiple co-scheduled UEs. In some cases, the separate record format may be used to convey transmission information in cases where a small number of UEs are co-scheduled—e.g., where the transmission parameters for the co-scheduled UEs do not exceed a predetermined companion DCI message length. In some examples, the separate record format may be used to convey transmission information for up to three co-scheduled UEs.

In another instance, the base station may construct the companion DCI message according to a merged record format at step 820-b, such as the format used by companion DCI message 700-c as described with respect to FIG. 7C. The companion DCI message may be used to convey information regarding a transmission to multiple co-scheduled UEs so the transmission information appears to be for a single co-scheduled UE. A merged record format may be used if a number of co-scheduled UEs have common parameters and/or to provide transmission information for an increased number of co-scheduled UEs relative to the separate record format.

In some examples, the separate record and merged record formats may be combined. For instance, the separate record format may be modified to convey multiple merged records. In some cases, the base station may use the merged record format to convey transmission information for a single co-scheduled UE—e.g., to trigger the use of symbol level interference cancellation techniques at the UE or to reduce processor usage at the UE. In some examples, the base station may determine which format to use on a dynamic basis, while in other examples, the formats used for the companion DCI message may be predetermined.

At step 825-b, the base station may scramble a CRC portion of the companion DCI message with a reserved RNTI. A number of RNTI values may be reserved and used to indicate different companion DCI formats. For instance, if the separate record format is used, a corresponding reserved RNTI may be used to scramble the CRC portion. Similarly, if the merged record format is used, a corresponding, different reserved RNTI may be used to scramble the CRC portion. In some cases, a single reserved format is used and a single reserved RNTI is used to designate whichever reserved format is used.

At step 830, the base station may transmit a DCI message to each UE scheduled in the transmission and may additionally transmit one or more companion DCI messages constructed as described above based on the scheduled UEs. For instance, the base station may transmit one companion DCI message intended for a first target UE (e.g., an enhancement-layer UE) conveying information regarding transmissions that are co-scheduled with the transmission to the first target UE, and a second companion DCI message intended for a second target UE (e.g., a MIMO capable UE) conveying information regarding transmissions that are co-scheduled with the transmission to the second target UE.

Figure 9:
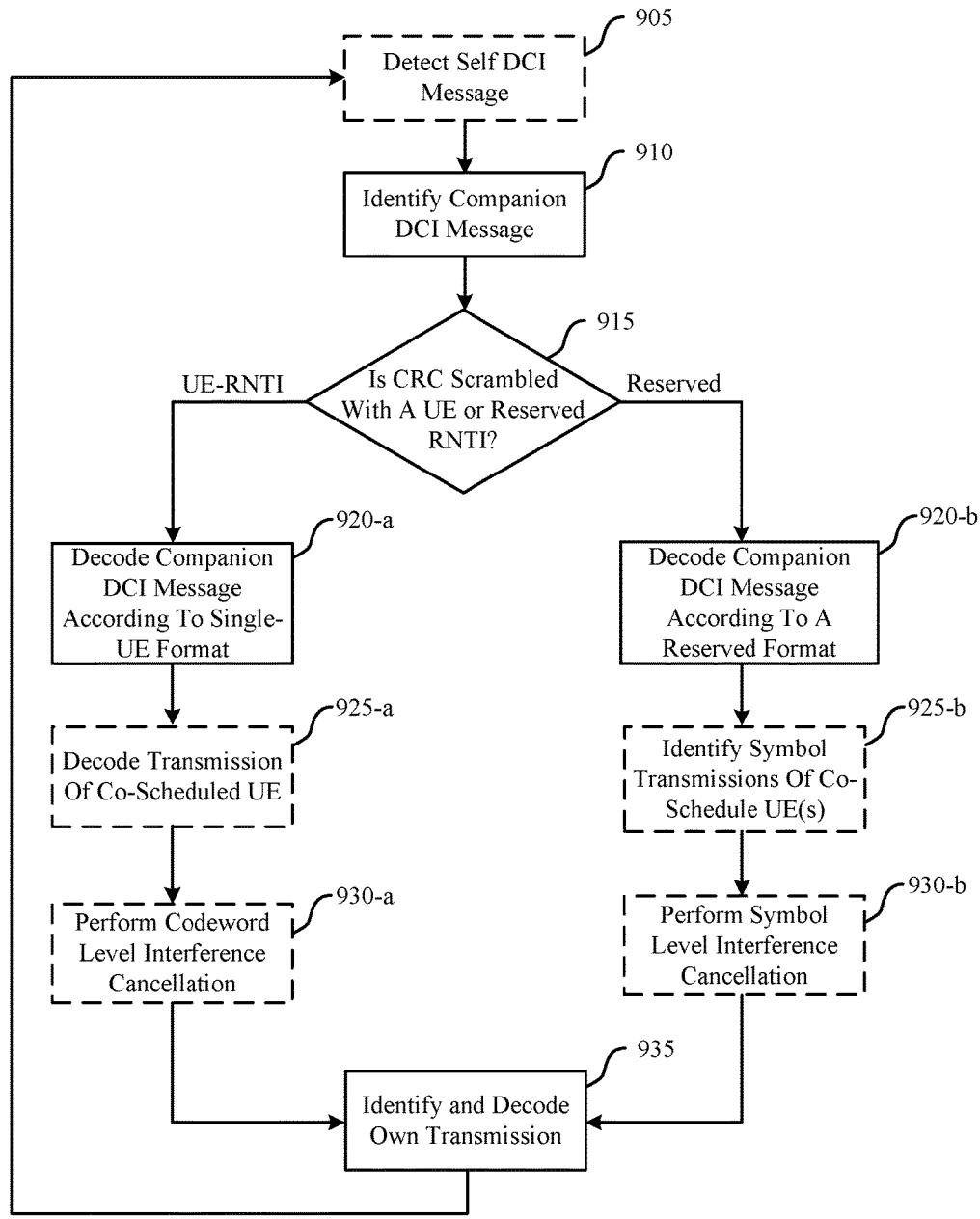

FIG. 9 illustrates an example of a flow chart 900 for a companion DCI message with multiple user capabilities in accordance with various aspects of the present disclosure. Flow chart 900 may be performed by a UE 115 as described above with reference to FIGS. 1-2.

In some examples, flow chart 900 illustrates the receiving of a companion DCI message, by a target device (e.g., an enhancement-layer UE or MIMO capable UE) and the determination of a format of the companion DCI message (e.g., single-UE, separate record format, merged record format, etc.), by determining a value used to scramble a CRC portion of the companion DCI message. In some examples, a UE may be capable of and configured to operate in a MIMO or NOMA transmission mode. The UE may also receive an indication (e.g., via RRC signaling, etc.) of one or more reserved RNTIs and a mapping between the RNTIs and associated companion DCI message formats. In some cases, the reserved RNTIs and the mapping are predetermined and known throughout the network.

At step 905, the UE may detect a self DCI message in a PDCCH including information for an upcoming transmission to the UE. The upcoming transmission may be a multi-layered transmission and may include data for other co-scheduled UEs. In some cases, the self DCI message includes an indication of whether a companion DCI message has been scheduled and is indicative of a schedule (e.g., location, aggregation level, format, associated transmission mode, etc.) for the companion DCI message. In some examples, the self DCI message indicates whether the companion DCI message is intended for MU-MIMO operation or NOMA operation, or both.

At step 910, the UE may identify the companion DCI message based on the self DCI message. The companion DCI message may include a data portion and a CRC portion and may be constructed according to any of the formats used to construct companion DCI message 700-a through 700-c as described with reference to FIGS. 7A to 7B.

At step 915, the UE may determine the format used by the companion DCI message. Determining the format may include determining a scrambling code used for the CRC portion of the companion DCI message. For instance, the UE may determine whether the CRC portion is scrambled with an RNTI of a co-scheduled UE (a "UE-RNTI") or a reserved RNTI.

If, at step 915, the UE determines that the CRC portion is scrambled with a UE-RNTI, the method may proceed to step 920-a. At step 920-a, the UE may decode the companion DCI message according to the single-UE format. Decoding the companion DCI message may include extracting the fields from the companion DCI message and determining the transmission parameters for the transmission to the single co-scheduled UE. The transmission parameters included in the companion DCI message may be sufficient to allow the UE to identify and decode the transmission to the co-scheduled UE. After determining the transmission parameters, the method may proceed to step 925-a.

At step 925-a, the UE may decode the transmission to the co-scheduled UE based on the parameters included in the companion DCI message and may proceed to step 930-a. For example, the UE may perform de-mapping and decoding of the transmission to the co-scheduled UE.

At step 930-a, the UE may perform codeword level interference cancellation of the transmission to the co-scheduled UE. Codeword level interference cancellation may include encoding and re-mapping the data decoded at step 925-a to symbols, and cancelling interference from the co-scheduled transmission layer based on the re-mapped symbols. As mentioned above, the UE may use the record provided in the companion DCI message to decode the co-scheduled transmission.

If, at step 915, the UE determines that the CRC portion is scrambled with a reserved RNTI, the method may proceed to step 920-b. At step 920-b, the UE may decode the companion DCI message according to a corresponding format (e.g., separate record format, merged record format, etc.). For instance, the UE may decode the companion DCI message according to the separate record format. Decoding the companion DCI message may include identifying a record for each co-scheduled UE. In some cases, the companion DCI message includes one or more records, where each record conveys transmission information for a single co-scheduled UE. In some examples, different reserved RNTIs may be used to indicate the different separate record format used. In other cases, a single format is used to construct separate record companion DCI messages. The UE may then extract the fields from the companion DCI message and determine the transmission parameters for the transmissions to each co-scheduled UE. The transmission parameters included in the companion DCI message may be sufficient to allow the UE to identify the locations of and transmission parameters for symbols of the transmissions to the co-scheduled UEs. After determining the transmission parameters, the method may proceed to step 925-b.

At step 925-b, the UE may identify the symbol location and periods of the one or more transmissions to the one or more co-scheduled UEs. The UE may then analyze the signal received at the symbol locations for the identified periods and may proceed to step 930-b.

In another instance, the UE may decode the companion DCI message according to the merged record format. Decoding the companion DCI message may include extracting the fields from the companion DCI message and determining the transmission parameters for the transmissions to the multiple co-scheduled UEs. However, in the case of the merged record format, it may appear to the UE as if the transmission parameters are for a transmission to a single co-scheduled UE. The transmission parameters included in the companion DCI message may be sufficient to allow the UE to identify the locations of and transmission parameters for symbols of the transmissions to the co-scheduled UEs. After determining the transmission parameters, the method may proceed to step 925-b.

In some examples, the UE may determine whether the identified reserved RNTI corresponds to a merged record format or a separate record format by comparing the RNTI value determined at step 920-b with a list of reserved RNTI values. The list of reserved RNTI values may include a mapping between the reserved RNTI values and the available formats. In other examples, a single format used to construct the companion DCI message and single RNTI value may be predetermined (e.g., by the network). The UE may use this knowledge to identify the format of the companion DCI message.

At step 930-*b*, the UE may perform symbol level interference cancellation of the transmission to the co-scheduled UE. Symbol level interference cancellation (e.g., SLIC, RML, etc.) may include identifying location of symbols of the transmission to the co-scheduled UE and cancelling interference from the co-scheduled transmission layer based on the received symbols and the transmission parameters determined from the record(s) provided in the companion DCI message.

At step 935, the UE may identify its own transmission based on the received self-DCI message. UE may then utilize the above interference cancellation techniques in decoding the received transmission.

Figure 10:
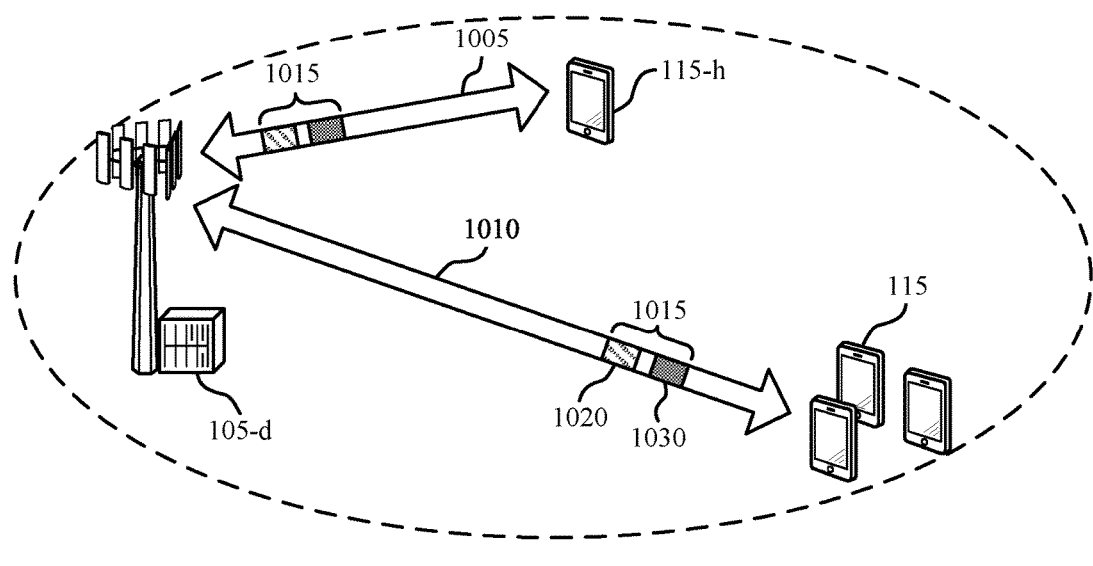
FIG. 10 illustrates an example of a wireless communication subsystem that supports a group companion DCI design in accordance with aspects of the present disclosure.

FIG. 10 illustrates an example of a wireless communications subsystem 1000 that supports a group companion DCI message design in accordance with various aspects of the present disclosure. Wireless communications subsystem 1000 may include UE 115-*h*, multiple co-scheduled UEs 115, and base station 105-*d*, which may be examples of UEs 115 or a base station 105 and may communicate with one another as described above with reference to FIG. 1. Wireless communications subsystem 1000 may, for example, use one or more records in a group companion DCI message to indicate resources associated with a transmission layer.

UE 115-*h* may be capable of operating in a NOMA mode and/or MIMO mode (e.g., configured for interference cancellation of BLs and NOMA-specific processing for the PDCCH), and may be dynamically configured to operate in the different modes by base station 105-*d*. In some cases, first UE 115-*h* may be considered a "target device." Base station 105-*d* may provide the target device with information describing a transmission to multiple co-scheduled UEs 115 to enable the target device to cancel interference from transmissions to the multiple co-scheduled UEs. The multiple co-scheduled UEs 115 may similarly be capable of operating in NOMA or MIMO modes, may not be configured for NOMA or MIMO operation, or may be legacy UEs 115 without any NOMA-specific capabilities. Additionally or alternatively, UE 115-*h*, co-scheduled UEs 115, and base station 105-*d* may be capable of low latency communication. That is, these devices may communicate with each other using TTIs that are shorter in duration relative to other TTIs in the system, which may reduce the time between transmissions.

Base station 105-*d* may provide transmission information for multiple transmission layers to UE 115-*h* and multiple co-scheduled UEs 115. For example, base station 105-*d* may send a control channel 1015 to first UE 115-*h* and multiple co-scheduled UEs 115, where control channel 1015 may further include first DCI message 1020 that provides information for a first layer 1005 of a transmission and a companion DCI message 1030 which may provide transmission information associated with second layer 1010 of the transmission. In some examples, first layer 1005 and second layer 1010 may use at least partially overlapping time and/or frequency resources.

Companion DCI message 1030 may be transmitted within a common search space (CSS) in control channel 1015. That is, companion DCI message 1030 may occupy resources corresponding to a CSS of one or more component carriers (e.g., a primary component carrier or secondary component carrier). Accordingly, companion DCI message 1030 may be accessed by multiple UEs 115 and provide information on the resources assigned to co-scheduled UEs 115. For example, first DCI message 1020 may be intended for decoding by UE 115-*h*. Companion DCI message 1030 may be intended for decoding by any of the UEs 115, and provide transmission information associated with second layer 1010. In some cases, the length of companion DCI message 1030 may correspond to a certain DCI format (e.g., DCI format 1A) such that any of the UEs 115 may decode companion DCI message 1030 without additional blind decoding. For instance, a UE 115 may search for DCI messages having a same length (for a given aggregation level) as DCI format 1A within a CSS to decode companion DCI message 1030. The UE 115 may then use a predefined RNTI to distinguish companion DCI message 1030 from other DCI messages within the CSS. Companion DCI message 1030 transmitted within a CSS may thus avoid extraneous blind decoding by the UEs 115.

Additionally or alternatively, companion DCI message 1030 may be transmitted within a search space other than the CSS. For example, a CRC field within companion DCI message 1030 may be scrambled by a predefined RNTI known to all EL-UEs, which may be treated as a special cell-RNTI (C-RNTI) (e.g., group DCI C-RNTI). The companion DCI message 1030 may be placed in a search space corresponding to the predefined RNTI. Accordingly, a UE 115 may use the predefined RNTI to locate the decoding candidates for blind decodes, and detect companion DCI message 1030 in the UE-specific search space (e.g., the predefined RNTI may be used to descramble the CRC to determine whether a decoding result is a valid companion DCI message).

When companion DCI message 1030 is transmitted in a search space different from the CSS, additional resources may be available for the transmission of companion DCI, but additional blind decoding may be performed by a UE 115. In some examples, companion DCI message 1030 may have a different length than other DCI messages, and zero padding may not be needed, enabling efficient DCI transmission. In some cases, the number of blind decoding attempts may be reduced by restricting decoding candidates for companion DCI messages within the UE-specific search space. For example, decoding candidates associated with certain aggregation levels (e.g., AL1, AL2, etc.) may be dropped.

In some examples, companion DCI message 1030 may include information on resources assigned to multiple co-scheduled UEs 115, a power ratio indication, an indication of the starting and ending symbol of the companion DCI message, an indication of other types of control information, or combinations of these types of information.

Sets of resources (e.g., one or more RBs) indicated by companion DCI message 1030 may be grouped or categorized into records based on TM, PMI, and/or RI for the RBs. That is, sets of RBs associated with the same TM, PMI, and/or RI may be represented by the same record. In some cases, transmission configuration information (i.e., TM/PMI/RI information) associated with multiple UEs 115 may be included in the same record. As an example, two co-scheduled UEs 115 may be scheduled for respective sets of resources and with the same TM, PMI, and RI, and both sets of resources may be indicated in a single record. In some cases, there may not be a limit to the number of different co-scheduled UEs 115 that can share a record, and the total number of records may thus be smaller than the total number of co-scheduled UEs 115.

Companion DCI message 1030 may have a static or dynamic AL. For instance, the AL of companion DCI message 1030 may be based on an AL associated with first DCI message 1020. That is, if the AL of first DCI message 1020 uses four CCEs, the AL of companion DCI message 1030 may also use four CCEs. The AL of companion DCI message 1030 may also be higher (i.e., use more CCEs) than the AL of first DCI message 1020.

UE 115-*h* may compare a received resource grant to the transmission information provided by the records in companion DCI message 1030. For example, UE 115-*h* may receive first DCI message 1020 (including a resource grant on the EL) and companion DCI message 1030 in the same subframe. After receiving the resource grant, UE 115-*h* may compare the granted EL resources with the records included in companion DCI message 1030. If any of the records match the granted resources, UE 115-*h* may determine the transmission configuration for the BL for the granted resources.

In some cases, the structure of the records in the companion DCI message 1030 are independent of the first DCI message 1020. That is, the companion DCI message 1030 may be independently decodable by UEs 115 scheduled on the EL (e.g., without information in the first DCI message 1020 indicating applicable records for the UE 115-*h*). Because the companion DCI message 1030 is independently decodable, the format of the first DCI message 1020 may not need to be changed to support resource grants for EL-UEs. Instead, UE 115-*h* may combine first DCI message 1020 with companion DCI message 1030 to determine how to process the granted resources on the EL.

In some cases, first layer 1005 and second layer 1010 may use different TTI lengths. In low latency operation (e.g., short TTI), the control channel resources may be limited and increasing the amount of DCI for EL-UEs may negatively impact the channel capacity. Thus, use of group companion DCI sent in the control region of the BL may reduce control channel overhead for a low latency EL.

In some examples, first layer 1005 may be associated with a TTI that is shorter than the TTI associated with second layer 1010. As an example, first layer 1005 may be associated with a shorter TTI (e.g., two symbols, a slot, etc.) and second layer may be associated with a longer TTI (e.g., 1 ms). In such cases, base station 105-*d* may not know which resources of the BL will be co-scheduled resources with EL transmissions occurring in later EL TTIs overlapping with the same BL TTI. Base station 105-*d* may send companion DCI message 1030 at the beginning of a BL TTI that include companion DCI for resources of second layer 1010 even if it is unknown whether the second layer resources will be used by UE 115-*h* at the time of transmission of the companion DCI message. In one example, companion DCI message 1030 may be sent at the beginning of a 1 ms TTI grant for potential NOMA use in the TTI, and base station 105-*d* may determine at a later time whether to schedule low-latency communications, and subsequently send a PDCCH for short TTI (sPDCCH) with first DCI message 1020 to a low-latency UE 115 associated with first layer 1005 (e.g., UE 115-*h*). The low latency UE 115 may have already identified the information for second layer 1010 from the previously transmitted companion DCI message 1030. In another example, first layer 1005 may be associated with a two-symbol TTI and second layer 1010 may be associated with a one slot (e.g., 0.5 ms) TTI. Accordingly, a UE 115 scheduled to use first layer 1005 and capable of communications using two-symbol TTIs (e.g., UE 115-*h*) may monitor for companion DCI message 1030 in a PDCCH region of the one slot TTI of second layer 1010. In such cases, the PDCCH region for the one slot TTI of second layer 1010 may be shared with the two-symbol TTI of first layer 1005, and the control regions for both layers may start in the same OFDM symbol period.

In some examples, first layer 1005 may be associated with a TTI that is longer than a TTI associated with second layer 1010 (e.g., first layer 1005 uses a 1 ms TTI and second layer 1010 uses a one slot TTI, first layer 1005 uses a one slot TTI and second layer uses a two-symbol TTI, etc.). In such cases, a UE scheduled with first layer 1005 may need to be capable of monitoring for companion DCI message 1030 transmitted in a control channel region (e.g., PDCCH/sPDCCH) of second layer 1010. Companion DCI message 1030 may be transmitted by base station 105-*d* at a later time than the control channel region for first layer 1005. The UE scheduled for first layer 1005 may monitor for several companion DCI messages in different TTIs for the second layer 1010 within a single TTI for the first layer 1005.

Although discussed above as carrying DCI for a BL, companion DCI message 1030 may be used to provide information associated with an EL to co-scheduled BL-UEs 115, in some cases. That is, companion DCI message 1030 may be configured to include information for first layer 1005 in addition to or as an alternative to information for second layer 1010. Companion DCI messages 1030 including information for first layer 1005 may be structured in the same way that companion DCI messages including information for second layer 1010 are structured. As an example, companion DCI message 1030 may include information for first layer 1005 using one or more records to describe first layer operation, and may use the same record structure as a companion DCI message that includes information on second layer 1010.

In some cases, different predefined RNTIs may be used to distinguish a companion DCI message that includes first layer information from a companion DCI message that includes second layer information. Different companion DCI messages 1030 may also be distinguished by a flag included in the payload. BL-UEs 115 may be able to operate without receiving the companion DCI including information for an associated EL; however, using the information for an EL, a BL-UE 115 may be able to configure its receivers more accurately and may thus achieve improved performance. A base station may determine when to transmit companion DCI message 1030 including EL information (e.g., companion DCI messages with EL information may be transmitted opportunistically when control resources are available).

Figure 11:
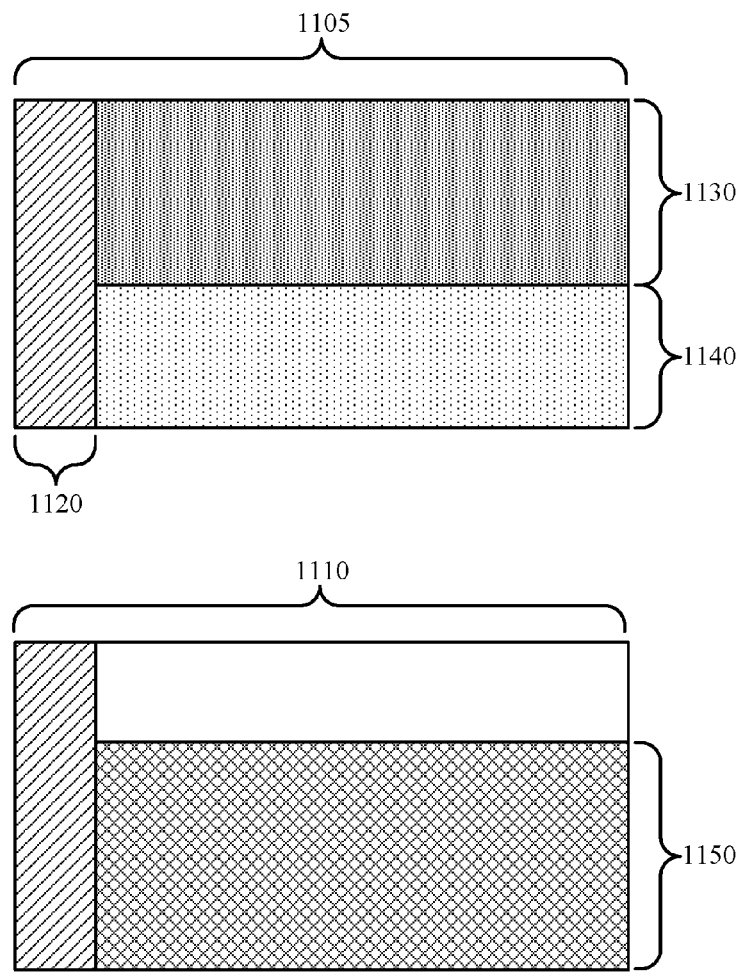
FIG. 11 illustrates an example of scheduled resources in a system that supports a group companion downlink control information design in accordance with various aspects of the present disclosure.

FIG. 11 illustrates an example of scheduled resources 1100 in a system that supports a group companion DCI design in accordance with various aspects of the present disclosure. Scheduled resources 1100 may be an example of a TTI, or some other set of resources scheduled for use by UEs 115 in a wireless communications system.

Scheduled resources 1100 may include first layer resources 1110 and second layer resources 1105. First layer resources 1110 may be scheduled for a first layer of a downlink transmission (e.g., an enhancement layer) and second layer resources 1105 may be scheduled for a second layer of the downlink transmission (e.g., a base layer). First layer resources 1110 and second layer resources 1105 may be examples of overlapping time-frequency resources (e.g., the same subcarriers and symbol periods).

Scheduled resources 1100 may include control channel 1120 that is allocated for both first layer resources 1110 and second layer resources 1105. Control channel 1120 may be an example of a PDCCH or sPDCCH, or may be some other physical control channel. In some cases, a portion of scheduled resources 1100 allocated for control channel 1120 may determine where certain information is transmitted (e.g., in a first N symbol periods of a downlink subframe). Control channel 1120 may include multiple DCI messages, including one or more companion DCI messages.

Different sets of resources illustrated within scheduled resources 1100 may correspond to resources granted to specific devices. That is, second layer resources 1105 may include a first resource set 1130 for a first UE 115 and a second resource set 1140 for a second UE 115 allocated on the base layer. Similarly, first layer resources 1110 may include a third resource set for a third UE 115 allocated on the enhancement layer. In some examples, each resource set may include one or more RBs of the PDSCH.

In some examples, a UE 115 may identify, in control channel 1120, a DCI message that includes a grant for third resource set 1150. The UE may also identify a companion DCI message that includes a record including DCI indicating the transmission configuration for a region of the second layer resources 1105. The record may indicate DCI for a region of the second layer resources spanning multiple co-scheduled UEs 115 (e.g., first resource set 1130 and second resource set 1140). Although not illustrated in FIG. 11, the companion DCI message may include other records with DCI for other sets of resources (which each may include DCI for regions having co-scheduled UEs). The UE may use the information in the companion DCI message to determine the transmission configuration for the portions of the base layer overlapping with the granted resources for the enhancement layer.

Figure 12A:
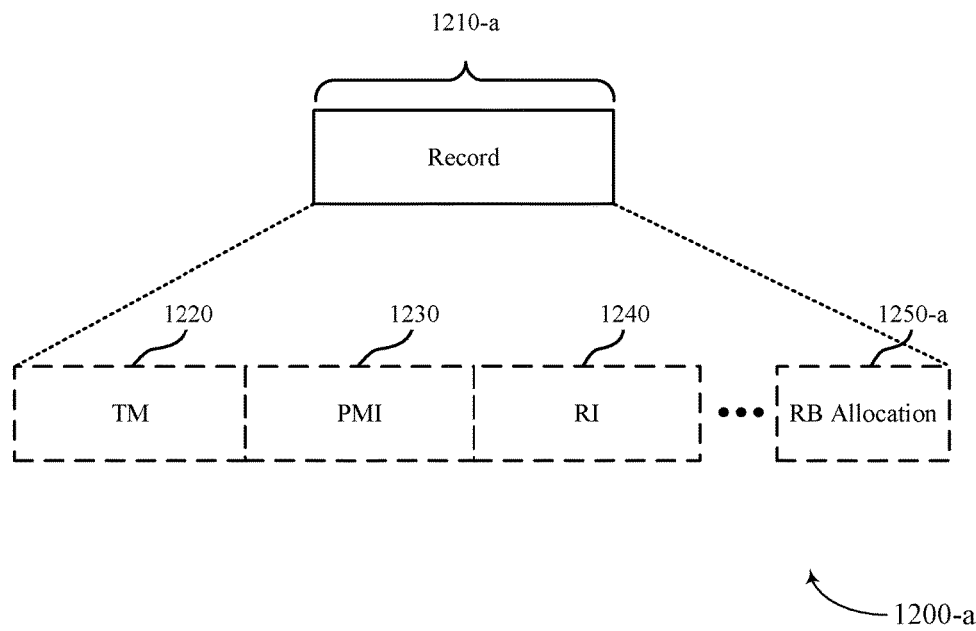
FIGS. 12A and 12B illustrate examples of records used in a companion DCI that support a group companion downlink control information design in accordance with various aspects of the present disclosure.
Figure 12B:
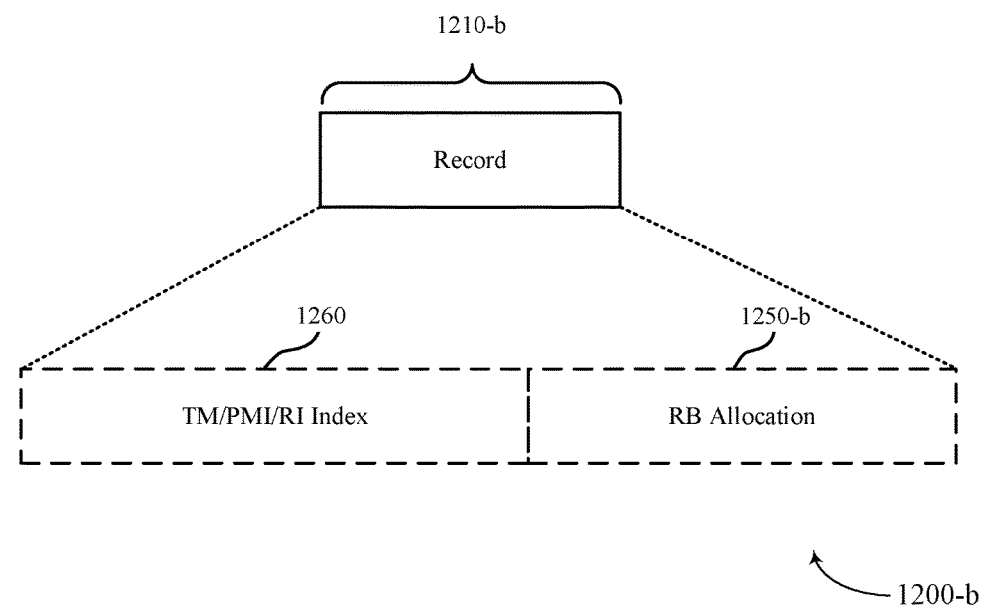

FIGS. 12A and 12B illustrate examples of records 1200-a and 1200-b that support a group companion DCI design in accordance with various aspects of the present disclosure. The records 1200-a and 1200-b may be examples of one or more records included within a companion DCI message, such as companion DCI message described with reference to FIG. 10.

In the example of FIG. 12A, record 1210-a may include information on transmission configurations for sets of resources of a transmission layer. As an example, a UE 115 may receive a grant on a first transmission layer, and use the information included in record 1210-a to determine one or more transmission configurations for resources of a second transmission layer. Record 1210-a may include a TM field 1220, a PMI field 1230, an RI field 1240, and an RB allocation field 1250-a.

RB allocation field 1250-a may indicate the RBs for which the record 1210-a applies, which may span resources granted on the second transmission layer to one or more co-scheduled UEs 115. The RB allocation field 1250-a may indicate the RBs in various ways (e.g., a bitmap, starting RB and length, etc.), and may include an indication of RBs within predetermined subsets or virtual RBs (e.g., remapped to physical resources). As an example, a UE 115 may compare its own granted resources with information included in RB allocation fields 1250-a for multiple records to determine which records carry information associated with co-scheduled UEs 115.

TM field 1220 may include TM information for transmissions on the second transmission layer over the RBs indicated by RB allocation field 1250-a. TM field 1220 may include a number of bits (e.g., 3 bits) used to indicate the TM being used by co-scheduled UEs 115 over the indicated RBs for the record. In some cases, the bits may indicate an index in a lookup table that may be used to determine the TM (e.g., single antenna port 0 mode, transmit diversity mode, closed-loop spatial multiplexing mode, etc.).

PMI field 1230 may include a number of bits that provide information on the PMI used for transmissions on the second transmission layer over the RBs indicated in the RB allocation field 1250-a. In some cases, the bits may indicate an index in a lookup table that may be used to determine the PMI. RI field 1240 may include information on rank used for transmissions on the second transmission layer over the RBs indicated in the RB allocation field 1250-a.

In the example of FIG. 12B, record 1210-b may include a transmission configuration index (e.g., TM/PMI/RI index 1260) and an RB allocation field 1250-b. RB allocation field 1250-b may indicate the RBs for which the record 1210-b applies, which may span resources granted on the second transmission layer to one or more co-scheduled UEs 115. The RB allocation field 1250-b may indicate the RBs in the various ways discussed above with reference to RB allocation field 1250-a.

TM/PMI/RI index 1260 may indicate a TM, PMI, and RI configuration for the resources indicated in the RB allocation field 1250-b. For example, resources for one or more co-scheduled UEs 115 that are scheduled with the same transmission configuration (TM, PMI, and RI) may be indicated in record 1210-b, and TM/PMI/RI index 460 may provide an indication of the transmission configuration. In some cases, there may be a number of TM/PMI/RI combinations (e.g., 8 combinations) reserved for transmission configuration indices, where TM/PMI/RI index 1260 may include a number of bits (e.g., 3 bits) in record 1210-b. By way of example, the following table shows possible combinations of TM, RI, and PMI for a four bit transmission configuration (TC) index:

| TC Index | TM | RI | PMI |
|---|---|---|---|
| 0 | 2 | — | — |
| 1 | 3 | 2 | — |
| 2 | 4 | 1 | 0 |
| 3 | 4 | 1 | 1 |
| 4 | 4 | 1 | 2 |
| 5 | 4 | 1 | 3 |
| 6 | 4 | 2 | 0 |
| 7 | 4 | 2 | 1 |
| 8 | 8 | 1 | 0 |
| 9 | 8 | 1 | 1 |
| 10 | 8 | 1 | 2 |
| 11 | 8 | 1 | 3 |
| 12 | 8 | 2 | 0 |
| 13 | 8 | 2 | 1 |
| 14 | | reserved | |
| 15 | | reserved | |

In the example table: a first index value corresponds to TM 2; a second index value corresponds to TM 3 with rank 2; four index values correspond to TM 4, rank 1 and different PMI values; two index values correspond to TM 4, rank 2 and two different PMI values, four index values correspond to TM 8 (e.g., UE reference signal-based transmissions), rank 1 and different PMI values; two index values corresponds to TM 8, rank 2 and different PMI values; and two index values are reserved. In other examples, more bits may be used (e.g., 13 or 14 bits) to provide additional flexibility for transmission configuration. A UE 115-h may use a lookup table to determine TM, PMI, and RI based on the transmission configuration index.

In some cases, such as for UE reference signal-based transmissions, PMI may not need to be distinguished, illustrated by the following example table showing possible combinations of TM, RI, and PMI for a four bit TC index:

| TC Index | TM | RI | PMI |
|---|---|---|---|
| 0 | 2 | — | — |
| 1 | 3 | 2 | — |
| 2 | 4 | 1 | 0 |
| 3 | 4 | 1 | 1 |
| 4 | 4 | 1 | 2 |
| 5 | 4 | 1 | 3 |
| 6 | 4 | 2 | 0 |
| 7 | 4 | 2 | 1 |
| 8 | 8 | 1 | N/A |
| 9 | 8 | 2 | N/A |
| 10 | | | reserved |
| 11 | | | reserved |
| 12 | | | reserved |
| 13 | | | reserved |
| 14 | | | reserved |
| 15 | | | reserved |

Figure 13A:
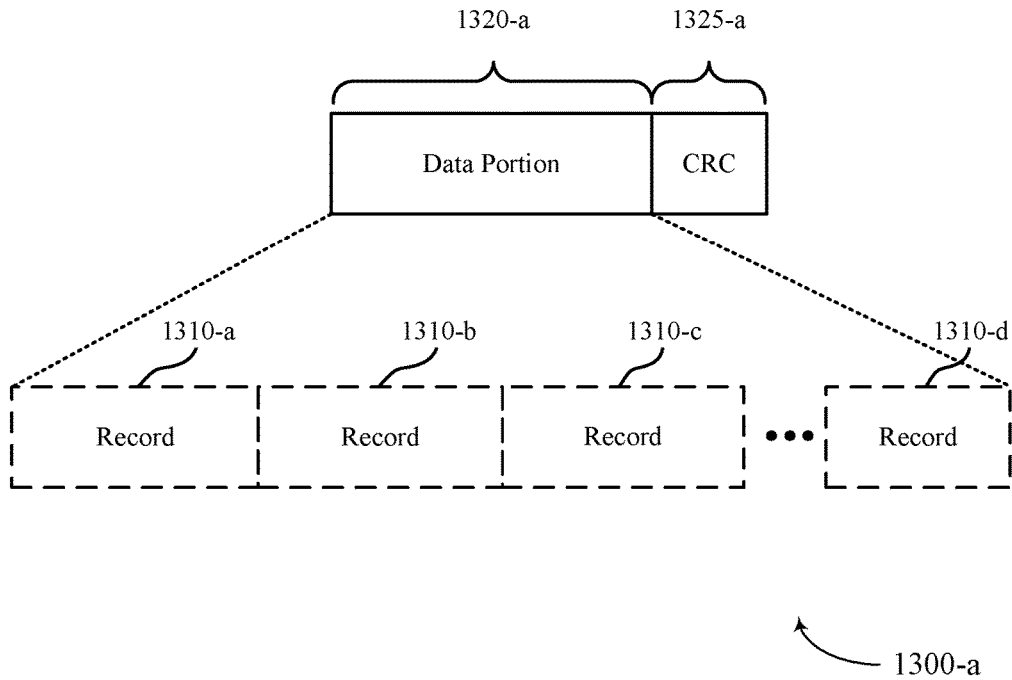
FIGS. 13A through 13C illustrate examples of companion DCI messages that support a group companion downlink control information design in accordance with various aspects of the disclosure.
Figure 13B:
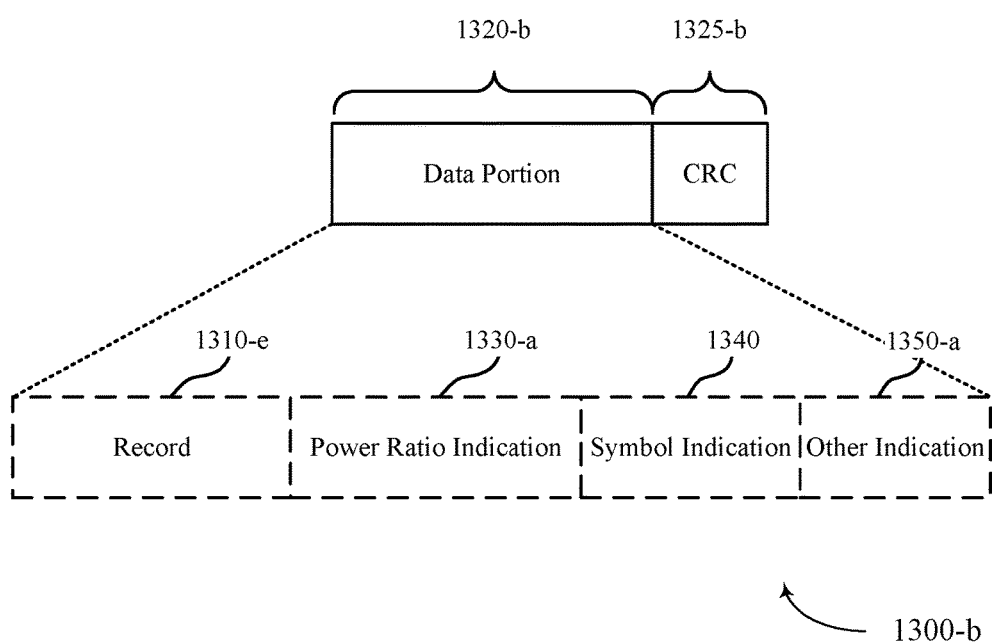
Figures 13C, 14:
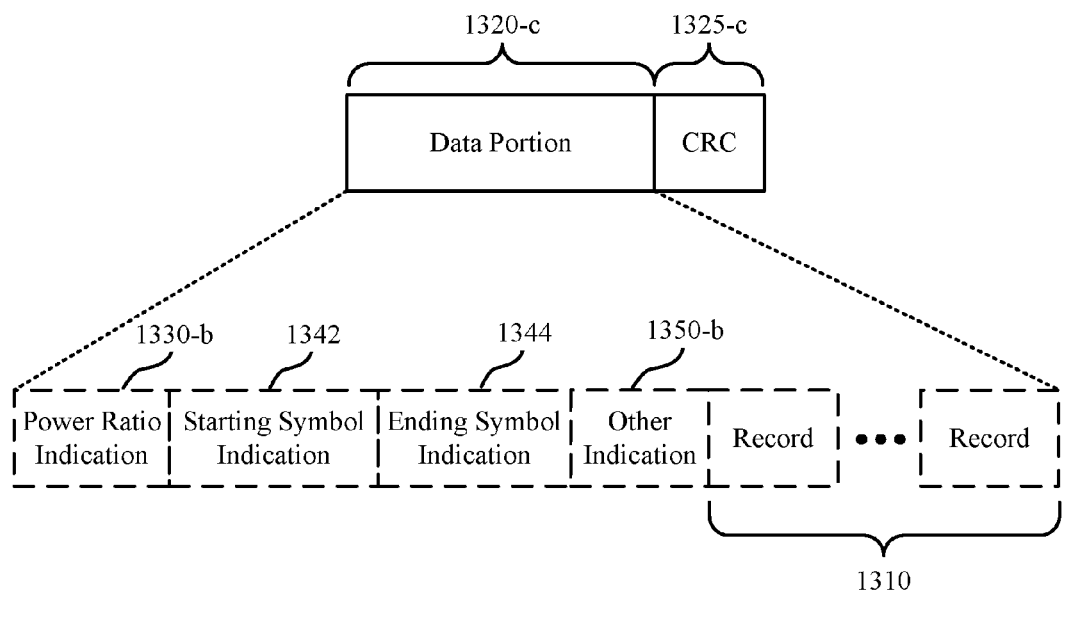
FIG. 14 illustrates an example of a power ratio table used by a device for a group companion downlink control information design in accordance with various aspects of the present disclosure.

FIGS. 13A through 13C illustrate examples of companion DCI messages 1300-a, 1300-b, and 1300-c that are configured to support a group companion DCI design in accordance with various aspects of the present disclosure. The companion DCI messages 1300-a, 1300-b, and 1300-c may be examples of a companion DCI message described with reference to FIG. 10. Companion DCI messages 1300-a, 1300-b and 1300-c may include multiple records and fields that provide information on the resources associated with a transmission layer. As described above, companion DCI messages 1300-a, 1300-b, and 1300-c may be transmitted within a CSS of a control channel (e.g., a PDCCH) or a search space other than the CSS (e.g., corresponding to a predefined RNTI).

In the example of FIG. 13A, companion DCI message 1300-a may include a data portion 1320-a and a CRC portion 1325-a. Data portion 1320-a may include one or more records 1310, where records 1310 may be examples of records 1200-a or 1200-b described with reference to FIGS. 12A and 12B. Records 1310 may include information for the resources and transmission configurations of co-scheduled UEs 115. In some cases, one companion DCI message 1300-a may include a subset of a total number of records 1310 and additional records 1310 may be contained in separate group companion DCI messages. In some cases, multiple companion DCI messages 1300 may be transmitted by a base station 105 providing the records for a given TTI.

In some cases, CRC portion 1325-a may be scrambled using a predefined RNTI, and a UE may identify companion DCI message 1300-a by decoding the companion DCI message 1300-a using the predefined RNTI. In some cases, a different RNTI may be used to distinguish the information included in companion DCI message 1300-a. For example, a first RNTI may be used to indicate that the data portion 1320-a includes information for a first transmission layer (e.g., an enhancement layer) and a second RNTI may be used to indicate that data portion 1320-a includes information for a second transmission layer (e.g., a base layer).

In the example of FIG. 13B, a UE may successfully decode companion DCI message 1300-b using a predefined RNTI that indicates that companion DCI message 1300-b is configured for a group companion DCI design. The UE may process data portion 1320-b of companion DCI message 1300-b to identify record 1310-e, power ratio indication 1330-a, symbol indication 1340, and other indication 1350-a.

Power ratio indication 1330-a may inform the UE 115 of a power ratio being used for a transmission (e.g., the power ratio between a first transmission layer and a second transmission layer). In some cases, power ratio indication 1330-a may directly correspond to a power ratio (e.g., the bits translate to a specific power ratio). That is, a number of bits may be reserved in companion DCI message 1300-b to indicate a power ratio of companion DCI message 1300-b. Although illustrated as applying for companion DCI message 1300-b, power ratio indication 1330-a may be included in each record 1310 (e.g., record level power ratio configuration). If multiple power ratios are associated with a set of resources having the same TM, RI, and PMI, the record may be split, where each of the split records may be associated with a different power ratio. The power ratio indication 1330-a may indicate the power ratio between two transmission layers (e.g., between the EL and BL), and may be indexed to a predefined set of ratios. In some cases, a base station 105 may be restricted to choosing from the predefined set when transmissions are scheduled.

Symbol indication 1340 may include a number of bits to provide information regarding symbols indicated by companion DCI message 1300-b. For example, symbol indication 1340 may include information about a starting and ending symbol for which companion DCI message 1300-b applies. The starting and ending symbol may be indicated by symbol indication 1340 using a single grouping of bits (e.g., information about both symbols is contained in consecutive bits). In some cases, symbol indication 1340 may be included in companion DCI message 1300-b for low latency operations (e.g., where BL and EL use different TTIs).

Other indication 1350-a may include various control information and additional information about co-scheduled UEs 115 for the RBs indicated by the companion DCI message 1300-b or record 1310 (when other indication 1350-a is included per-record). A number of bits may be reserved to transmit one or more fields for other indication 1350-a, which may include DCI associated with resource grants on the transmission layer for which the companion DCI message 1300-b applies. Other indication 1350-a may include, for example, a carrier indicator field, virtual resource block assignment flag field, RI or PMI fields (when not included in the transmission configuration index), PMI confirmation, and the like. In some examples, other indication 1350-a may include an indication of the number of TTIs used for a transmission layer. In some cases, the operation of a transmission layer (e.g., a base layer) may be associated with TTI bundling, or a base station 105 may transmit using the same TM/PMI/RI configuration across multiple TTIs (such as a semi-persistent transmission or a broadcast transmission). Instead of re-transmitting the record for each TTI, the other indication 1350-a may provide information on the number of TTIs that the transmission will use.

In the example of FIG. 13C, CRC portion 1325-c may be scrambled with a predefined RNTI that indicates that companion DCI message 1300-c is configured for a group companion DCI design. In some cases, data portion 1320-c of companion DCI message 1300-c may be configured to include power ratio indication 1330-b, starting symbol indication 1342, ending symbol indication 1344, other indication 1350-b, and one or more records 1310.

As described above, power ratio indication 1330-b may inform UE 115 of a power ratio being used in a transmission (e.g., the power ratio between an enhancement layer and a base layer). In some examples, power ratio indication 1330-b may include a power ratio index used with a lookup table to find a corresponding power ratio. Information about modulation schemes for different transmission layers may be used to determine the power ratio (e.g., both the power ratio index and modulation scheme may be used together to determine the power ratio). In some examples, power ratio indication 1330-*b* may be included once in a companion DCI message 1300-*b* and cover the power ratio for all records 1310, or may be included in each record to indicate power ratio information on a per-record level.

In some cases, symbol indication 1340 as described with reference to FIG. 13B may be split into a first and second grouping of bits to indicate a starting symbol and an ending symbol, respectively. That is, companion DCI message 1300-*c* may include starting symbol indication 1342 and ending symbol indication 1344, each including a number of bits to indicate information on the respective symbol. The starting symbol indication 1342 may indicate (e.g., relative to the symbols of a 1 ms TTI or the TTI associated with a second layer), the starting symbol of the TTI for which the companion DCI message 1300-*c* applies. The ending symbol indication 1344 may indicate the ending symbol, or the number of symbols in the TTI for which the companion DCI message 1300-*c* applies. For example, the companion DCI message 1300-*c* may include information for BL transmissions where the BL is associated with a shorter TTI than the EL, and the starting symbol indication 1342 and ending symbol indication 1344 may indicate, relative to the EL symbols or a 1 ms subframe reference timing, the starting and ending symbols for the BL TTI. Other indication 1350-*b* may include various control information and additional information about co-scheduled UEs 115 to reduce overhead.

FIG. 14 illustrates an example of a power ratio table 1400 used by a device for a group companion DCI design in accordance with various aspects of the present disclosure. Power ratio table 1400 may be used to identify a mapping between a power ratio index and a power ratio for different modulation order pairs.

Power ratio table 1400 may include a power ratio index 1410, modulation order pairs (MOPs) 1420, and multiple power ratios 1430. Multiple power ratio indices 1410 may be included in power ratio table 1400, and may be an example of the power ratio index indicated by power ratio indication 1330-*a* or 1330-*b* described with reference to FIG. 13B or 13C. In some cases, each power ratio index 1410 may be associated with a single power ratio 1430 or may correspond to multiple different power ratios 1430. If each power ratio index 1410 is associated with multiple power ratios 1430, modulation order pairs 1420 may provide further information to determine which of the multiple power ratios 1430 is being used for different transmission layers of a downlink transmission.

Modulation order pairs 1420 may indicate different modulation orders for multiple transmission layers. For example, a base transmission layer may be associated with quadrature phase shift keying (QPSK) modulation and an enhancement layer may be associated with QPSK for MOP1, 16-quadrature amplitude modulation (16QAM) for MOP2, and 64-quadrature amplitude modulation (64QAM) for MOP3, and these modulation orders may form modulation order pairs 1420 with the base layer modulation order. MOP1 may correspond to a first power ratio 1430 indicated by power ratio index 1410 (e.g., power ratios a, b, c, etc.), while MOP2 may correspond to a second power ratio 1430 (e.g., power ratios a', b', c', etc.) for the same power ratio index 1410. Additional base layer modulation orders (e.g., 16QAM) may be supported by a separate table or additional indices (not illustrated).

Power ratio 1430 may include information about the mapping between power ratios of different transmission layers. For example, a UE 115 may use power ratio information for interference cancellation. As an example, UE 115 may receive a group companion DCI message including a power ratio index 1410. The UE 115 may then use power ratio index 1410 with or without modulation order pair 1420 (depending on if there are multiple power ratios 1430 associated with power ratio index 1410) to determine power ratio 1430 using power ratio table 1400.

Figure 15:
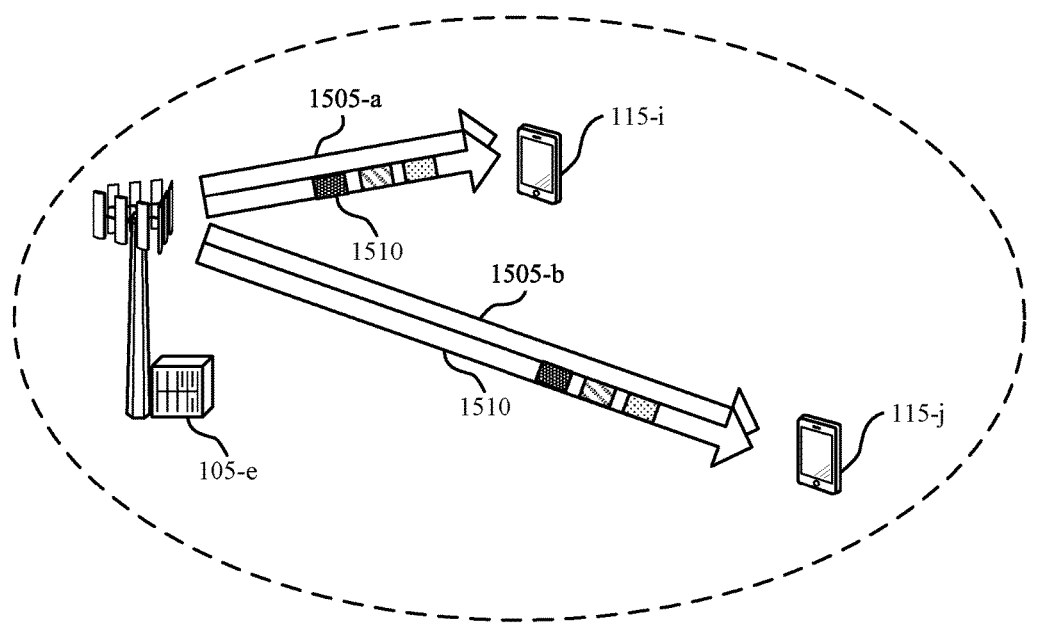
FIG. 15 illustrates an example of a wireless communication subsystem that supports group companion DCI design for MU-MIMO transmissions in accordance with aspects of the present disclosure.

FIG. 15 illustrates an example of a wireless communications subsystem 1500 that supports a group companion DCI design for MU-MIMO transmissions in accordance with various aspects of the present disclosure. Wireless communications subsystem 1500 may include a first UE 115-*i*, a second UE 115-*j*, and base station 105-*e*, which may be examples of UEs 115 or a base station 105 and may communicate with one another as described above with reference to FIG. 1. Wireless communications subsystem 1500 may, for example, use one or more records in a group companion DCI message to indicate information about transmissions on multiple spatial layers on different sets of resources.

In some cases, base station 105-*e* may schedule a downlink transmission on multiple spatial layers (e.g., first spatial layer 1505-*a* and second spatial layer 1505-*b*). Base station 105-*e* may transmit a control channel 1510 that includes a first self-DCI message 1515-*a* and a second self-DCI message 1515-*b*. Self-DCI message 1515-*a* may include a grant of resources for the downlink transmission on spatial layer 1505-*a*, and the second self-DCI message 1515-*b* may include a grant of resources for the downlink transmission on spatial layer 1505-*b*. In some cases, the resources granted to first UE 115-*i* may overlap with the resources granted to second UE 115-*j*. In order to cancel or suppress interference from a transmission on second spatial layer 1505-*b*, it may be beneficial for the first UE 115-*i* to know information about the downlink transmission on second spatial layer 1505-*b*.

Wireless communications subsystem 1500 may support techniques for maintaining flexible MU-MIMO scheduling with low control overhead using a group companion DCI message 1520. In some examples, base station 105-*e* may transmit the group companion DCI message 1520 in a CSS in control channel 1510. The base station may use a preconfigured C-RNTI for scrambling a CRC field to enable detection of the group companion DCI message 1520 by UEs configured in an MU-MIMO MUST mode. First UE 115-*i* and second UE 115-*j* may monitor the CSS and receive the group companion DCI message 1520. The group companion DCI message 1520 may include information about the downlink transmission on spatial layer 1505-*a* and spatial layer 1505-*b*. Each group companion DCI message 1520 may include one or more records that correspond to different resource allocations, and the UEs 115 may monitor for multiple group companion DCI messages 1520.

First UE 115-*i* may identify that a set of resources that correspond to a record in the group companion DCI message 1520 overlaps with a set of resources granted for the downlink transmission to the first UE 115-*i* on spatial layer 1505-*a*. This set of resources may be the same set of resources that overlaps with the resources granted for the downlink transmission to the second UE 115-*j* on spatial layer 1505-*b*. The record may include spatial layer usage information that describes the downlink transmission on spatial layer 1505-*a* and spatial layer 1505-*b* over the overlapping set of resources. Specifically, the record may include an indication of an OCC length, modulation order, resource allocation, etc. used for the downlink transmission on spatial layer 1505-*a* and spatial layer 1505-*b*. First UE 115-*i* may use the spatial layer usage information to cancel or suppress interference from the transmission on spatial layer 1505-*b* and correctly demodulate the downlink transmission on spatial layer 1505-*a*.

Depending on the complexity of the MU-MIMO transmission, base station 105-*e* may use multiple group companion DCI messages 1520 to provide information about varying spatial layer usage configurations across a range of resources. A base station 105-*e* may use an appropriate aggregation level to transmit the group companion DCI message 1520 to ensure that the message has a high enough SINR to be decoded by first UE 115-*i* and second UE 115-*j*. Since the base station 105-*e* may know the geometries of the specific UEs (e.g., first UE 115-*i* and second UE 115-*j*) that may use the group companion DCI message, the aggregation level may be adjusted for the geometries associated with these UEs rather than all UEs in the coverage area of the base station 105-*e*. In some examples, if coordinated multipoint (CoMP) transmissions from multiple base stations are employed (not shown), the PDSCH resource element mapping and quasi-collocated indicator (PQI) information may be included in a self-DCI message. In such cases, the base station may ensure that the same PQI information is used for all UEs co-scheduled on the same resources.

The use of a group companion DCI 1520 for signaling to a first UE 115-*i* may be backwards compatible with a second UE (e.g., second UE 115-*j*) that uses blind decoding to detect transmissions on other spatial layers. In both cases, the design of the self-DCI messages 1515 may be the same and both UEs may process and decode their self-DCI messages to identify respective grants of resources. A first UE 115 may then receive a group companion DCI 1520 and process the group companion DCI 1520 to determine which resources of the resources granted to the first UE 115 on a first set of spatial layers overlap with other spatial layers (e.g., spatial layer 1505-*b*) of the downlink transmission. The second UE 115-*j* may identify and blind decode the first self-DCI message 1515-*a* intended for the first UE 115-*i* as well as self DCI message 1515-*b* (and potentially any other self-DCI messages that overlap with the resources granted to the second UE 115-*j*). The second UE 115-*j* may then use this information to determine if the resources granted to the second UE on a second set of spatial layers overlap (e.g., partially overlap) with other spatial layers (e.g., spatial layer 1505-*a*) of the downlink transmission. Although only two UEs 115 are shown in FIG. 15 for the sake of clarity, processing of self DCI and companion DCI messages may be performed in an environment with any number of UEs served by base station 105-*e*.

The use of a companion DCI for MU-MIMO MUST transmissions may also be compatible with the use of a different companion DCI for other MUST transmissions. In some cases, both DCI designs may include records that correspond to a set of resources. In an example, first UE 115-*i* may be configured (e.g., via RRC signaling) in an MU-MIMO MUST mode, and a second UE (e.g., second UE 115-*j*) may be configured (e.g., via RRC signaling) in a non-MU-MIMO MUST mode (e.g., using the same transmission mode and the same precoding matrix or using transmit diversity). In some examples, the first UE 115-*i* may also communicate using a non-MU-MIMO MUST mode based on the format of the self-DCI message 1515-*a* (e.g., falling back to a non-MU-MIMO mode if DCI format 1A is used for a grant of resources). Both UEs may monitor the same search space for the different DCI messages (e.g., control channel 1510), and a UE may identify a companion DCI message based on the preconfigured C-RNTI for companion DCI messages.

The UE may process and decode the companion DCI message to identify records included in the companion DCI message. If a record matches the operation mode of the UE (e.g., MU-MIMO MUST mode for first UE 115-*i*), and is associated with overlapping resources to the resources granted to the UE, the UE may use the information included in the record. Alternatively, if a record does not match the operation mode of the UE or references resources that do not overlap with resources granted to the UE, the UE may disregard the record. Companion DCI messages for different operational modes may both use records to organize information based on resource allocations, and the records in both DCIs may be multiplexed (e.g., in the same companion DCI message). In some examples, base station 105-*e* may format different companion DCIs with the same length (e.g., using zero padding) and use a record type field in each record to differentiate companion DCIs. In other examples, base station 105-*e* may format different companion DCIs with different lengths and the length of the companion DCIs may be used to differentiate companion DCIs.

Figure 16:
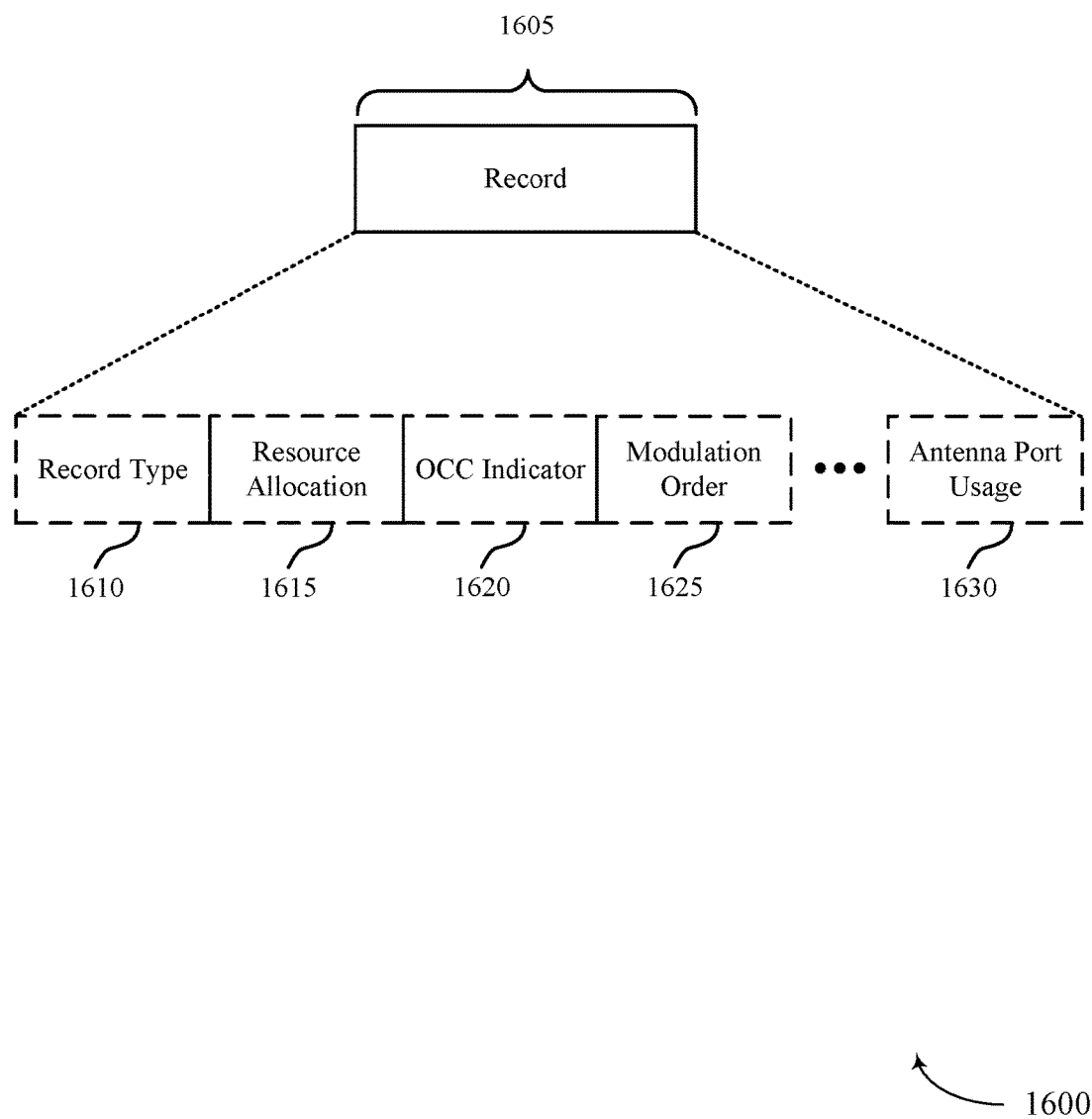
FIGS. 16 and 17 illustrate examples of record designs in a system that supports group companion DCI design for MU-MIMO transmissions in accordance with aspects of the present disclosure.

FIG. 16 illustrates an example of a record design 1600 in a system that supports a group companion DCI design for MU-MIMO transmissions in accordance with various aspects of the present disclosure. Record design 1600 may include a record 1605, which may be an example of a record included in a group companion DCI message, such as a group companion DCI message 1520 described with reference to FIG. 15.

In this example, record 1605 may include spatial layer usage information for a downlink transmission from a base station to multiple UEs on multiple spatial layers. The record may include a record type field 1610, resource allocation field 1615, OCC indicator field 1620, modulation order field 1625, antenna port usage field 1630, and/or other fields (not shown). Record type field 1610 may provide an indication of a type associated with record 1605. For example, the modulation order of a transmission may be the same for the transmission on all spatial layers, and a first record type may not include a modulation order field. In other cases, the modulation order of a transmission may be different for the transmission on different spatial layers, and a second record type may include a modulation order field. Resource allocation field 1615 may indicate the resources (e.g., resources blocks) that correspond to record 1605. In order to reduce the record size in a group companion DCI message, a base station may bundle resources used for the downlink transmission on a spatial layer.

OCC Indicator field 1620 may include an indication (e.g., one (1) bit) of an OCC length (e.g., OCC2 or OCC4) used for reference signals included in the downlink transmission on one or more antenna ports. A receiving UE may use the information about the OCC length to perform channel estimation for demodulating resources of the transmission intended for the receiving UE indicated in resource allocation field 1615. The modulation order field 1625 may include information about the modulation order used to modulate the transmission on other spatial layers that interfere with the downlink transmission intended for the receiving UE. Antenna port usage field may describe the antenna ports and the SCID(s) used for the transmission on the resources indicated in resource allocation field 1615. The receiving UE may use the information included in record 1605 to cancel or suppress interference from the transmission on other spatial layers on the same resources. In some cases, record 1605 may include a subset of the fields described above, and may include other fields.

Figure 17:
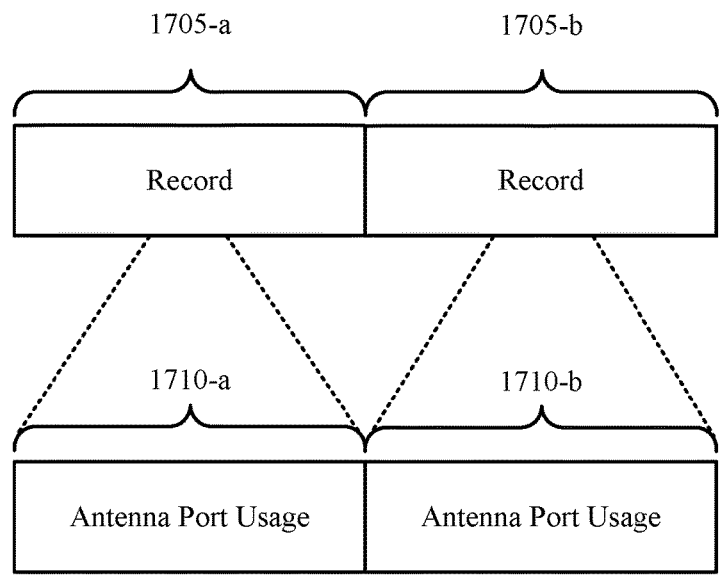

FIG. 17 illustrates an example of a record design 1700 in a system that supports a group companion DCI design for MU-MIMO transmissions in accordance with various aspects of the present disclosure. Record design 1700 may include a first record 1705-a and a second record 1705-b, which may be examples of a record included in a group companion DCI message, such as a group companion DCI message 1520 described with reference to FIG. 15. First record 1705-a and second record 1705-b may include a first antenna port usage field 1710-a and a second antenna port usage field 1710-b respectively, which may be examples of an antenna port usage field described with reference to FIG. 16. Antenna port usage fields 1710 may be divided into multiple SCID and antenna port fields that include information about the specific SCID and antenna ports used for a transmission on resources that correspond to the respective records 1705. The details of the SCID and antenna port fields are described with reference to FIG. 18 and may depend on the OCC length used for the transmission.

FIG. 18 illustrates examples of antenna port usage fields 1810 in a system that supports a group companion DCI design for MU-MIMO transmissions in accordance with various aspects of the present disclosure. Antenna port usage fields 1810 may, for example, illustrate antenna port usage fields 1710 of FIG. 17. In some cases, a base station employing OCC2 for a downlink transmission may use different SCIDs for a downlink transmission on a set of spatial layers associated with antenna port 7 and antenna port 8. In a first example antenna port usage field 1810-a, the base station may send a single SCID field that indicates the SCID for on antenna port 7 and antenna port 8 (e.g., for OCC2). In this case, the base station may use three (3) bits (e.g., one (1) bit for the SCID field and two (2) bits for the antenna port bitmap) in the antenna port usage field to describe the SCID and antenna ports used for the downlink transmission.

In a second example antenna port usage field 1810-b, the base station may use four (4) bits to indicate separate SCIDs for each of the antenna ports used for OCC length 2. The first bit may indicate whether antenna port 7 is used and the second bit may indicate the SCID used by antenna port 7 (SCID0). The third bit may indicate whether antenna port 8 is used and the fourth bit may indicate the SCID used by antenna port 8 (SCID1) That is, if the first bit is set, a receiving UE may determine that antenna port 7 is used for the downlink transmission with SCID0 over the set of resources associated with the corresponding record. Similarly, if the third bit is set, a receiving UE may determine that antenna port 8 is used for the downlink transmission with SCID1 over the set of resources associated with the corresponding record.

In other cases, a base station employing OCC4 for a downlink transmission may use the same or different SCIDs for a downlink transmission on a set of spatial layers associated with antenna ports 7, 8, 11, and 13. In a third example antenna port usage field 1810-c, the base station may send a single SCID field that indicates the SCID used for antenna ports 7, 8, 11, and 13. In this case, the base station may use five (5) bits (e.g., one (1) bit for the SCID field and four (4) bits for the antenna port bitmap) in the antenna port usage field to describe the SCID and antenna ports used for the downlink transmission.

In a fourth example antenna port usage field 1810-d, the base station may use eight (8) bits to separately indicate the antenna ports used and the SCID used for each antenna port. The first bit may indicate the usage for antenna port 7, and the second bit may indicate the SCID used for antenna port 7 (SCID0). Similarly, each antenna port usage bit may be followed by the SCID field indicating the SCID for the antenna port.

In some examples, a bitmap with all ones (1s) in the antenna port usage field may not be valid and may be reserved for a special case. Additionally, a bitmap with all zeros (0s) in the antenna port usage field may not be valid and may be reserved for a special case or used to indicate that the corresponding record is empty.

Figure 19:
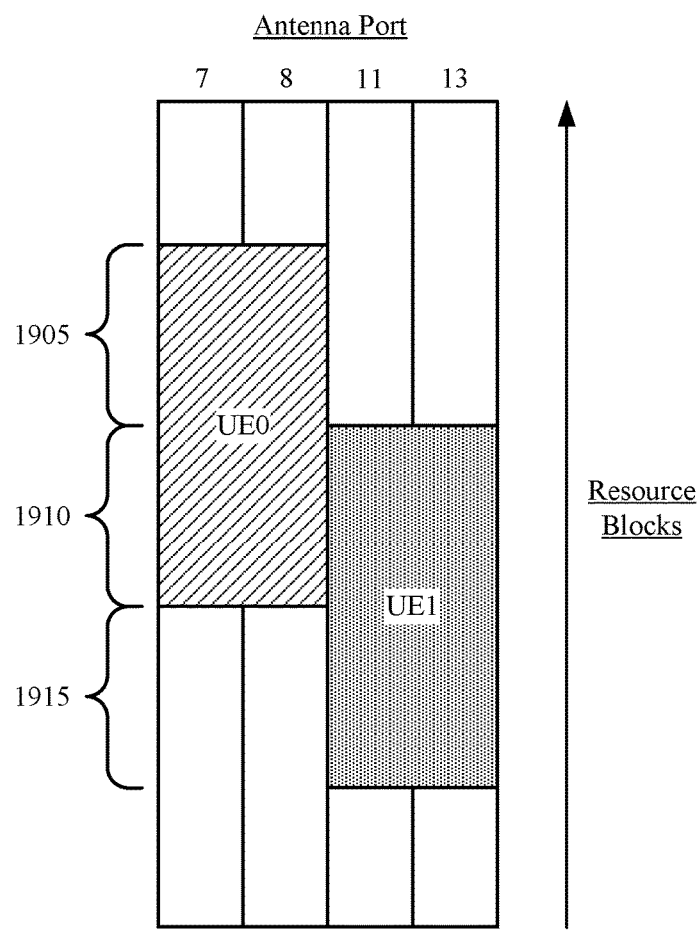
FIGS. 19 through 21 illustrate examples of downlink transmissions in a system that supports group companion DCI design for MU-MIMO transmissions in accordance with aspects of the present disclosure.

FIG. 19 illustrates an example of a downlink transmission 1900 in a system that supports a group companion DCI design for MU-MIMO transmissions in accordance with various aspects of the present disclosure. The downlink transmission may span antenna ports 7, 8, 11, and 13 and may include data for a first UE (UE0) and a second UE (UE1). The downlink transmission may also span a set of resources that includes a first set of resources 1905, a second set of resources 1910, and a third set of resources 1915. In this example, a base station may use antenna ports 7 and 8 to transmit the downlink transmission to UE0, and the base station may use antenna ports 11 and 13 to transmit the downlink transmission to UE 1. The downlink transmission intended for UE0 may span the first set of resources 1905 and the second set of resources 1910, and the downlink transmission intended for UE1 may span the second set of resources 1910 and the third set of resources 1915. Therefore, UE0 may receive interference from UE1 on the second set of resources 1910, and UE1 may receive interference from UE0 on the second set of resources 1910. Accordingly, in order to correctly demodulate the transmission, UE0 may use information about the downlink transmission on antenna ports 11 and 13 over the second set of resources 1910 to cancel interference from these antenna ports. Similarly, UE1 may use information about the downlink transmission on antenna ports 7 and 8 over the second set of resources 1910 to cancel interference from these antenna ports.

In some cases, a base station may transmit a group companion DCI message to provide information about the downlink transmission on multiple spatial layers associated with the antenna ports. UE0 and UE1 may receive the group companion DCI message and identify a record corresponding to the second set of resources 1910. UE0 and UE1 may then determine that the second set of resources 1910 overlaps with a set of resources granted for the downlink transmission in a self-DCI message. Subsequently, UE0 may use the additional information included in the record (e.g., modulation order, SCID, OCC length, antenna port usage, etc.) to cancel or suppress the interference from the transmission to UE1. Similarly, UE1 may use the additional information included in the record (e.g., modulation order, SCID, OCC length, antenna port usage, etc.) to cancel or suppress the interference from the transmission to UE0. Since the first set of resources 1905 and the third set of resources 1910 are assigned to a single UE, information about the downlink transmission on these resources may not be included in a record in the group companion DCI message. UE0 may, for example, determine that the spatial layers associated with antenna ports 11 and 13 are not used in the first set of resources 1905 and decode the transmission without attempting interference cancellation or suppression of those spatial layers.

Figure 20:
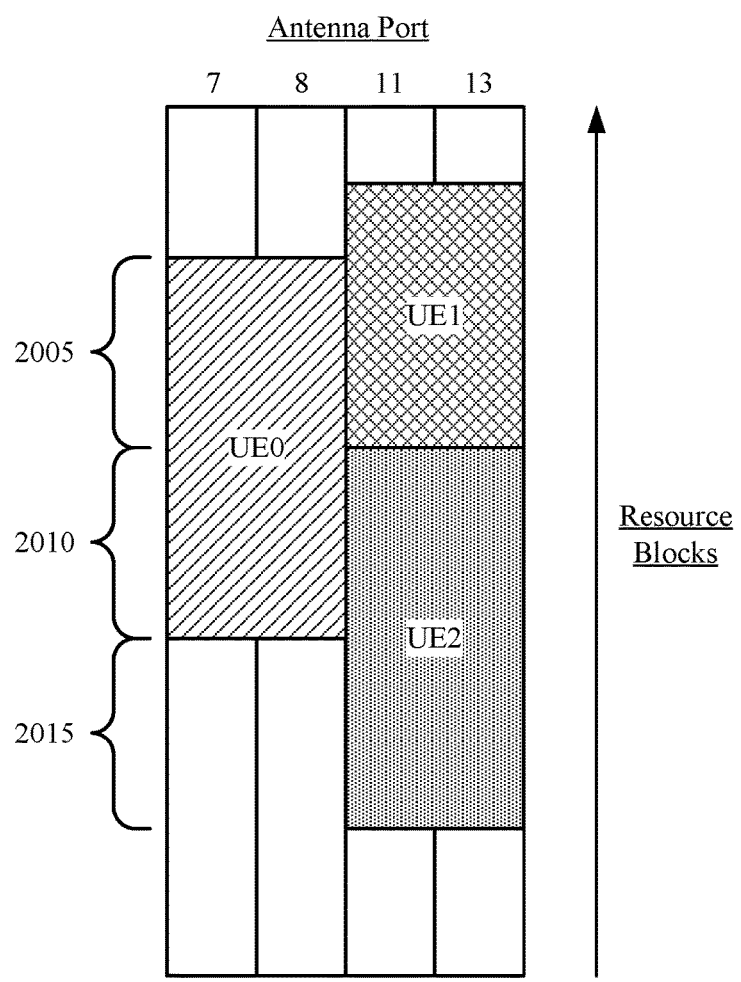

FIG. 20 illustrates an example of a downlink transmission 2000 in a system that supports a group companion DCI design for MU-MIMO transmissions in accordance with various aspects of the present disclosure. The downlink transmission may span antenna ports 7, 8, 11, and 13 and may include data for a first UE (UE0), a second UE (UE1), and a third UE (UE2). The downlink transmission may also span a set of resources that includes a first set of resources 2005, a second set of resources 2010, and a third set of resources 2015. In this example, a base station may use antenna ports 7 and 8 to transmit the downlink transmission to UE0, and the base station may use antenna ports 11 and 13 to transmit the downlink transmission to UE1 and UE2. The downlink transmission intended for UE0 may span the first set of resources 2005 and the second set of resources 2010, the downlink transmission intended for UE1 may span the first set of resources 2005 (and may extend beyond the first set of resources 2005 as illustrated in FIG. 7), and the downlink transmission intended for UE2 may span the second set of resources 2010 and the third set of resources 2015. Therefore, UE0 may receive interference from UE1 on the first set of resources 2005 and UE1 may receive interference from UE0 on the first set of resources 2005. Additionally, UE0 may receive interference from UE2 on the second set of resources 2010 and UE2 may receive interference from UE0 on the second set of resources 2010. Accordingly, in order to correctly demodulate the transmission, UE0 may use information about the downlink transmission on antenna ports 11 and 13 to cancel interference from these antenna ports. Similarly, UE1 and UE2 may use information about the downlink transmission on antenna ports 7 and 8 to cancel interference from these antenna ports.

In some cases, a base station may transmit a group companion DCI message to provide information about the downlink transmission on multiple spatial layers associated with the antenna ports. UE0, UE1, and UE2 may receive the group companion DCI message and identify a first record corresponding to the downlink transmission on the first set of resources 2005 and a second record corresponding to the second set of resources 2010. In some cases, the downlink transmission to UE1 and the downlink transmission to UE2 may be modulated according to different modulation orders. In such cases, the first record may be different from the second record. Using information included in the first record, UE0 may cancel interference received from UE1 and UE1 may cancel interference received from UE0. Using information included in the second record, UE0 may cancel interference from UE2 and UE2 may cancel interference from UE1. In other cases, the downlink transmission to UE1 and the downlink transmission to UE2 may be modulated according to the same modulation order, or the modulation order may be excluded from the record. In such cases, the spatial layer usage information for UE1 and UE2 may be merged into a single record and one record may be used to convey the spatial layer usage information for the first set of resources 2005 and the second set of resources 2010. Using information included in the record, UE0 may cancel interference received from UE1 and UE2, UE1 may cancel interference received from UE0, and UE2 may cancel interference received from UE0.

Figure 21:
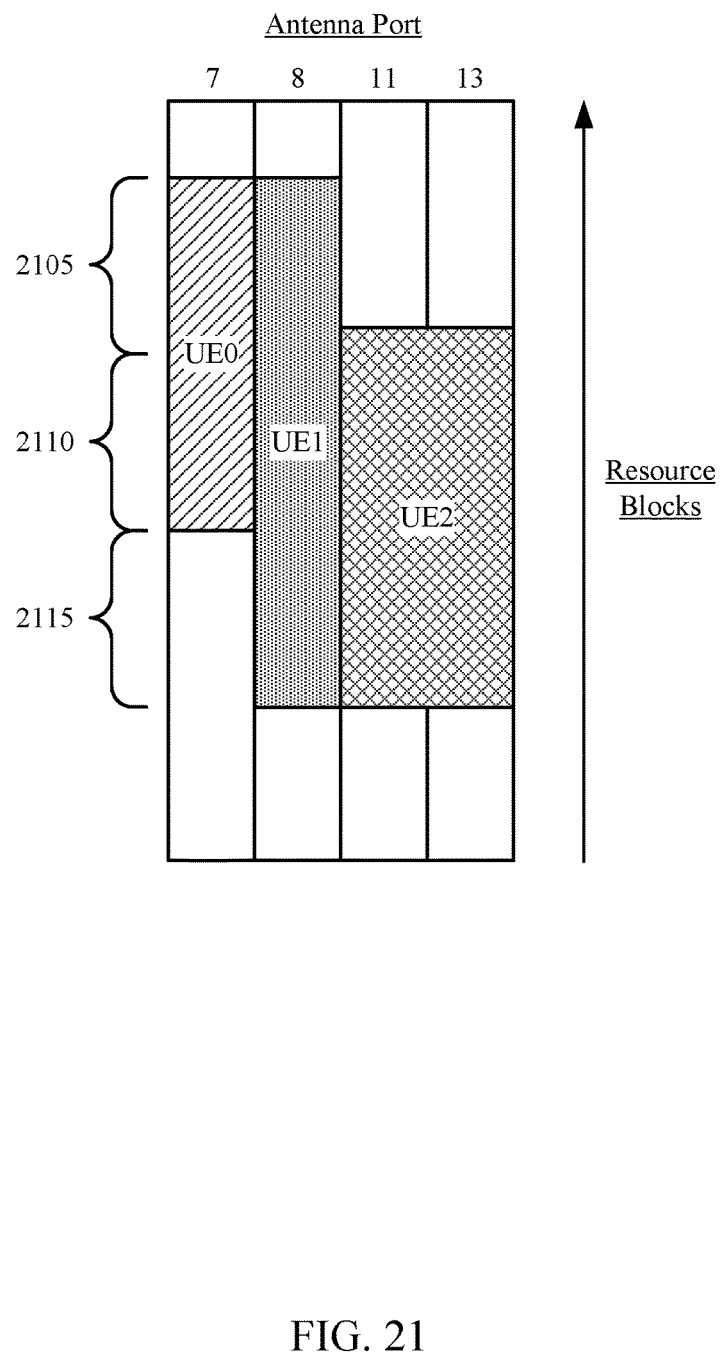

FIG. 21 illustrates an example of a downlink transmission 2100 in a system that supports a group companion DCI design for MU-MIMO transmissions in accordance with various aspects of the present disclosure. The downlink transmission may span antenna ports 7, 8, 11, and 13 and may include data for a first UE (UE0), a second UE (UE1), and a third UE (UE2). The downlink transmission may also span a set of resources that includes a first set of resources 2105, a second set of resources 2110, and a third set of resources 2115. In this example, a base station may use antenna port 7 to transmit the downlink transmission to UE0, the base station may use antenna port 8 to transmit the downlink transmission to UE1, and the base station may use antenna ports 11 and 13 to transmit the downlink transmission to UE2. The downlink transmission intended for UE0 may span a first set of resources 2105 and a second set of resources 2110, the downlink transmission intended for UE1 may span a first set of resources 2105, a second set of resources 2110, and a third set of resources 2115, and the downlink transmission intended for UE2 may span a second set of resources 2110 and a third set of resources 2115.

Therefore, UE0 may receive interference from UE1 on a first set of resources 2105, and UE1 may receive interference from UE0 on the first set of resources 2105. UE0 may also receive interference from UE1 and UE2 on a second set of resources 2110, UE1 may receive interference from UE0 and UE2 on the second set of resources 2110, and UE2 may receive interference from UE0 and UE1 on the second set of resources 2110. Additionally, UE1 may receive interference from UE2 on the third set of resources 2115, and UE2 may receive interference from UE1 on the third set of resources 2115. Accordingly, in order to correctly demodulate the transmission, UE0 may use information about the downlink transmission on antenna ports 8, 11 and 13 to cancel interference from these antenna ports, UE1 may use information about the downlink transmission on antenna ports 7, 11, and 13 to cancel interference from these antenna ports, and UE2 may use information about the downlink transmission on antenna ports 7 and 8 to cancel interference from these antenna ports.

In some cases, a base station may transmit a group companion DCI message to provide information about the downlink transmission on multiple spatial layers associated with the antenna ports. In a first example, UE0, UE1, and UE2 may receive the group companion DCI message and identify a first record corresponding to the downlink transmission on the first set of resources 2105, a second record corresponding to the downlink transmission on the second set of resources 2110, and a third record corresponding to the downlink transmission on the third set of resources 2115. Each UE may use information included in the appropriate record to cancel interference from the downlink transmission on other spatial layers. However, the number of records included in a companion DCI message may be high due to the complexity of the MU-MIMO downlink transmission. As a result, the control overhead associated with the group companion DCI message that includes the records may also be high. Therefore, it may be beneficial to reduce the number of records in a companion DCI message to reduce control overhead.

In a second example, UE0, UE1, and UE2 may receive the group companion DCI message and identify a first record that includes spatial layer usage information for spatial layers corresponding to antenna ports 7 and 8 of the downlink transmission over the first set of resources 2105 and the second set of resources 2110 and a second record that includes spatial layer usage information for spatial layers corresponding to antenna ports 8, 11, and 13 of the downlink transmission over the second set of resources 2110 and the third set of resources 2115. In this example, the resource allocation fields of the first record and the second record may overlap and at the same time each record may not completely describe the downlink transmission on all spatial layers over the described resources, but the combination of the first record and the second record does. The use of multiple records with overlapping resource allocations may support records that include one or more SCIDs for different antenna ports as described with reference to FIG. 18. In this example, UE0, UE1, and UE2 may process and decode information included in the first record and the second record, and each UE may use this information to cancel interference from the downlink transmission on other spatial layers. In some cases, the first record and second record may be included in the same companion DCI message, and, in other cases, the first record and second record may be included in different companion DCI messages.

Alternatively, overlapping records may not be used, and the UE 115 may identify an error in decoding the records based on determining that different records cover overlapping resources and spatial layers. In such cases, the UE may disregard one or more of the records, or the entire companion DCI message and attempt to decode the spatial layers and resources granted to the UE without additional spatial layer usage information.

Figure 22:
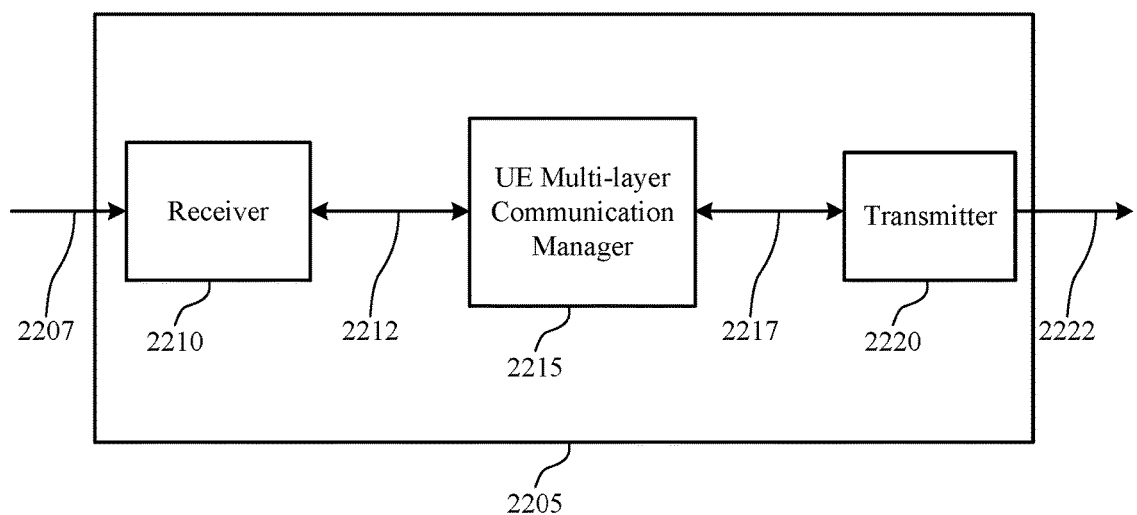
FIGS. 22 through 24 show block diagrams of a device that supports downlink control information for multi-layer transmissions in accordance with aspects of the present disclosure.

FIG. 22 shows a block diagram 2200 of a wireless device 2205 that supports downlink control information for multi-layer transmissions in accordance with various aspects of the present disclosure. Wireless device 2205 may be an example of aspects of a user equipment (UE) 115 as described with reference to FIG. 1. Wireless device 2205 may include receiver 2210, UE multi-layer communication manager 2215, and transmitter 2220. wireless device 2205 may also include a processor. Each of these components may be in communication with one another (e.g., via one or more buses).

Receiver 2210 may receive a signal 2207, which may carry information such as packets, user data, or control information associated with various information channels (e.g., control channels, data channels, and information related to downlink control information for multi-layer transmissions, etc.). Signal 2207 may be a downlink transmission. Receiver 2210 may pass information on to other components of the device via signal 2212. Signal 2212 may be the same as the signal 2207 received at receiver 2210, or may be a representation of the signal 2207. For instance, signal 2212 may be a filtered or digitized version of signal 2207 or may represent information extracted from signal 2207. The receiver 2210 may be an example of aspects of the transceiver 2535 described with reference to FIG. 25.

UE multi-layer communication manager 2215 may be an example of aspects of the UE multi-layer communication manager 2515 described with reference to FIG. 25.

UE multi-layer communication manager 2215 and/or at least some of its various sub-components may be implemented in hardware, software executed by a processor, firmware, or any combination thereof. If implemented in software executed by a processor, the functions of the UE multi-layer communication manager 2215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. In some examples, UE multi-layer communication manager 2215 and/or at least some of its various sub-components may be a separate and distinct component in accordance with various aspects of the present disclosure. In other examples, UE multi-layer communication manager 2215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE multi-layer communication manager 2215 may receive signal 2212 from the receiver and identify, in a control channel of a downlink transmission, a DCI message that includes first scheduling information for a grant of resources to the first UE in a first layer of the downlink transmission, identify a companion DCI message that includes second scheduling information for at least one other layer of the downlink transmission, receive the downlink transmission based on the DCI message, and decode the downlink transmission based on the DCI message and the companion DCI message. UE multi-layer communication manager 2215 may pass information 2217 to transmitter 2220 for transmission to another device. For instance, UE multi-layer communication manager 2215 send an indication to transmitter 2220 that the downlink transmission has been successfully decoded.

Transmitter 2220 may transmit signals 2222 based on signals generated by other components of the device (e.g., information 2217). In some examples, the transmitter 2220 may be collocated with a receiver 2210 in a transceiver module. For example, the transmitter 2220 may be an example of aspects of the transceiver 2535 described with reference to FIG. 25. The transmitter 2220 may include a single antenna, or it may include a set of antennas.

Figure 23:
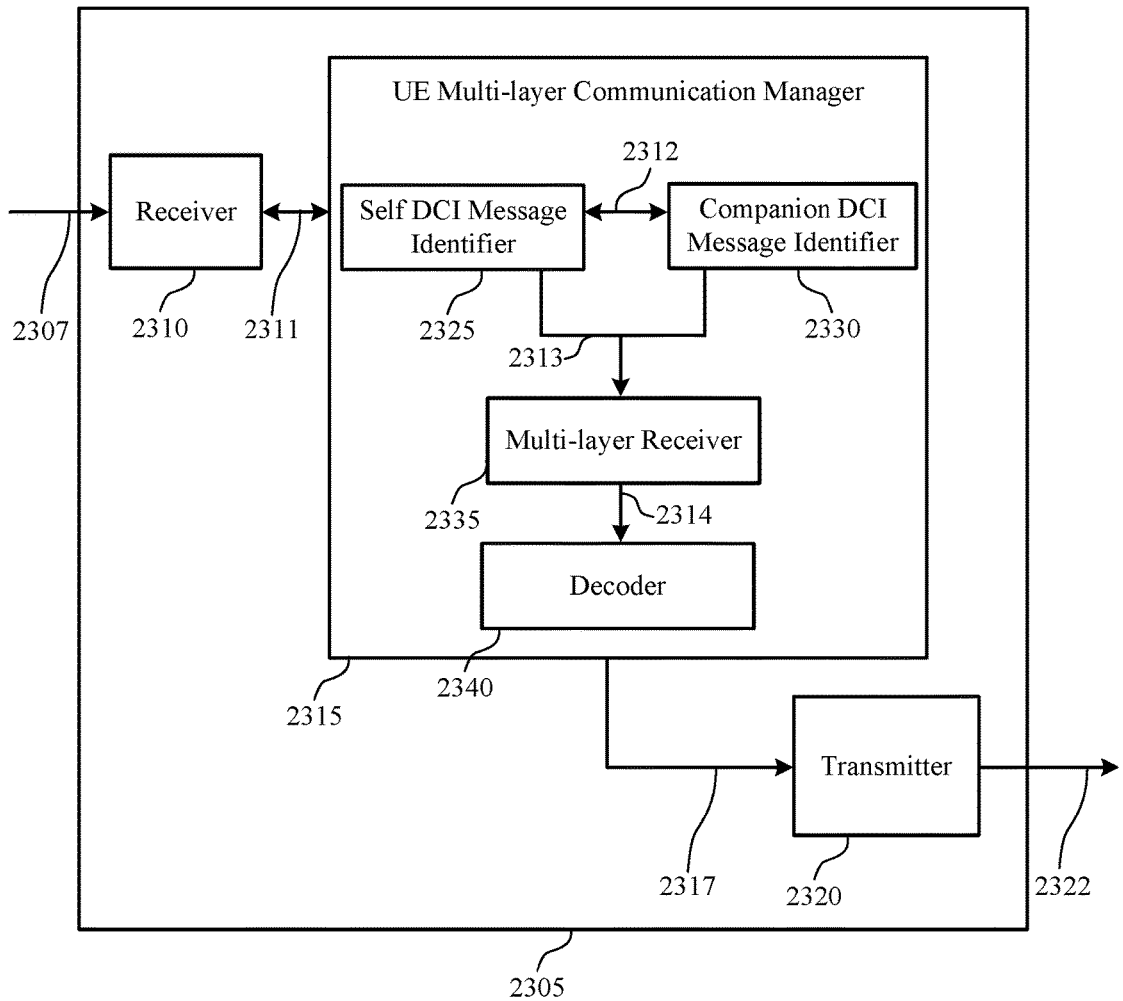

FIG. 23 shows a block diagram 2300 of a wireless device 2305 that supports downlink control information for multi-layer transmissions in accordance with various aspects of the present disclosure. Wireless device 2305 may be an example of aspects of a wireless device 2205 or a UE 115 as described with reference to FIGS. 1 and 22. Wireless device 2305 may include receiver 2310, UE multi-layer communication manager 2315, and transmitter 2320. Wireless device 2305 may also include a processor. Each of these components may be in communication with one another (e.g., via one or more buses).

Receiver 2310 may receive a signal 2307, which may carry information such as packets, user data, or control information associated with various information channels (e.g., control channels, data channels, and information related to downlink control information for multi-layer transmissions, etc.). Signal 2307 may be a downlink transmission. Receiver 2310 may pass information on to other components of the device via signal 2311. Signal 2311 may be the same as the signal 2307 received at receiver 2310, or may be a representation of the signal 2307. For instance, signal 2311 may be a filtered or digitized version of signal 2307 or may represent information extracted from signal 2307. The receiver 2310 may be an example of aspects of the transceiver 2535 described with reference to FIG. 25.

UE multi-layer communication manager 2315 may also include self DCI message identifier 2325, companion DCI message identifier 2330, multi-layer receiver 2335, and decoder 2340. UE multi-layer communication manager 2315 may receive signal 2311 and provide aspects of signal 2311 to components of the UE multi-layer communication manager 2315.

Self DCI message identifier 2325 may identify, in a control channel of signal 2311 (which may be a downlink transmission), a DCI message that includes first scheduling information for a grant of resources to the first UE in a first layer of the downlink transmission. Self DCI message identifier 2325 may also identify an indicator in the identified DCI message indicating that a companion DCI message is present in the control channel. In some cases, the DCI message also indicates a location of the companion DCI message, an aggregation level or an offset relative to an aggregation level of the companion DCI message, an index of a decoding candidate, a size of the companion DCI message, or a format of the companion DCI message. In some cases, self DCI message identifier 2325 may decode candidate DCI messages using a predetermined radio network temporary identifier (RNTI) associated with the one or more companion DCI messages. Self DCI message identifier 2325 may pass scheduling information 2312 to companion DCI message identifier 2330.

Companion DCI message identifier 2330 may identify, in a control channel of signal 2311 (which may be a downlink transmission), a companion DCI message that includes second scheduling information for at least one other layer of the downlink transmission based on the received scheduling information 2312. For instance, companion DCI message identifier 2330 may determine the companion DCI message is located at a second candidate location in the search space (e.g., offset from the first candidate location by a known amount). In some cases, identifying the companion DCI message includes monitoring the control channel of a transmission time interval (TTI) associated with the at least one other layer, where the TTI associated with the at least one other layer is a different length than a TTI associated with the first layer. Self DCI message identifier 2325 and companion DCI message identifier 2330 may pass transmission information 2313 to multi-layer receiver 2335. The transmission information 2313 may include transmission parameters such as RB allocations, MCS, etc. and may indicate to the multi-layer receiver 2335 where data intended for the wireless device 2305 is located.

In some cases, the companion DCI message includes a resource block allocation indicator, a resource block allocation type indicator, a modulation and coding scheme (MCS) indicator, a redundancy version indicator, a traffic to pilot ratio indicator, a resource hopping scheme indicator, a starting symbol indicator, an ending symbol indicator, an indication of a number of transmission time intervals for which DCI included in the companion DCI message applies for sets of resources of the at least one other layer, a transmission configuration index indicating a combination of a transmission mode, a precoding matrix, a demodulation reference signal orthogonal cover length indicator, an MCS table type indicator, a spatial-layer indicator, or a transmission mode.

Multi-layer receiver 2335 may receive the data intended for the wireless device 2305 in the downlink transmission based on the self DCI message, while also receiving the data intended for other devices that is transmit on other transmission layers. In some cases, the multi-layer receiver 2335 may perform interference cancellation of the transmission on the other layers (e.g., based on the information received in the companion DCI message). The multi-layer receiver 2335 may pass the received data signal 2314 to the decoder.

Decoder 2340 may decode the data in the received data signal 2314 from the downlink transmission based on the DCI message and the companion DCI message. Decoder 2340 may also demodulate the resources of the first layer based on the determined transmission configurations for the at least one other layer. UE multi-layer communication manager 2315 may send an indication 2317 to transmitter 2320 that the downlink transmission has been successfully decoded.

Transmitter 2320 may transmit signals 2322 based on signals generated by other components of the device (e.g., indication 2317). In some examples, the transmitter 2320 may be collocated with a receiver 2310 in a transceiver module. For example, the transmitter 2320 may be an example of aspects of the transceiver 2535 described with reference to FIG. 25. The transmitter 2320 may include a single antenna, or it may include a set of antennas.

Figure 24:
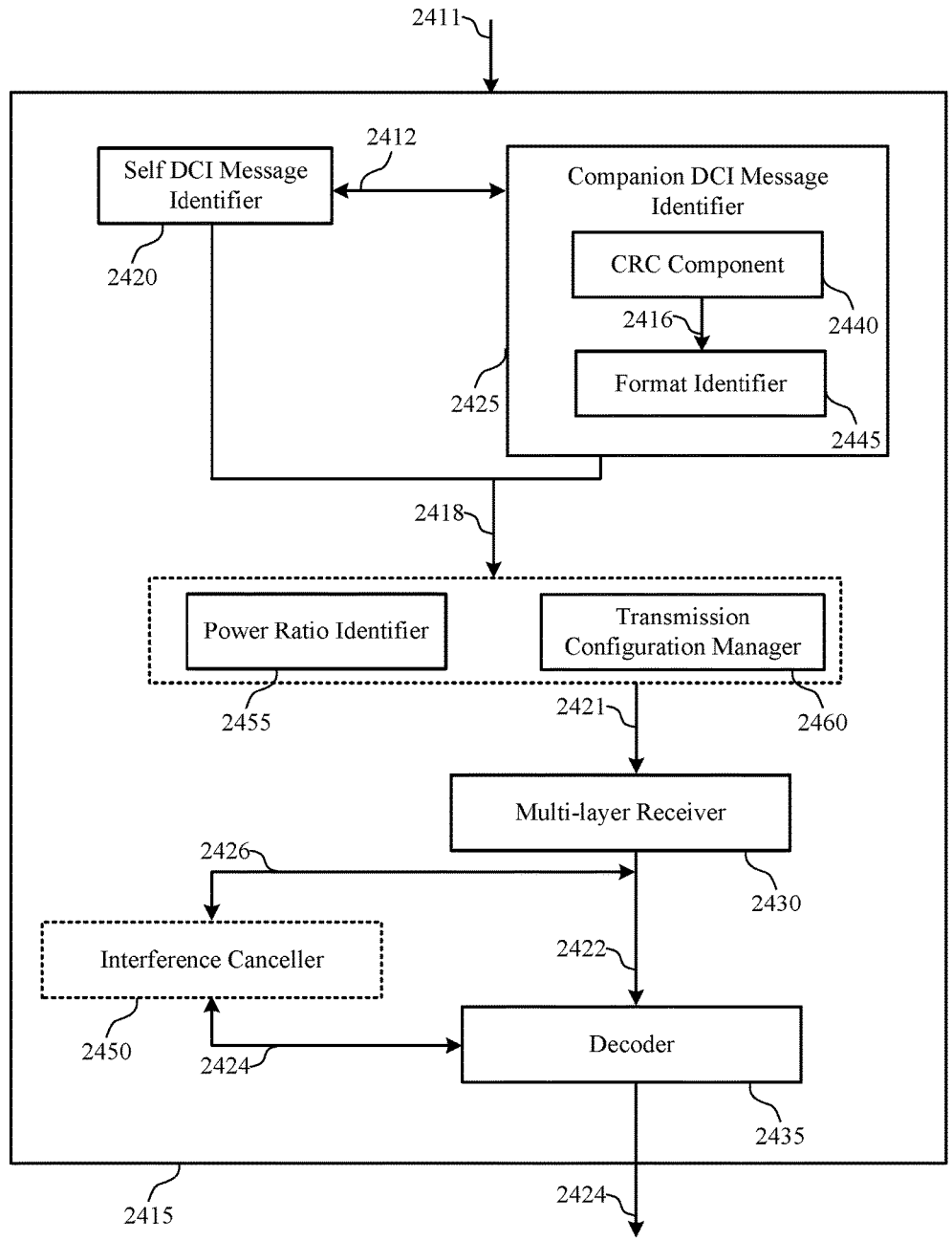

FIG. 24 shows a block diagram 2400 of a UE multi-layer communication manager 2415 that supports downlink control information for multi-layer transmissions in accordance with various aspects of the present disclosure. The UE multi-layer communication manager 2415 may be an example of aspects of UE multi-layer communication manager 2215, UE multi-layer communication manager 2315, or UE multi-layer communication manager described with reference to FIG. 22, 23, or 25. The UE multi-layer communication manager 2415 may include self DCI message identifier 2420, companion DCI message identifier 2425, multi-layer receiver 2430, decoder 2435, cyclic redundancy check (CRC) component 2440, format identifier 2445, interference canceller 2450, power ratio identifier 2455, and transmission configuration manager 2460. Each of these modules may communicate, directly or indirectly, with one another (e.g., via one or more buses).

Self DCI message identifier 2420 may receive a signal 2411, which may be representative of a multi-layer downlink transmission and may include a control and a data channel. Self DCI message identifier 2420 may identify, in the control channel of the downlink transmission, a DCI message that includes first scheduling information for a grant of resources to the first UE in a first layer of the downlink transmission and identify an indicator in the DCI message indicating that the companion DCI message is present in the control channel. In some cases, the DCI message indicates a location of the companion DCI message, an aggregation level of the companion DCI message, an index of a decoding candidate, a size of the companion DCI message, or a format (which may be selected from one of a plurality of pre-determined formats) of the companion DCI message.

Companion DCI message identifier 2425 may identify, in a control channel of signal 2311 (which may be a downlink transmission), a companion DCI message that includes second scheduling information for at least one other layer of the downlink transmission based on the received scheduling information 2412. For instance, companion DCI message identifier 2425 may determine the companion DCI message is located at a second candidate location in the search space (e.g., offset from the first candidate location by a known amount). Self DCI message identifier 2420 may also determine an aggregation level or an aggregation level offset of the companion DCI message relative to the DCI message. In some cases, identifying the companion DCI message includes monitoring the control channel of a transmission time interval (TTI) associated with the at least one other layer, where the TTI associated with the at least one other layer is a different length than a TTI associated with the first layer. Companion DCI message identifier 2425 may include CRC component 2440 and format identifier 2445.

In some cases, the companion DCI message includes a resource block allocation indicator, a resource block allocation type indicator, a modulation and coding scheme (MCS) indicator, a redundancy version indicator, a traffic to pilot ratio indicator, a resource hopping scheme indicator, a starting symbol indicator, an ending symbol indicator, an indication of a number of transmission time intervals for which DCI included in the companion DCI message applies for sets of resources of the at least one other layer, a transmission configuration index indicating a combination of a transmission mode, a precoding matrix, a demodulation reference signal orthogonal cover length indicator, an MCS table type indicator, a spatial-layer indicator, or a transmission mode. The companion DCI message may also include a data portion and a CRC portion. In some cases, the companion DCI message comprises one or more records having DCI for respective set of resources of a co-scheduled layer of a downlink transmission.

After companion DCI message identifier 2425 determines the location of the companion DCI message, the CRC component 2440 may calculate a CRC value for the data portion of the companion DCI message and determine a UE-RNTI of a co-scheduled UE based on the calculated CRC value and the CRC portion. Additionally or alternatively, the companion DCI message identifier 2425 may determine a format of the companion DCI message based on the calculated CRC value and the CRC portion. For example, the CRC value may correspond to an RNTI value, which in turn may correspond to one of a plurality of pre-determined formats of the companion DCI message. In some cases, the companion DCI message identifier 2425 may calculate a second CRC value based on a subset of the data portion of the companion DCI message, and validate the data portion of the companion DCI message by comparing the second CRC value with an embedded CRC field in the data portion of the companion DCI message. The CRC component 2440 may pass the CRC portion 2416 to the format identifier 2445.

Format identifier 2445 may decode candidate DCI messages based on a predetermined RNTI associated with the one or more companion DCI messages. For example, format identifier 2445 may extract fields of the companion DCI message according to one of the set of pre-determined formats corresponding to a reserved RNTI values used to scramble the CRC portion. In some cases, the format identifier 2445 may determine that the CRC portion was scrambled with the RNTI of a co-scheduled UE and may extract fields of the companion DCI message according to the single co-scheduled UE format. The Self DCI message identifier 2420 and the companion DCI message identifier 2425 may pass a representation of signal 2411, along with DCI configuration information 2418 to the power ratio identifier 2455 and the transmission configuration manager 2460. DCI configuration information 2418 may include the companion DCI message and the corresponding format of the companion DCI message. The formats may include a first format that comprises one record associated with multiple co-scheduled UEs, a second format that comprises a separate record for each of a plurality of co-scheduled UEs, and a single co-scheduled UE format that comprises a single record for a single co-scheduled UE.

Power ratio identifier 2455 may use the DCI configuration information 2418 to determine a power ratio between the at least one other layer and the first layer for the demodulating based on a set of power ratio values associated with a modulation order for the first layer and a power ratio index in the companion DCI message.

Transmission configuration manager 2460 may use the DCI configuration information 2418 to determine a spatial layer usage configuration for respective sets of resources of at least one other layer of a downlink transmission. In some cases, at least one of the respective sets of resources corresponds to a plurality of co-scheduled UEs. Transmission configuration manager 2460 may determine one or more transmission configurations for resources of the at least one other layer corresponding to the granted resources for the first layer. Transmission configuration manager 2460 may merge a first record and a second record of the one or more records for the determining of the spatial layer usage configuration for the set of spatial layers of the downlink transmission.

In some cases, the transmission configuration manager 2460 determines a spatial layer usage configuration for a set of spatial layers of the downlink transmission for at least one respective set of resources, where the set of spatial layers includes one or more spatial layers not in the first set of spatial layers. In some cases, transmission configuration manager 2460 may also identify an orthogonal cover code length for reference signals transmitted on antenna ports of the downlink transmission based on the spatial layer usage configuration and may identify an association of the set of spatial layers to antenna ports of the downlink transmission based on the spatial layer usage configuration. Transmission configuration manager 2460 may also perform channel estimation for the demodulating based on an identified orthogonal cover code length and reference signals transmitted on the antenna ports based on the identified association of the set of spatial layers to the antenna ports.

The power ratio identifier 2455 and the transmission configuration manager 2460 may pass downlink transmission information 2421 to the multi-layer receiver 2430. Downlink transmission information 2421 may include control information from the self DCI message, in addition to power ratios and spatial layer configurations. Multi-layer receiver 2430 may receive the data portion 2422 included in the signal 2411 and intended for the wireless device based on the DCI message. The received data portion 2422 may then be passed to decoder 2435. In some cases, the multi-layer receiver 2430 may pass the data portion 2422 directly to the interference canceller 2450.

Decoder 2435 may decode the data portion 2422 of the downlink transmission based on the DCI message and the companion DCI message. Decoding the downlink transmission may include demodulating the resources of the first set of spatial layers based on a determined spatial layer usage configuration. The decoder may also demodulate the resources of the first layer based on the determined transmission configurations for the at least one other layer. In some cases, decoder 2435 may pass the decoded signal 2424 to the interference canceller 2450.

Interference canceller 2450 may perform reduced RML or SLIC of one or more associated transmission layers associated with the data portion 2422 according to information included by the DCI message and the companion DCI message. Interference canceller 2450 may also perform CWIC of the at least one other layer of the downlink transmission based on the RNTI of the co-scheduled UE and a record of the single co-scheduled UE format, where the second scheduling information is for a grant of resources to the co-scheduled UE. In some cases, interference canceller 2450 may receive decoded signal 2424 and perform interference cancellation based on the decoded signal 2424. interference canceller 2450 may pass the signal 2426 back to the decoder 2435 after cancelling interference from other transmission layers.

Figure 25:
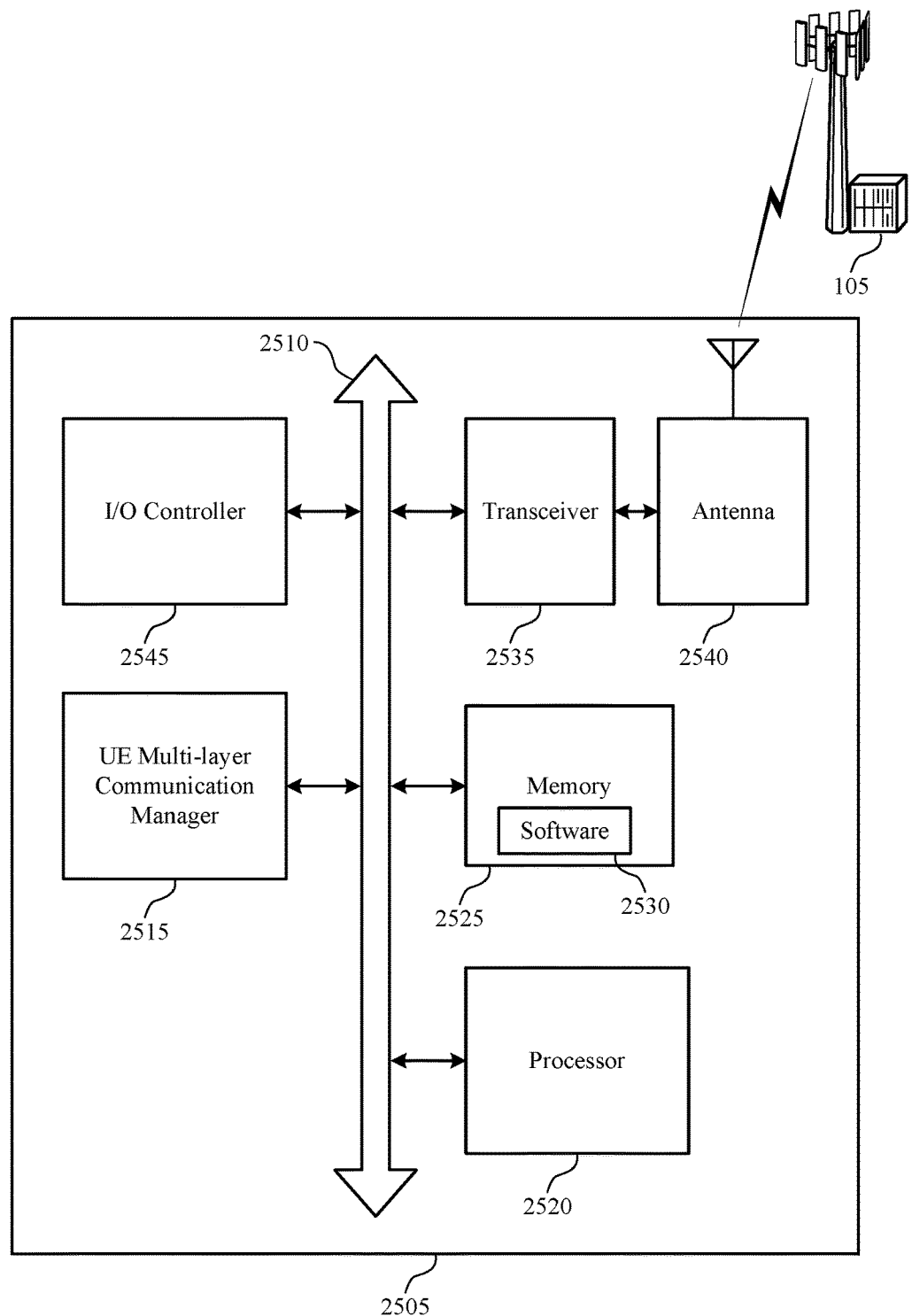
FIG. 25 illustrates a block diagram of a system including a UE that supports downlink control information for multi-layer transmissions in accordance with aspects of the present disclosure.

FIG. 25 shows a diagram of a system 2500 including a device 2505 that supports downlink control information for multi-layer transmissions in accordance with various aspects of the present disclosure. Device 2505 may be an example of or include the components of wireless device 2205, wireless device 2305, or a UE 115 as described above, e.g., with reference to FIGS. 1, 22 and 23. Device 2505 may include components for bi-directional voice and data communications including components for transmitting and receiving communications, including UE multi-layer communication manager 2515, processor 2520, memory 2525, software 2530, transceiver 2535, antenna 2540, and I/O controller 2545. These components may be in electronic communication via one or more busses (e.g., bus 2510). Device 2505 may communicate wirelessly with one or more base stations 105.

Processor 2520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 2520 may be configured to operate a memory array using a memory controller. In other cases, a memory controller may be integrated into processor 2520. Processor 2520 may be configured to execute computer-readable instructions stored in a memory to perform various functions (e.g., functions or tasks supporting downlink control information for multi-layer transmissions).

Memory 2525 may include random access memory (RAM) or read only memory (ROM). The memory 2525 may store computer-readable, computer-executable software 2530 including instructions that, when executed, cause the processor to perform various functions described herein. In some cases, the memory 2525 may contain, among other things, a basic input/output system (BIOS) which may control basic hardware and/or software operation such as the interaction with peripheral components or devices.

Software 2530 may include code to implement aspects of the present disclosure, including code to support downlink control information for multi-layer transmissions. Software 2530 may be stored in a non-transitory computer-readable medium such as system memory or other memory. In some cases, the software 2530 may not be directly executable by the processor but may cause a computer (e.g., when compiled and executed) to perform functions described herein.

Transceiver 2535 may communicate bi-directionally, via one or more antennas, wired, or wireless links as described above. For example, the transceiver 2535 may represent a wireless transceiver and may communicate bi-directionally with another wireless transceiver. The transceiver 2535 may also include a modem to modulate the packets and provide the modulated packets to the antennas for transmission, and to demodulate packets received from the antennas.

In some cases, the wireless device may include a single antenna 2540. However, in some cases the device may have more than one antenna 2540, which may be capable of concurrently transmitting or receiving multiple wireless transmissions.

I/O controller 2545 may manage input and output signals for device 2505. I/O controller 2545 may also manage peripherals not integrated into device 2505. In some cases, I/O controller 2545 may represent a physical connection or port to an external peripheral. In some cases, I/O controller 2545 may utilize an operating system such as iOS®, ANDROID®, MS-DOS®, MS-WINDOWS®, OS/2®, UNIX®, LINUX®, or another known operating system. In other cases, I/O controller 2545 may represent or interact with a modem, a keyboard, a mouse, a touchscreen, or a similar device. In some cases, I/O controller 2545 may be implemented as part of a processor. In some cases, a user may interact with device 2505 via I/O controller 2545 or via hardware components controlled by I/O controller 2545.

Figure 26:
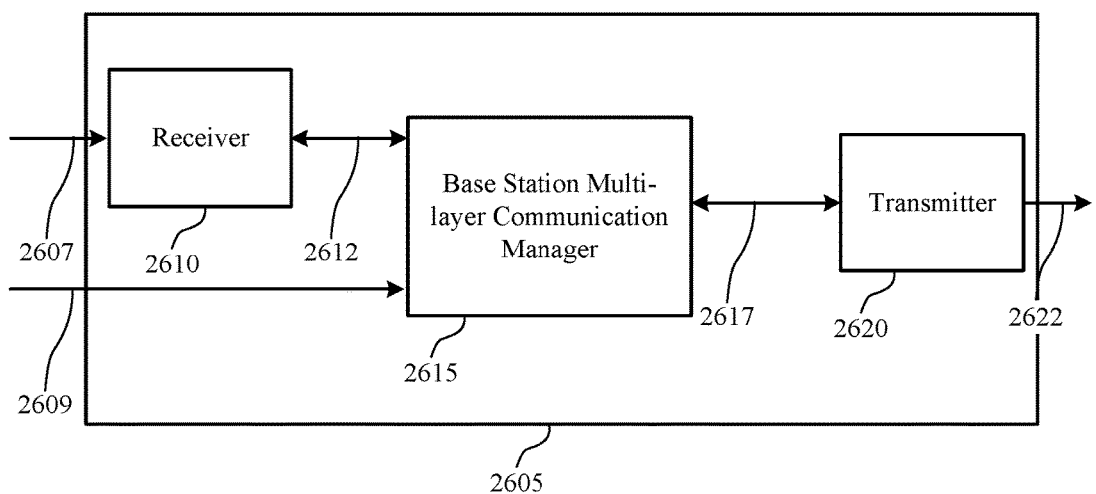
FIGS. 26 through 28 show block diagrams of a device that supports downlink control information for multi-layer transmissions in accordance with aspects of the present disclosure.

FIG. 26 shows a block diagram 2600 of a wireless device 2605 that supports downlink control information for multi-layer transmissions in accordance with various aspects of the present disclosure. Wireless device 2605 may be an example of aspects of a base station 105 as described with reference to FIG. 1. Wireless device 2605 may include receiver 2610, base station multi-layer communication manager 2615, and transmitter 2620. wireless device 2605 may also include a processor. Each of these components may be in communication with one another (e.g., via one or more buses).

Receiver 2610 may receive signal 2607. Signal 2607 may include information such as packets, user data, or control information associated with various information channels (e.g., control channels, data channels, and information related to downlink control information for multi-layer transmissions, etc.). Receiver 2610 may pass this information on to other components of the device. For instance, receiver 2610 may pass signal 2612 to other aspects of wireless device 2605. Signal 2612 may be the same as signal 2607, or may be a representation (e.g., a filtered or digitized version) of signal 2607. In some cases, receiver 2610 may extract information from signal 2607 and signal 2612 may convey the extracted information to other aspects of wireless device 2605. The receiver 2610 may be an example of aspects of the transceiver 2935 described with reference to FIG. 29.

Base station multi-layer communication manager 2615 and/or at least some of its various sub-components may be implemented in hardware, software executed by a processor, firmware, or any combination thereof. If implemented in software executed by a processor, the functions of the base station multi-layer communication manager 2615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station multi-layer communication manager 2615 and/or at least some of its various sub-components may be physically located at various positions, including being distributed such that portions of functions are implemented at different physical locations by one or more physical devices. In some examples, base station multi-layer communication manager 2615 and/or at least some of its various sub-components may be a separate and distinct component in accordance with various aspects of the present disclosure. In other examples, base station multi-layer communication manager 2615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station multi-layer communication manager 2615 may receive user data 2609 from a data interface that manages user data for associated UEs. Base station multi-layer communication manager 2615 may schedule a downlink transmission to a first UE and at least one co scheduled UE, the downlink transmission including a first layer for the first UE and at least one other layer for the at least one co-scheduled UE. Base station multi-layer communication manager 2615 may transmit control information associated with the downlink transmission to the first UE over a control channel, the control information including a DCI message and a companion DCI message, where the DCI message includes first scheduling information for a grant of resources to the first UE in the first layer of the downlink transmission and the companion DCI message includes second scheduling information for the at least one other layer of the downlink transmission to be used for decoding of the downlink transmission by the first UE. Base station multi-layer communication manager 2615 may pass transmission information 2617 to transmitter 2620. Transmission information 2617 may include scheduling or control information and corresponding data to be transmitted.

Transmitter 2620 may transmit signals generated by other components of the device. For instance, transmitter 2620 may receive transmission information 2617 and transmit downlink transmission 2622 according to the received transmission information 2617. In some examples, the transmitter 2620 may be collocated with a receiver 2610 in a transceiver module. For example, the transmitter 2620 may be an example of aspects of the transceiver 2935 described with reference to FIG. 29. The transmitter 2620 may include a single antenna, or it may include a set of antennas. In some examples, transmitter 2620 may transmit the downlink transmission 2622 to the first UE and the at least one co-scheduled UE.

Figure 27:
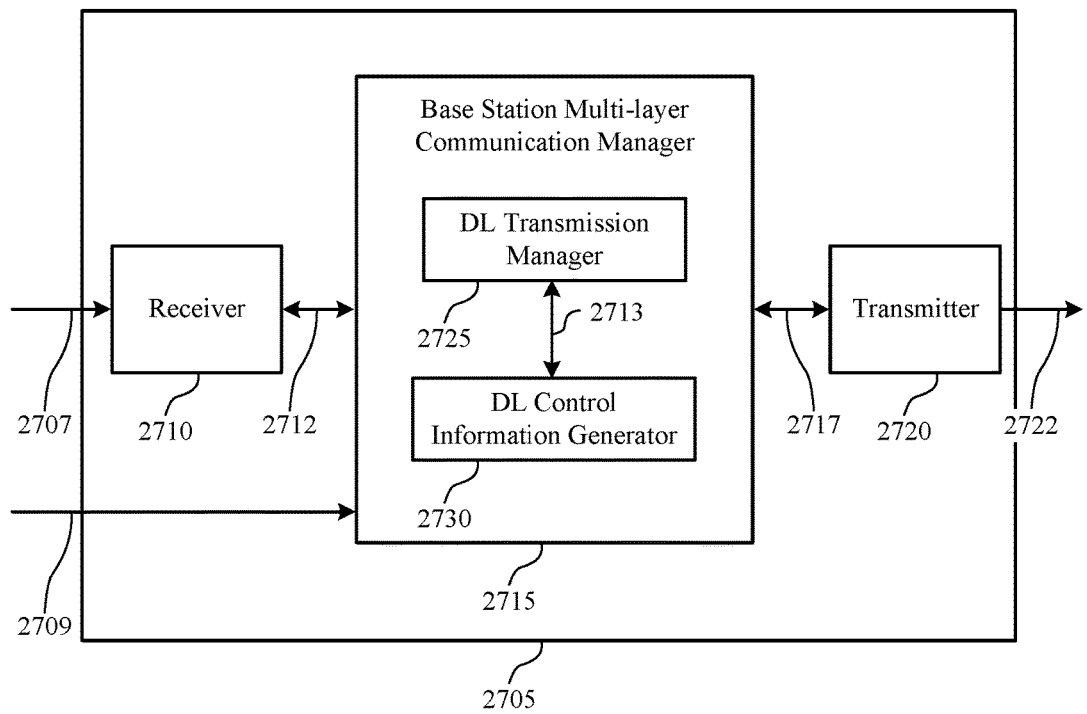

FIG. 27 shows a block diagram 2700 of a wireless device 2705 that supports downlink control information for multi-layer transmissions in accordance with various aspects of the present disclosure. Wireless device 2705 may be an example of aspects of a wireless device 2605 or a base station 105 as described with reference to FIGS. 1 and 26. wireless device 2705 may include receiver 2710, base station multi-layer communication manager 2715, and transmitter 2720. Wireless device 2705 may also include a processor. Each of these components may be in communication with one another (e.g., via one or more buses).

Receiver 2710 may receive signal 2707. Signal 2707 may include information such as packets, user data, or control information associated with various information channels (e.g., control channels, data channels, and information related to downlink control information for multi-layer transmissions, etc.). Receiver 2710 may pass this information on to other components of the device. For instance, receiver 2710 may pass signal 2712 to other aspects of wireless device 2705. Signal 2712 may be the same as signal 2707, or may be a representation (e.g., a filtered or digitized version) of signal 2707. In some cases, receiver 2710 may extract information from signal 2707 and signal 2712 may convey the extracted information to other aspects of wireless device 2705. The receiver 2710 may be an example of aspects of the transceiver 2935 described with reference to FIG. 29.

Base station multi-layer communication manager 2715 may include downlink (DL) transmission manager 2725 and DL control information generator 2730.

DL transmission manager 2725 may receive user data 2709 from a data interface that manages user data for associated UEs. DL transmission manager 2725 may schedule a downlink transmission to a first UE and at least one co scheduled UE based on the user data received 2709. The downlink transmission may include a first layer for the first UE and at least one other layer for the at least one co-scheduled UE. DL transmission manager may pass a data portion 2713 of the downlink transmission to DL control information generator 2730.

DL control information generator 2730 may receive the data portion 2713 and may generate control information associated with the downlink transmission to the first UE over a control channel, the control information including a DCI message and a companion DCI message, where the DCI message includes first scheduling information for a grant of resources to the first UE in the first layer of the downlink transmission and the companion DCI message includes second scheduling information for the at least one other layer of the downlink transmission to be used for decoding of the downlink transmission by the first UE. DL control information generator 2730 may configure, based on the scheduling, the DCI message and the companion DCI message including one or more records having a spatial layer usage configuration for the set of spatial layers across respective sets of resources, where at least one of the respective sets of resources is co-scheduled with the grant of resources to the first UE. In some cases, the control information further includes a third DCI message intended for the at least one co-scheduled UE, the third DCI message including third scheduling information associated with the at least one other layer that is additional to the second scheduling information of the companion DCI message. Base station multi-layer communication manager 2715 may pass transmission information 2717, which may include the user data 2709 and the associated control information generated by DL control information generator 2730.

Transmitter 2720 may transmit signals generated by other components of the device. For instance, transmitter 2720 may receive transmission information 2717 and transmit downlink transmission 2722 according to the received transmission information 2717. In some examples, the transmitter 2720 may be collocated with a receiver 2710 in a transceiver module. For example, the transmitter 2720 may be an example of aspects of the transceiver 2935 described with reference to FIG. 29. The transmitter 2720 may include a single antenna, or it may include a set of antennas. In some examples, transmitter 2720 may transmit the downlink transmission 2722 to the first UE and the at least one co-scheduled UE.

Figure 28:
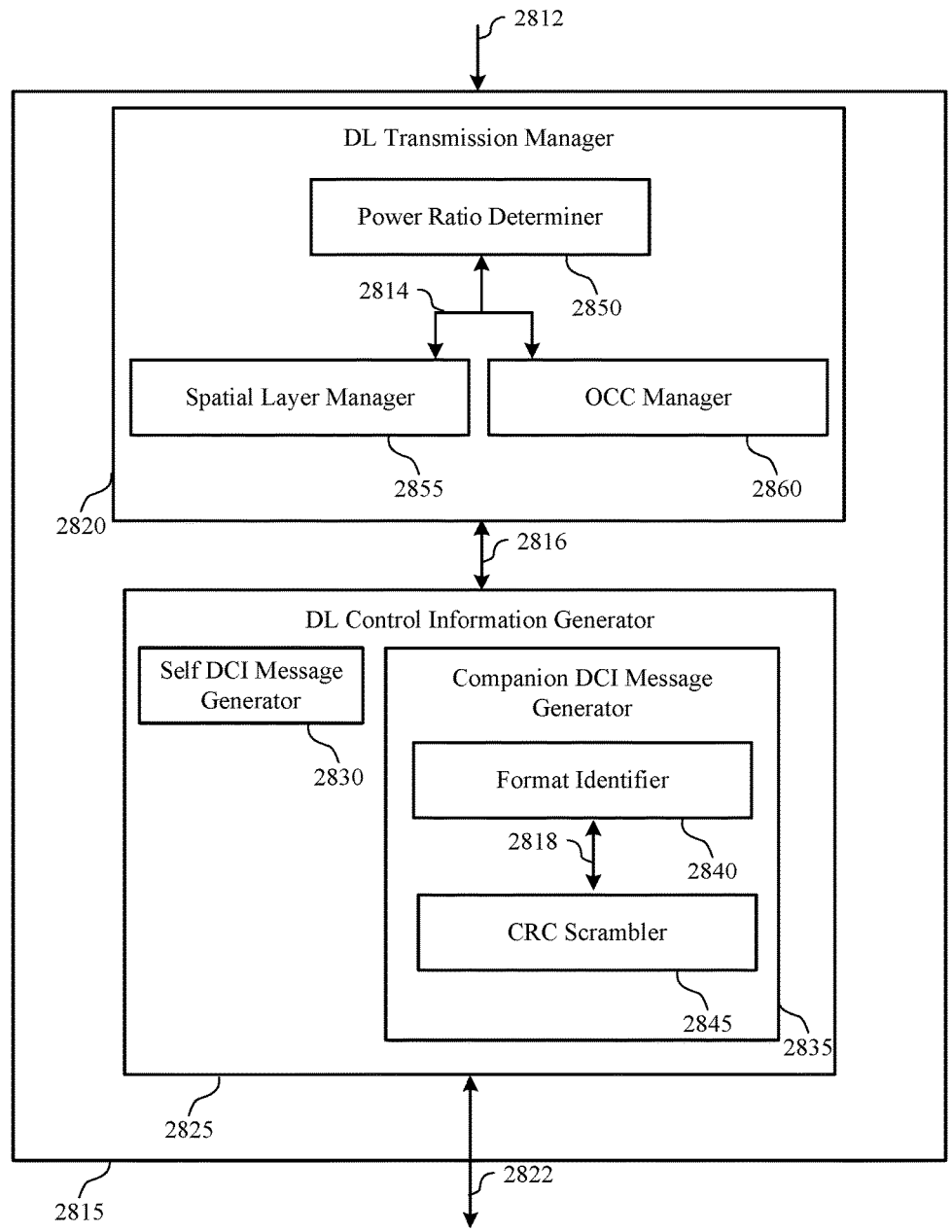

FIG. 28 shows a block diagram 2800 of a base station multi-layer communication manager 2815 that supports downlink control information for multi-layer transmissions in accordance with various aspects of the present disclosure. The base station multi-layer communication manager 2815 may be an example of aspects of a base station multi-layer communication manager described with reference to FIGS. 26, 27, and 29. The base station multi-layer communication manager 2815 may include DL transmission manager 2820, DL control information generator 2825, self DCI message generator 2830, companion DCI message generator 2835, format identifier 2840, CRC scrambler 2845, power ratio determiner 2850, OCC manager 2860, and spatial layer manager 2855. Each of these modules may communicate, directly or indirectly, with one another (e.g., via one or more buses).

DL transmission manager 2820 may receive user data 2812 for one or more UEs. DL transmission manager 2820 may schedule a downlink transmission to a first UE and at least one co scheduled UE, the downlink transmission including a first layer for the first UE and at least one other layer for the at least one co-scheduled UE. DL transmission manager 2820 may schedule one or more UEs to simultaneously receive user data using multi-user communication schemes, such as NOMA, MUST, or MU-MIMO. DL transmission manager 2820 may also include a power ratio determiner 2850, a spatial layer manager 2855, and an OCC manager 2860, which may be used to facilitate the generation of a multi-layer transmission generated according to the selected multi-user scheme.

Power ratio determiner 2850 may determine a power ratio between the at least one other layer and the first layer. Power ratio determiner 2850 may pass the determined power ratio 2814 to the spatial layer manager 2855 and/or the OCC manager 2860.

OCC manager 2860 may determine an orthogonal cover code length based on an operating mode for the set of spatial layers for the downlink transmission over the respective sets of resources and convey the orthogonal cover code length in the spatial layer usage configuration, where the spatial layer usage configuration includes a reference signal seed identifier for the set of spatial layers. The spatial layer usage configuration may include respective reference signal seed identifiers for each of set of spatial layers.

Spatial layer manager 2855 may determine an association of the set of spatial layers to antenna ports of the downlink transmission for the downlink transmission over the respective sets of resources, and may convey the association of the set of spatial layers to the antenna ports of the downlink transmission in the spatial layer usage configuration. Spatial layer manager 2855 may also merge spatial layer usage configurations associated with two or more UEs of the set of UEs associated with different resource grants on the same spatial layer into a single one of the one or more records based on determining that parameters of the spatial layer usage configurations for the two or more of the set of UEs are consistent with each other. The power ratio determiner 2850, OCC manager 2860, and spatial layer manager 2855 may be used to generate a single downlink transmission to multiple UE's utilizing one or more multi-user communication schemes. The DL transmission manager 2820 may pass a transmission configuration 2816 that is indicative of which multi-user communication schemes are being used to communicate data to which co-scheduled UEs.

DL control information generator 2825 may receive the transmission configuration 2816 and generate control information based on the selected transmission configuration 2816. DL control information generator 2825 may transmit control information associated with the downlink transmission to the first UE over a control channel, the control information including a DCI message and a companion DCI message, where the DCI message includes first scheduling information for a grant of resources to the first UE in the first layer of the downlink transmission and the companion DCI message includes second scheduling information for the at least one other layer of the downlink transmission to be used for decoding of the downlink transmission by the first UE. DL control information generator 2825 may configure, based on the scheduling, the DCI message and the companion DCI message including one or more records having a spatial layer usage configuration for the set of spatial layers across respective sets of resources, where at least one of the respective sets of resources is co-scheduled with the grant of resources to the first UE. In some cases, the control information further includes a third DCI message intended for the at least one co-scheduled UE, the third DCI message including third scheduling information associated with the at least one other layer that is additional to the second scheduling information of the companion DCI message. DL control information generator 2825 may pass an indication of a downlink transmission 2822 or a downlink transmission 2822 to other aspects of a wireless device employing base station multi-layer communication manager 2815.

Self DCI message generator 2830 may construct a self DCI message that indicates a location of the companion DCI message, an aggregation level of the companion DCI message, an index of a decoding candidate, a size of the companion DCI message, a format of the companion DCI message, an aggregation level, a location of the companion DCI message relative to the DCI message, or a relative offset from an aggregation level (e.g., a relative offset from the self DCI aggregation level).

Companion DCI message generator 2835 may configure, based on the scheduling, the companion DCI message including one or more records having DCI for respective sets of resources of the at least one other layer of the transmission, where at least one of the respective sets of resources corresponds to a transmission configuration associated with a set of co-scheduled UEs. For example, companion DCI message generator 2835 may include, in the companion DCI message, an indication of the determined power ratio, where the indication includes a power ratio index corresponding to one of a set of power ratio values associated with a modulation order for the first layer. Companion DCI message generator 2835 may include, in the companion DCI message, an indication of at least one of the starting symbol or an ending symbol of the respective sets of resources of the at least one other layer. In some cases, the companion DCI message includes a resource block allocation indicator, a resource block allocation type indicator, an MCS indicator, a modulation order, a redundancy version indicator, a traffic to pilot ratio indicator, a resource hopping scheme indicator, a starting symbol indicator, a demodulation reference signal orthogonal cover length indicator, an MCS table type indicator, a spatial-layer indicator, a transmission mode, a transmission configuration index that indicates a combination of a transmission mode, a precoding matrix indicator, or a rank indicator. Companion DCI message generator 2835 may include format identifier 2840 and CRC scrambler 2845.

Format identifier 2840 may determine a format of the companion DCI message that indicates DCI for the at least one co scheduled UE and select a second format from a set of pre-determined formats for the companion DCI message that includes a separate record for each of the set of co scheduled UEs, where the CRC portion is scrambled with a second reserved RNTI that indicates the second format of the companion DCI message. In some cases, the at least one co scheduled UE includes a set of co scheduled UEs, and the determining includes selecting a first format from a set of pre-determined formats for the companion DCI message that includes one record associated with multiple co scheduled UEs of the set of co scheduled UEs, where the CRC portion is scrambled with a first reserved RNTI that indicates the first format for the companion DCI message. Format identifier 2840 may pass a format indicator 2818 to CRC scrambler 2845.

CRC scrambler 2845 may receive the format indicator 2818 and may scramble a CRC portion of the companion DCI message based on the format indicated by the format indicator 2818, where the scrambling indicates the determined format to the first UE. In some cases, the at least one co scheduled UE includes a single co-scheduled UE, and the determining includes selecting a single co-scheduled UE format for the companion DCI message that includes records for the at least one co-scheduled UE, where the CRC portion is scrambled with the RNTI of the at least one co-scheduled UE that indicates the co-scheduled UE format for the companion DCI message.

Figure 29:
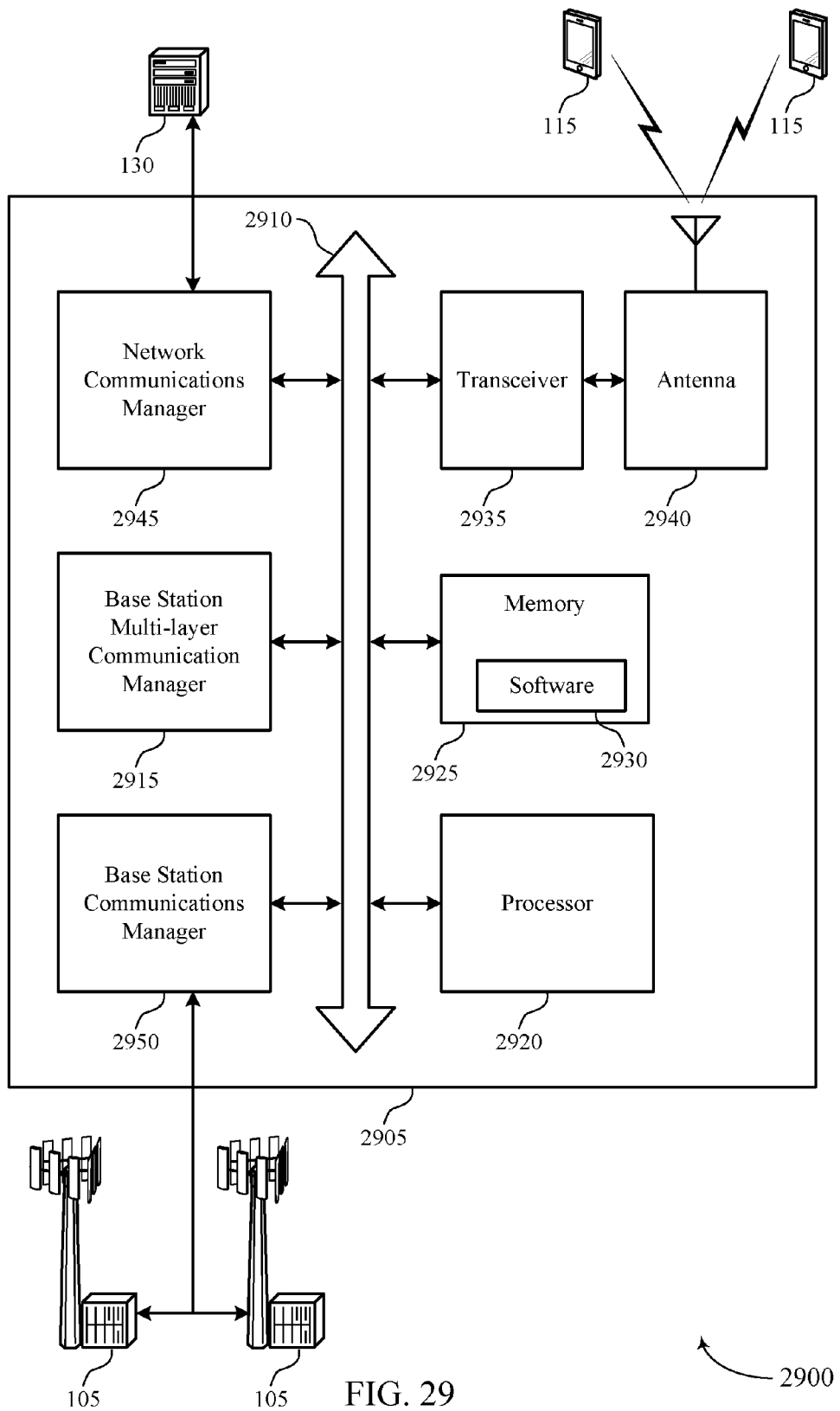
FIG. 29 illustrates a block diagram of a system including a base station that supports downlink control information for multi-layer transmissions in accordance with aspects of the present disclosure.

FIG. 29 shows a diagram of a system 2900 including a wireless device 2905 that supports downlink control information for multi-layer transmissions in accordance with various aspects of the present disclosure. Wireless device 2905 may be an example of or include the components of base station 105 as described above, e.g., with reference to FIG. 1. Wireless device 2905 may include components for bi-directional voice and data communications including components for transmitting and receiving communications, including base station multi-layer communication manager 2915, processor 2920, memory 2925, software 2930, transceiver 2935, antenna 2940, network communications manager 2945, and base station communications manager 2950. These components may be in electronic communication via one or more busses (e.g., bus 2910). Wireless device 2905 may communicate wirelessly with one or more UEs 115.

Processor 2920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2920 may be configured to operate a memory array using a memory controller. In other cases, a memory controller may be integrated into processor 2920. Processor 2920 may be configured to execute computer-readable instructions stored in a memory to perform various functions (e.g., functions or tasks supporting downlink control information for multi-layer transmissions).

Memory 2925 may include RAM and ROM. The memory 2925 may store computer-readable, computer-executable software 2930 including instructions that, when executed, cause the processor to perform various functions described herein. In some cases, the memory 2925 may contain, among other things, a BIOS which may control basic hardware and/or software operation such as the interaction with peripheral components or devices.

Software 2930 may include code to implement aspects of the present disclosure, including code to support downlink control information for multi-layer transmissions. Software 2930 may be stored in a non-transitory computer-readable medium such as system memory or other memory. In some cases, the software 2930 may not be directly executable by the processor but may cause a computer (e.g., when compiled and executed) to perform functions described herein.

Transceiver 2935 may communicate bi-directionally, via one or more antennas, wired, or wireless links as described above. For example, the transceiver 2935 may represent a wireless transceiver and may communicate bi-directionally with another wireless transceiver. The transceiver 2935 may also include a modem to modulate the packets and provide the modulated packets to the antennas for transmission, and to demodulate packets received from the antennas.

In some cases, the wireless device may include a single antenna 2940. However, in some cases the device may have more than one antenna 2940, which may be capable of concurrently transmitting or receiving multiple wireless transmissions.

Network communications manager 2945 may manage communications with the core network (e.g., via one or more wired backhaul links). For example, the network communications manager 2945 may manage the transfer of data communications for client devices, such as one or more UEs 115.

Base station communications manager 2950 may manage communications with other base station 105, and may include a controller or scheduler for controlling communications with UEs 115 in cooperation with other base stations 105. For example, the base station communications manager 2950 may coordinate scheduling for transmissions to UEs 115 for various interference mitigation techniques such as beamforming or joint transmission. In some examples, base station communications manager 2950 may provide an X2 interface within an Long Term Evolution (LTE)/LTE-A wireless communication network technology to provide communication between base stations 105.

Figure 30:
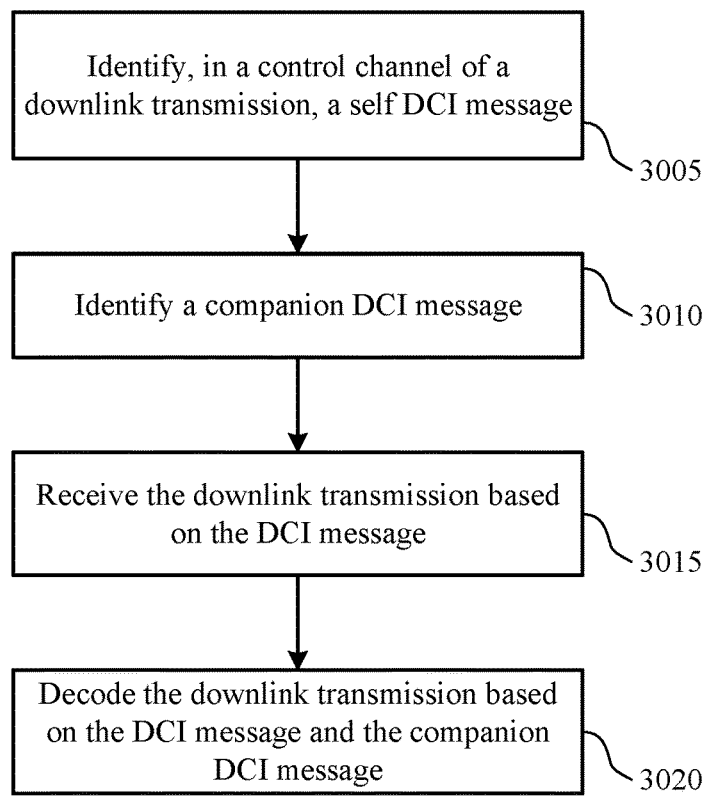
FIGS. 30 through 31 illustrate methods for downlink control information for multi-layer transmissions in accordance with aspects of the present disclosure.

FIG. 30 shows a flowchart illustrating a method 3000 for downlink control information for multi-layer transmissions in accordance with various aspects of the present disclosure. The operations of method 3000 may be implemented by a UE 115 or its components as described herein. For example, the operations of method 3000 may be performed by a UE multi-layer communication manager as described with reference to FIGS. 22 through 25. In some examples, a UE 115 may execute a set of codes to control the functional elements of the device to perform the functions described below. Additionally or alternatively, the UE 115 may perform aspects of the functions described below using special-purpose hardware.

In some examples, a UE may receive a self DCI message in a control channel that indicates that a companion DCI message is also present in the control channel. The self DCI message may include scheduling information associated with a transmission layer carrying data for the UE, while the companion DCI message may carry scheduling information associated with another transmission layer carrying data for a co-scheduled UE. The UE may use the scheduling information in the self DCI message to receive the multi-layered transmission on the appropriate resource blocks and may further use the self DCI message and the companion DCI message to separate the portion of the signal associated with the UE from the portion of the signal associated with the co-scheduled UE. For instance, the UE may use the scheduling information in the companion DCI message to cancel out the contribution from the co-scheduled transmission layer, allowing the UE to properly decode the data provided on the transmission layer.

At block 3005 the UE 115 may identify, in a control channel of a downlink transmission, a DCI message that comprises first scheduling information for a grant of resources to the first UE in a first layer of the downlink transmission. The operations of block 3005 may be performed according to the methods described with reference to FIGS. 1 through 21. In certain examples, aspects of the operations of block 3005 may be performed by a self DCI message identifier as described with reference to FIGS. 22 through 25.

At block 3010 the UE 115 may identify a companion DCI message that comprises second scheduling information for at least one other layer of the downlink transmission. The operations of block 3010 may be performed according to the methods described with reference to FIGS. 1 through 21. In certain examples, aspects of the operations of block 3010 may be performed by a companion DCI message identifier as described with reference to FIGS. 22 through 25.

At block 3015 the UE 115 may receive the downlink transmission based at least in part on the DCI message. The operations of block 3015 may be performed according to the methods described with reference to FIGS. 1 through 21. In certain examples, aspects of the operations of block 3015 may be performed by a multi-layer receiver as described with reference to FIGS. 22 through 25.

At block 3020 the UE 115 may decode the downlink transmission based at least in part on the DCI message and the companion DCI message. The operations of block 3020 may be performed according to the methods described with reference to FIGS. 1 through 21. In certain examples, aspects of the operations of block 3020 may be performed by a decoder as described with reference to FIGS. 22 through 25.

Figure 31:
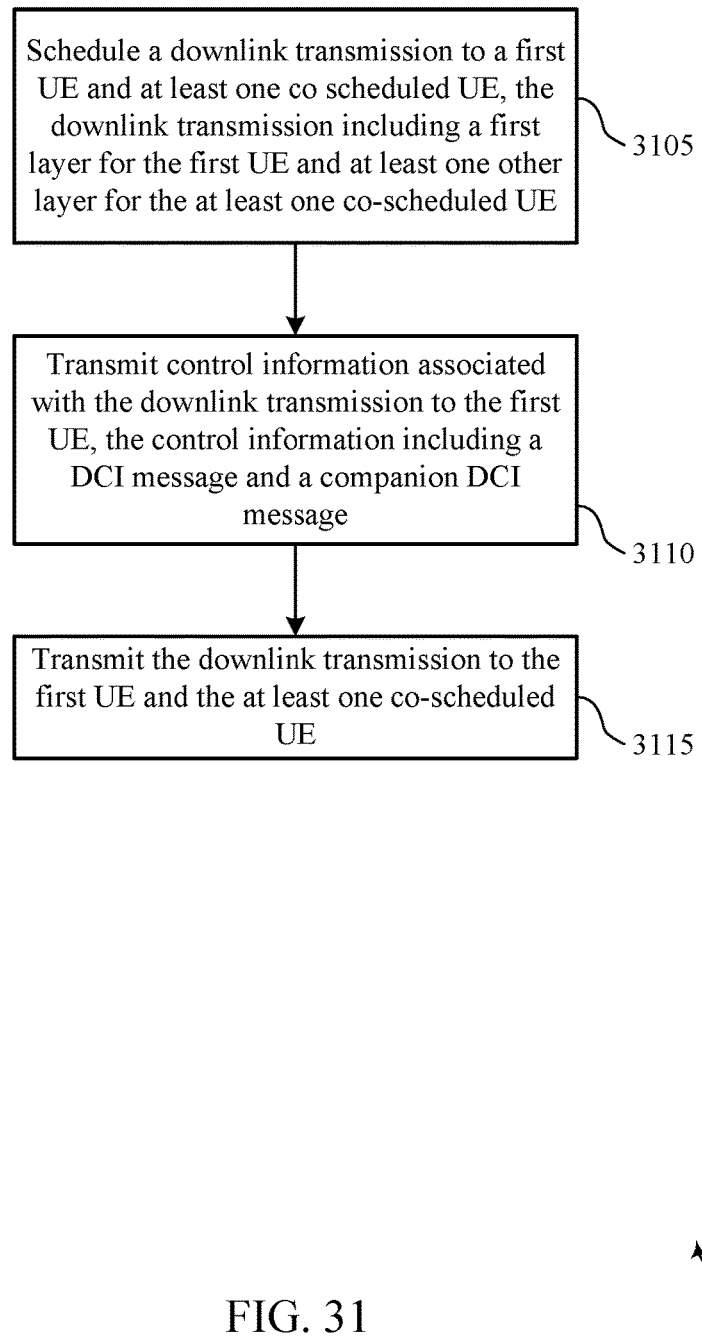

FIG. 31 shows a flowchart illustrating a method 3100 for downlink control information for multi-layer transmissions in accordance with various aspects of the present disclosure. The operations of method 3100 may be implemented by a base station 105 or its components as described herein. For example, the operations of method 3100 may be performed by a base station multi-layer communication manager as described with reference to FIGS. 26 through 29. In some examples, a base station 105 may execute a set of codes to control the functional elements of the device to perform the functions described below. Additionally or alternatively, the base station 105 may perform aspects of the functions described below using special-purpose hardware.

In some cases, a base station may use multi-layer transmissions to service multiple co-scheduled UEs at the same time, while using the same frequency resources. For instance, the base station may designate a first transmission layer of a downlink transmission to a first UE's data and a second transmission layer of the downlink transmission to a second UE's data. To facilitate proper decoding of the downlink transmission by the first UE, the base station may include a companion DCI message, in addition to a self DCI message, with the downlink transmission. The self DCI message may indicate, to the first UE, a resource block allocation and other transmission parameters associated with the first UE's data, while the companion DCI message may indicate, to the first UE, transmission parameters associated with one or more co-scheduled UE's data. The self DCI message may also indicate the presence and/or location of the companion DCI message.

At block 3105 the base station 105 may schedule a downlink transmission to a first user equipment (UE) and at least one co scheduled UE, the downlink transmission comprising a first layer for the first UE and at least one other layer for the at least one co-scheduled UE. The operations of block 3105 may be performed according to the methods described with reference to FIGS. 1 through 21. In certain examples, aspects of the operations of block 3105 may be performed by a DL transmission manager as described with reference to FIGS. 26 through 29.

At block 3110 the base station 105 may transmit control information associated with the downlink transmission to the first UE over a control channel, the control information comprising a downlink control information (DCI) message and a companion DCI message, wherein the DCI message comprises first scheduling information for a grant of resources to the first UE in the first layer of the downlink transmission and the companion DCI message comprises second scheduling information for the at least one other layer of the downlink transmission to be used for decoding of the downlink transmission by the first UE. The operations of block 3110 may be performed according to the methods described with reference to FIGS. 1 through 21. In certain examples, aspects of the operations of block 3110 may be performed by a DL control information generator as described with reference to FIGS. 26 through 29.

At block 3115 the base station 105 may transmit the downlink transmission to the first UE and the at least one co-scheduled UE. The operations of block 3115 may be performed according to the methods described with reference to FIGS. 1 through 21. In certain examples, aspects of the operations of block 3115 may be performed by a transmitter as described with reference to FIGS. 26 through 29.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100, 200, 600, 1000, and 1500 of FIGS. 1, 2, 6, 10, and 15—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication at a first user equipment (UE), comprising:
   identifying, in a control channel of a downlink transmission, a downlink control information (DCI) message that comprises first scheduling information for a grant of resources to the first UE in a first layer of the downlink transmission, wherein the DCI message indicates that a companion DCI message is present in the control channel and either an aggregation level or an offset relative to the aggregation level of the companion DCI message;
   identifying the companion DCI message that comprises second scheduling information for at least one other layer of the downlink transmission;
   receiving the downlink transmission based at least in part on the DCI message; and
   decoding the downlink transmission based at least in part on the DCI message and the companion DCI message.

2. The method of claim 1, wherein the DCI message is located at a first candidate location in a search space of the control channel, the method further comprising:
   determining the companion DCI message is located at a second candidate location in the search space, the second candidate location being offset from the first candidate location by a known amount.

3. The method of claim 1, wherein the companion DCI message comprises a data portion and a cyclic redundancy check (CRC) portion, and wherein the companion DCI message is identified based at least in part on the DCI message, the method further comprising:
   calculating a CRC value for the data portion of the companion DCI message; and
   determining a radio network temporary identifier (RNTI) of a co-scheduled UE or a format of the companion DCI message, or both based at least in part on the calculated CRC value and the CRC portion.

4. The method of claim 3, wherein determining the format of the companion DCI message comprises determining that the CRC portion is scrambled with one of a plurality of reserved RNTIs corresponding to one of a plurality of pre determined formats for the companion DCI message, the plurality of pre determined formats comprising a first format that comprises one record associated with multiple co-scheduled UEs and a second format that comprises a separate record for each of a plurality of co-scheduled UEs, the method further comprising:
   extracting fields of the companion DCI message according to the one of the plurality of pre determined formats corresponding to the one of the plurality of reserved RNTIs used to scramble the CRC portion; and
   performing reduced complexity maximum likelihood (RML) or symbol level interference cancellation (SLIC) of one or more associated transmission layers according to information comprised by the DCI message and the companion DCI message.

5. The method of claim 3, wherein determining the format of the companion DCI message comprises determining that the format corresponds to a single co-scheduled UE format based on the CRC portion being scrambled with the RNTI of the co-scheduled UE, the method further comprising:
   extracting fields of the companion DCI message according to the single co-scheduled UE format;
   performing code word interference cancellation (CWIC) of the at least one other layer of the downlink transmission based at least in part on the RNTI of the co-scheduled UE and a record of the single co-scheduled UE format, wherein the second scheduling information is for a grant of resources to the co-scheduled UE.

6. The method of claim 3, further comprising:
   calculating a second CRC value based on a subset of the data portion of the companion DCI message; and
   validating the data portion of the companion DCI message by comparing the second CRC value with an embedded CRC field in the data portion of the companion DCI message.

7. The method of claim 1, wherein the information in the companion DCI message comprises one or more records having DCI for respective sets of resources of the at least one other layer of the downlink transmission, at least one of the respective sets of resources corresponding to a plurality of co-scheduled UEs, the method further comprising:
   determining one or more transmission configurations for resources of the at least one other layer corresponding to the granted resources for the first layer, wherein decoding the downlink transmission comprises demodulating the resources of the first layer based at least in part on the determined transmission configurations for the at least one other layer.

8. The method of claim 7, further comprising:
   determining a power ratio between the at least one other layer and the first layer for the demodulating based on a plurality of power ratio values associated with a modulation order for the first layer and a power ratio index in the companion DCI message.

9. The method of claim 7, wherein identifying the companion DCI message comprises:
   monitoring the control channel of a transmission time interval (TTI) associated with the at least one other layer, wherein the TTI associated with the at least one other layer is a different length than a TTI associated with the first layer; and
   decoding candidate DCI messages using a predetermined radio network temporary identifier (RNTI) associated with the one or more companion DCI messages.

10. The method of claim 1, wherein the information in the DCI message comprises a grant of resources to the UE for a first set of spatial layers of the downlink transmission, and wherein the information in the companion DCI message comprises one or more records associated with respective sets of resources of the downlink transmission, at least one of the respective sets of resources overlapping with the resources granted to the UE, the method further comprising:
   determining, from the companion DCI message, a spatial layer usage configuration for a plurality of spatial layers of the downlink transmission for the at least one of the respective sets of resources, the plurality of spatial layers comprising one or more spatial layers not in the first set of spatial layers, wherein decoding the downlink transmission comprises demodulating the resources of the first set of spatial layers based at least in part on the determined spatial layer usage configuration.

11. The method of claim 10, further comprising:
identifying an orthogonal cover code length for reference signals transmitted on antenna ports of the downlink transmission based on the spatial layer usage configuration; and
performing channel estimation for the demodulating based at least in part on the identified orthogonal cover code length.

12. The method of claim 10, wherein the spatial layer usage configuration comprises any of: a reference signal seed identifier for the plurality of spatial layers, respective reference signal seed identifiers for each of the plurality of spatial layers, respective modulation orders associated with each of the plurality of spatial layers, or a combination thereof, the method further comprising:
identifying an association of the plurality of spatial layers to antenna ports of the downlink transmission based on the spatial layer usage configuration; and
performing channel estimation for the demodulating over reference signals transmitted on the antenna ports based at least in part on the identified association of the plurality of spatial layers to the antenna ports.

13. The method of claim 10, further comprising:
merging a first record and a second record of the one or more records for the determining of the spatial layer usage configuration for the plurality of spatial layers of the downlink transmission.

14. The method of claim 1, wherein:
the DCI message indicates any of: a location of the companion DCI message, an aggregation level of the companion DCI message, an index of a decoding candidate, a size of the companion DCI message, or a format of the companion DCI message, or a combination thereof, and
the companion DCI message comprises any of: a resource block allocation indicator, a resource block allocation type indicator, a modulation and coding scheme (MCS) indicator, a redundancy version indicator, a traffic to pilot ratio indicator, a resource hopping scheme indicator, a starting symbol indicator, an ending symbol indicator, an indication of a number of transmission time intervals for which DCI included in the companion DCI message applies for sets of resources of the at least one other layer, a transmission configuration index indicating a combination of a transmission mode, a precoding matrix, a demodulation reference signal orthogonal cover length indicator, an MCS table type indicator, a spatial-layer indicator, a transmission mode, or a combination thereof.

15. A method of wireless communication at a base station, comprising:
scheduling a downlink transmission to a first user equipment (UE) and at least one co-scheduled UE, the downlink transmission comprising a first layer for the first UE and at least one other layer for the at least one co-scheduled UE;
transmitting control information associated with the downlink transmission to the first UE over a control channel, the control information comprising a downlink control information (DCI) message and a companion DCI message, wherein the DCI message comprises first scheduling information for a grant of resources to the first UE in the first layer of the downlink transmission and the companion DCI message comprises second scheduling information for the at least one other layer of the downlink transmission to be used for decoding of the downlink transmission by the first UE; and
transmitting the downlink transmission to the first UE and the at least one co-scheduled UE;
wherein the DCI message indicates any of a location of the companion DCI message, an aggregation level of the companion DCI message, an index of a decoding candidate, a size of the companion DCI message, a format of the companion DCI message, an aggregation level, a location of the companion DCI message relative to the DCI message, a relative offset from an aggregation level, or a combination thereof.

16. The method of claim 15, wherein:
the control information further comprises a third DCI message intended for the at least one co-scheduled UE, the third DCI message comprising third scheduling information associated with the at least one other layer that is additional to the second scheduling information of the companion DCI message; and
the companion DCI message comprises any of a resource block allocation indicator, a resource block allocation type indicator, a modulation and coding scheme (MCS) indicator, a modulation order, a redundancy version indicator, a traffic to pilot ratio indicator, a resource hopping scheme indicator, a starting symbol indicator, a demodulation reference signal orthogonal cover length indicator, an MCS table type indicator, a spatial-layer indicator, a transmission mode, a transmission configuration index that indicates a combination of a transmission mode, a precoding matrix indicator, or a rank indicator, or a combination thereof.

17. The method of claim 15, further comprising:
determining a format of the companion DCI message that indicates DCI for the at least one co-scheduled UE; and
scrambling a cyclic redundancy check (CRC) portion of the companion DCI message, wherein the scrambling indicates the determined format to the first UE.

18. The method of claim 17, wherein the at least one co-scheduled UE comprises a plurality of co-scheduled UEs, and wherein the determining comprises:
selecting a first format from a plurality of pre determined formats for the companion DCI message that comprises one record associated with multiple co-scheduled UEs of the plurality of co-scheduled UEs, wherein the CRC portion is scrambled with a first reserved RNTI that indicates the first format for the companion DCI message; or
selecting a second format from a plurality of pre determined formats for the companion DCI message that comprises a separate record for each of the plurality of co-scheduled UEs, wherein the CRC portion is scrambled with a second reserved RNTI that indicates the second format of the companion DCI message.

19. The method of claim 17, wherein the at least one co-scheduled UE comprises a single co-scheduled UE, and wherein the determining comprises:
selecting a single co-scheduled UE format for the companion DCI message that comprises records for the at least one co-scheduled UE, wherein the CRC portion is scrambled with the RNTI of the at least one co-scheduled UE that indicates the co-scheduled UE format for the companion DCI message.

20. The method of claim 15, further comprising:
configuring, based at least in part on the scheduling, the companion DCI message comprising one or more records having DCI for respective sets of resources of the at least one other layer of the transmission, wherein at least one of the respective sets of resources corresponds to a transmission configuration associated with a plurality of co-scheduled UEs.

21. The method of claim 20, further comprising:
determining a power ratio between the at least one other layer and the first layer; and
including, in the companion DCI message, an indication of the determined power ratio, wherein the indication comprises a power ratio index corresponding to one of a plurality of power ratio values associated with a modulation order for the first layer.

22. The method of claim 20, further comprising:
determining a starting symbol and an ending symbol of the respective sets of resources of the at least one other layer,
wherein the configuring comprises including, in the companion DCI message, an indication of at least one of the starting symbol or the ending symbol based at least in part on the determination.

23. The method of claim 15, wherein the at least one other layer comprises a plurality of spatial layers for a plurality of co-scheduled UEs, the method further comprising:
configuring, based at least in part on the scheduling, the downlink control information (DCI) message and the companion DCI message comprising one or more records having a spatial layer usage configuration for the plurality of spatial layers across respective sets of resources, wherein at least one of the respective sets of resources is co-scheduled with the grant of resources to the first UE.

24. The method of claim 23, further comprising:
determining an orthogonal cover code length based on an operating mode for the plurality of spatial layers for the downlink transmission over the respective sets of resources; and
conveying the orthogonal cover code length in the spatial layer usage configuration, wherein the spatial layer usage configuration comprises a reference signal seed identifier for the plurality of spatial layers.

25. The method of claim 23, further comprising:
determining an association of the plurality of spatial layers to antenna ports of the downlink transmission for the downlink transmission over the respective sets of resources; and
conveying the association of the plurality of spatial layers to the antenna ports of the downlink transmission in the spatial layer usage configuration, wherein the spatial layer usage configuration comprises respective reference signal seed identifiers for each of the plurality of spatial layers.

26. The method of claim 23, further comprising:
merging the spatial layer usage configurations associated with two or more of the plurality of UEs associated with different resource grants on the same spatial layer into a single one of the one or more records based on determining that parameters of the spatial layer usage configurations for the two or more of the plurality of UEs are consistent with each other.

27. An apparatus, comprising:
a memory that stores instructions; and
a processor coupled with the memory, wherein the processor and the memory are configured to:
identify, in a control channel of a downlink transmission, a downlink control information (DCI) message that comprises first scheduling information for a grant of resources to the first UE in a first layer of the downlink transmission, wherein the DCI message indicates that a companion DCI message is present in the control channel and either an aggregation level or an offset relative to the aggregation level of the companion DCI message;
identify the companion DCI message that comprises second scheduling information for at least one other layer of the downlink transmission;
receive the downlink transmission based at least in part on the DCI message; and
decode the downlink transmission based at least in part on the DCI message and the companion DCI message.

28. An apparatus, comprising:
a memory that stores instructions; and
a processor coupled with the memory, wherein the processor and the memory are configured to:
schedule a downlink transmission to a first user equipment (UE) and at least one co-scheduled UE, the downlink transmission comprising a first layer for the first UE and at least one other layer for the at least one co-scheduled UE;
transmit control information associated with the downlink transmission to the first UE over a control channel, the control information comprising a downlink control information (DCI) message and a companion DCI message, wherein the DCI message comprises first scheduling information for a grant of resources to the first UE in the first layer of the downlink transmission and the companion DCI message comprises second scheduling information for the at least one other layer of the downlink transmission to be used for decoding of the downlink transmission by the first UE; and
transmit the downlink transmission to the first UE and the at least one co-scheduled UE;
wherein the DCI message indicates any of a location of the companion DCI message, an aggregation level of the companion DCI message, an index of a decoding candidate, a size of the companion DCI message, a format of the companion DCI message, an aggregation level, a location of the companion DCI message relative to the DCI message, a relative offset from an aggregation level, or a combination thereof.

* * * * *